(12) United States Patent
Fukuma et al.

(10) Patent No.: US 11,880,943 B2
(45) Date of Patent: *Jan. 23, 2024

(54) PHOTOGRAMMETRY OF BUILDING USING MACHINE LEARNING BASED INFERENCE

(71) Applicant: Topcon Corporation, Tokyo (JP)

(72) Inventors: Yasufumi Fukuma, Wako (JP); Satoshi Yanobe, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 17/727,847

(22) Filed: Apr. 25, 2022

(65) Prior Publication Data

US 2022/0254107 A1    Aug. 11, 2022

Related U.S. Application Data

(63) Continuation of application No. 17/191,731, filed on Mar. 4, 2021, now Pat. No. 11,393,169.

(30) Foreign Application Priority Data

Mar. 5, 2020   (JP) ................................ 2020-037417

(51) Int. Cl.
*G06T 19/00*   (2011.01)
*G06F 18/214*   (2023.01)

(52) U.S. Cl.
CPC .......... *G06T 19/003* (2013.01); *G06F 18/214* (2023.01)

(58) Field of Classification Search
CPC .. G06T 19/003; G06T 2210/04; G06K 9/6256
See application file for complete search history.

(56) References Cited

U.S. PATENT DOCUMENTS 11,195,418 B1    12/2021   Hong et al.
11,393,169 B2 *   7/2022   Fukuma ................ G06F 18/214
(Continued)

FOREIGN PATENT DOCUMENTS

EP       3522003 A1    8/2019
JP    2018-116572 A    7/2018
(Continued)

OTHER PUBLICATIONS

Irizarry et al., Integrating BIM and GIS to improve the visual monitoring of construction supply chain management, 2013 (Year: 2013).*

(Continued)

*Primary Examiner* — Phong X Nguyen
(74) *Attorney, Agent, or Firm* — XSENSUS LLP

(57) ABSTRACT

The data set receiving unit 13 of the information processing apparatus 1 of an aspect example receives a data set that includes at least BIM data. The route setting processor 151 sets a route, which is arranged inside and/or outside a virtual building represented by the BIM data, based on the data set received. The virtual image set generating processor 152 generates a virtual image set of the virtual building along the route, based on the received data set and the set route. The inference model creating processor 153 creates an inference model by applying machine learning with training data that includes at least the generated virtual image set to a neural network. The inference model created is used to identify data of a building material from data acquired by measuring a building.

18 Claims, 25 Drawing Sheets

(56) References Cited

U.S. PATENT DOCUMENTS

| | | | |
|---|---|---|---|
| 2006/0126451 A1* | 6/2006 | Shinkai | G11B 27/329 |
| 2014/0344181 A1* | 11/2014 | Brown | G06Q 10/10 |
| | | | 705/342 |
| 2015/0254376 A1* | 9/2015 | Pettersson | G06F 30/13 |
| | | | 703/1 |
| 2016/0034137 A1 | 2/2016 | Foster et al. | |
| 2018/0160102 A1 | 6/2018 | Luo et al. | |
| 2018/0210164 A1 | 7/2018 | Haijima et al. | |
| 2018/0239840 A1* | 8/2018 | Santarone | G06T 19/00 |
| 2018/0328737 A1 | 11/2018 | Frey et al. | |
| 2019/0073827 A1* | 3/2019 | Coronado | G06T 19/006 |
| 2019/0392088 A1* | 12/2019 | Duff | G02B 27/0172 |
| 2020/0057824 A1 | 2/2020 | Yeh et al. | |
| 2020/0065433 A1* | 2/2020 | Duff | G01S 5/02 |
| 2020/0342652 A1 | 10/2020 | Rowell et al. | |
| 2021/0279957 A1* | 9/2021 | Eder | G06N 3/08 |
| 2022/0254107 A1* | 8/2022 | Fukuma | G06T 19/003 |
| 2022/0398808 A1* | 12/2022 | Bhatia | G06V 20/653 |

FOREIGN PATENT DOCUMENTS

| | | |
|---|---|---|
| JP | 2018-119882 A | 8/2018 |
| JP | 2018-124984 A | 8/2018 |
| JP | 2018-138922 A | 9/2018 |
| JP | 2018-138923 A | 9/2018 |
| JP | 2018-151964 A | 9/2018 |
| JP | 2019-23653 A | 2/2019 |
| JP | 2019-105789 A | 6/2019 |
| JP | 2019-194883 A | 11/2019 |
| JP | 2019-219206 A | 12/2019 |
| JP | 2020-4278 A | 1/2020 |
| JP | 2020-8423 A | 1/2020 |

OTHER PUBLICATIONS

Wei et al., BIM-based method calculation of auxiliary materials required in housing construction, 2017 (Year: 2017).*

Whitlock et al., BIM for Construction Site Logistics Management, 2018 (Year: 2018).*

Acharya et al., Modelling Uncertainty of Single Image Indoor Localisation Using a 3D Model and Deep Learning, 2019 (Year: 2019).

* cited by examiner

PHOTOGRAMMETRY OF BUILDING USING MACHINE LEARNING BASED INFERENCE

CROSS-REFERENCE TO RELATED APPLICATIONS

This application is a continuation of U.S. application Ser. No. 17/191,731, filed Mar. 4, 2021, which is based upon and claims the benefit of priority from Japanese Patent Application No. 2020-037417, filed Mar. 5, 2020, the entire contents of which are incorporated herein by reference.

BACKGROUND OF THE INVENTION

Existing technologies for building construction control or management, building maintenance control or management, and building repair control or management include the followings: technologies using a mobile object (also referred to as a moving object, a moving body, etc.) such as an unmanned aerial vehicle (UAV) (or commonly known as a drone); technologies using a surveying instrument such as a total station; technologies using image processing techniques such as structure from motion (SfM), multi-view stereo (MVS), and simultaneous localization and mapping (SLAM); and technologies using building information modeling (BIM). These technologies are disclosed by the following documents, for example: U.S. Patent Publication No. 2016/0034137; European Patent Publication No. 3522003; Japanese Unexamined Patent Application Publication No. 2018-116572; Japanese Unexamined Patent Application Publication No. 2018-119882; Japanese Unexamined Patent Application Publication No. 2018-124984; Japanese Unexamined Patent Application Publication No. 2018-151964; Japanese Unexamined Patent Application Publication No. 2019-023653; Japanese Unexamined Patent Application Publication No. 2019-105789; Japanese Unexamined Patent Application Publication No. 2019-194883; Japanese Unexamined Patent Application Publication No. 2019-219206; Japanese Unexamined Patent Application Publication No. 2020-004278; and Japanese Unexamined Patent Application Publication No. 2020-008423.

Such building control or management performs a check, confirmation or verification of the condition and state of individual building materials (e.g., columns, beams, walls, floors, ceilings, etc.). For example, in the construction control or management, work is performed to check whether each material recorded in the BIM data has actually been installed and whether the installation position thereof is appropriate. These condition checks are often done manually, which requires a great deal of time and effort on the checkers. In addition to this, it is difficult to assign workers with sufficient experience to many building sites or construction sites.

BRIEF SUMMARY OF THE INVENTION

In some aspect examples, BIM data that represents a virtual building is created in advance and sent to an information processing apparatus. The information processing apparatus receives the BIM data, by a data set receiving unit. Then, the information processing apparatus processes the received data set to determine a route, by a route setting processor. The route is arranged inside and/or outside the virtual building represented by the BIM data. Further, the information processing apparatus processes the received data set and the determined route to generate a virtual image set, where multiple virtual images in the virtual image set are arranged along that route, of the virtual building, by a virtual image set generating processor. In addition, the information processing apparatus executes machine learning on a neural network to create an inference model, by an inference model creating processor. Training data used in the machine learning includes at least the virtual image set generated. The resulting inference model is then used in processing of data of a building previously acquired through measurement of the building. More specifically, the inference model is used for identifying data of a material of the building from the previously acquired data of the building.

DETAILED DESCRIPTION OF THE INVENTION

Figure 1:
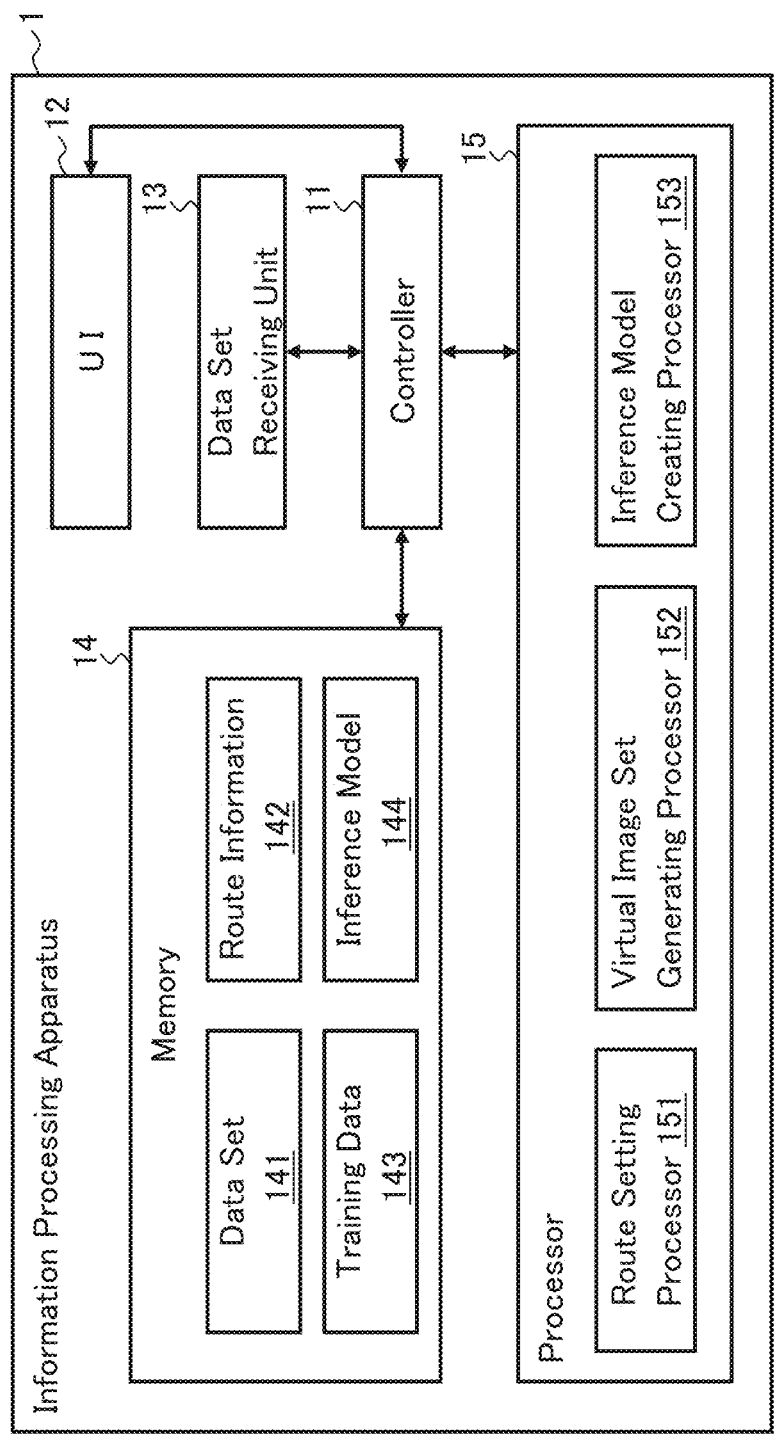
FIG. 1 is a schematic diagram showing an example of the configuration of the information processing apparatus according to some aspect examples.

One non-limiting object of the present disclosure is to improve the efficiency of building control or management (construction control or management).

In some aspect examples, an information processing apparatus may include: a data set receiving unit configured to receive a data set that includes at least building information modeling (BIM) data; a route setting processor configured to set a route arranged inside and/or outside a virtual building represented by the BIM data, based on the data set; a virtual image set generating processor configured to generate a virtual image set of the virtual building along the route, based on the data set and the route; and an inference model creating processor configured to create an inference model used to identify data of a building material from measured data of a building, by applying machine learning with training data that includes at least the virtual image set to a neural network.

In some aspect examples, the data set may further include installation date information that shows an installation date of a virtual building material recorded in the BIM data, and measurement date information that shows a measurement date of a building. In addition, the inference model creating processor may create an inference model by applying machine learning corresponding to the installation date and the measurement date to the neural network.

In some aspect examples, the information processing apparatus may further include a BIM data creating processor configured to create first BIM data corresponding to a state in which only a virtual building material whose installation date is same as or earlier than the measurement date is installed, based on the data set. In addition, the route setting processor may set a first route based on the first BIM data, the virtual image set generating processor may generate a first virtual image set based on the first BIM data and the first route, and the inference model creating processor may create an inference model corresponding to the measurement date by applying machine learning with first training data that includes at least the first virtual image set to the neural network.

In some aspect examples, the information processing apparatus may further include a BIM data creating processor configured to create second BIM data corresponding to a state in which only a virtual building material whose installation date is same as or earlier than the measurement date is installed, based on the data set. In addition, the virtual image set generating processor may generate a second virtual image set based on the second BIM data and the route, and the inference model creating processor may create an inference model corresponding to the measurement date by applying machine learning with second training data that includes at least the second virtual image set to the neural network.

In some aspect examples, the route setting processor may set the route such that a distance from the route to a virtual building material recorded in the BIM data belongs to a predetermined allowable range.

In some aspect examples, the route setting processor may set any of a one dimensional area, a two dimensional area, and a three dimensional area, as the route.

In some aspect examples, an information processing apparatus may include: a data set receiving unit configured to receive a data set that includes at least building information modeling (BIM) data and route information, the route information representing a route arranged inside and/or outside a virtual building represented by the BIM data; a virtual image set generating processor configured to generate a virtual image set of interior and/or exterior of the virtual building along the route, based on the data set; and an inference model creating processor configured to create an inference model used to identify data of a building material from measured data of a building, by applying machine learning with training data that includes at least the virtual image set to a neural network.

In some aspect examples, an information processing apparatus may include: a virtual image set receiving unit configured to receive a virtual image set along a predetermined route, the virtual image set representing interior and/or exterior of a virtual building represented by building information modeling (BIM) data; and an inference model creating processor configured to create an inference model used to identify data of a building material from measured data of a building, by applying machine learning with training data that includes at least the virtual image set to a neural network.

In some aspect examples, the data set may further include texture information that represents a state of a surface of a virtual building material. In addition, the information processing apparatus may further include a first information combining processor configured to generate first combined information by combining the texture information with the virtual image set, and the inference model creating processor may apply machine learning with training data that includes at least the first combined information to the neural network.

In some aspect examples, the data set may further include obstacle information. In addition, the information processing apparatus may further include a second information combining processor configured to generate second combined information by combining the obstacle information with the virtual image set, and the inference model creating processor may apply machine learning with training data that includes at least the second combined information to the neural network.

In some aspect examples, the information processing apparatus may further include a label assigning processor configured to assign a label relating to a virtual building material recorded in the BIM data to the virtual image set. In addition, the inference model creating processor may apply supervised learning with training data that includes at least the virtual image set and the label to the neural network.

In some aspect examples, the neural network may include a convolutional neural network.

In some aspect examples, the information processing apparatus may further include a transmitting unit configured to transmit the inference model created by the inference model creating processor to a mobile object configured to perform measurement while autonomously moving inside and/or outside a building.

In some aspect examples, an information processing apparatus may include: a memory that stores an inference model created by applying, to a neural network, machine learning with training data that includes at least a virtual image set along a predetermined route arranged inside and/or outside a virtual building represented by building information modeling (BIM) data; and a processor configured to perform data processing using the inference model. In addition, the processor includes: a feature extractor configured to extract a feature from measured data of a building; and an identifier configured to identify data of a building material based on the feature.

In some aspect examples, a method of creating an inference model may include: preparing a data set that includes at least building information modelling (BIM) data; setting a route arranged inside and/or outside a virtual building represented by the BIM data, based on the data set; generating a virtual image set of the virtual building along the route, based on the data set and the route; and creating an inference model used to identify data of a building material from measured data of a building, by applying machine learning with training data that includes at least the virtual image set to a neural network.

In some aspect examples, the data set may further include installation date information that shows an installation date of a virtual building material recorded in the BIM data, and measurement date information that shows a measurement date of a building. In addition, the creating the inference model may include creating an inference model by applying machine learning corresponding to the installation date and the measurement date to the neural network.

In some aspect examples, the method may further include creating first BIM data corresponding to a state in which only a virtual building material whose installation date is same as or earlier than the measurement date is installed, based on the data set. In addition, the setting the route may include setting a first route based on the first BIM data, the generating the virtual image set may include generating a first virtual image set based on the first BIM data and the first route, and the creating the inference model may include creating an inference model corresponding to the measurement date by applying machine learning with first training data that includes at least the first virtual image set to the neural network.

In some aspect examples, the method may further include creating second BIM data corresponding to a state in which only a virtual building material whose installation date is same as or earlier than the measurement date is installed, based on the data set. In addition, the generating the virtual image set may include generating a second virtual image set based on the second BIM data and the route, and the creating the inference model may include creating an inference model corresponding to the measurement date by applying machine learning with second training data that includes at least the second virtual image set to the neural network.

In some aspect examples, the setting the route may include setting a route such that a distance from the route to a virtual building material recorded in the BIM data belongs to a predetermined allowable range.

In some aspect examples, the setting the route may include setting any of a one dimensional area, a two dimensional area, and a three dimensional area as a route.

In some aspect examples, a method of creating an inference model may include: preparing a data set that includes at least building information modeling (BIM) data and route information, the route information representing a route arranged inside and/or outside a virtual building represented by the BIM data; generating a virtual image set of interior and/or exterior of the virtual building along the route, based on the data set; and creating an inference model used to identify data of a building material from measured data of a building, by applying machine learning with training data that includes at least the virtual image set to a neural network.

In some aspect examples, a method of creating an inference model may include: preparing a virtual image set along a predetermined route, the virtual image set representing interior and/or exterior of a virtual building represented by building information modeling (BIM) data; and creating an inference model used to identify data of a building material from measured data of a building, by applying machine learning with training data that includes at least the virtual image set to a neural network.

In some aspect examples, the data set may further include texture information that represents a state of a surface of a virtual building material. In addition, the method may further include generating first combined information by combining the texture information with the virtual image set, and the creating the inference model may include applying machine learning with training data that includes at least the first combined information to the neural network.

In some aspect examples, the data set may further include obstacle information. In addition, the method may further include generating second combined information by combining the obstacle information with the virtual image set, and the creating the inference model may include applying machine learning with training data that includes at least the second combined information to the neural network.

In some aspect examples, the method may further include assigning a label relating to a virtual building material recorded in the BIM data to the virtual image set. In addition, the creating the inference model may include applying supervised learning with training data that includes at least the virtual image set and the label to the neural network.

In some aspect examples, the neural network may include a convolutional neural network.

In some aspect examples, the method may further include transmitting the inference model to a mobile object configured to perform measurement while autonomously moving inside and/or outside a building.

In some aspect examples, a method of processing information may include: receiving an inference model created by applying, to a neural network, machine learning with training data that includes at least a virtual image set along a predetermined route arranged inside and/or outside a virtual building represented by building information modeling (BIM) data; extracting a feature from measured data of a building, by a processor configured to perform data processing using the inference model; and identifying data of a building material based on the feature, by the processor. The inference model of the method may be an inference model created by any of the above aspect examples, by any of the aspect examples disclosed herein, or by any of their equivalents.

In some aspect examples, a program may be configured to cause a computer to execute the method of any of the above aspect examples, the method of any of the aspect examples disclosed herein, or a method of any of their equivalents. Also, in some aspect examples, a computer-readable non-transitory recording medium may record the program.

In some aspect examples, an inference model may be the inference model created by the method of any of the above aspect examples, by the method of any of the aspect examples disclosed herein, or by a method of any of their equivalents. Also, in some aspect examples, a computer-readable non-transitory recording medium may record the inference model.

In some aspect examples, a program may be configured to cause a computer to execute a process of identifying data of a building material from measured data of a building using the inference model created by the method of any of the above aspect examples, by the method of any of the aspect examples disclosed herein, or by a method of any of their equivalents. Also, in some aspect examples, a computer-readable non-transitory recording medium may record the program.

The present disclosure describes some aspect examples of an information processing apparatus, some aspect examples of a method or technique of creating an inference model, some aspect examples of a method or technique of processing information, some aspect examples of an inference model, some aspect examples of a program, and some aspect examples of a recording medium. In addition, the present disclosure describes a data structure (data format) and the like that can be used in some aspect examples.

For example, some aspect examples may be used to properly put into practical use and operate a building photogrammetry system (building reality capture system). Photogrammetry (also referred to as reality capture or the like) is a technology of creating a three dimensional model by acquiring data of a physical object (also referred to as a tangible object, a real object, a real tangible object, etc.) with a digital camera or a laser scanner. Photogrammetry is used in various kinds of fields such as measurement, virtual reality, and augmented reality. While the present disclosure describes some applications of photogrammetry in the field of architecture (building construction), some aspect examples may also be applied to photogrammetry in other fields such as civil engineering and may also be applied to a technology or technique other than photogrammetry. In addition, matters and items described in the documents cited in the present disclosure (the present specification) and any other known technologies or techniques may be employed in the aspect examples described herein.

At least one or more of the functions of the elements described in the present disclosure are implemented by using a circuit configuration (or circuitry) or a processing circuit configuration (or processing circuitry). The circuitry or the processing circuitry includes any of the followings, all of which are configured and/or programmed to execute at least one or more functions disclosed herein: a general purpose processor, a dedicated processor, an integrated circuit, a central processing unit (CPU), a graphics processing unit (GPU), an application specific integrated circuit (ASIC), a programmable logic device (e.g., a simple programmable logic device (SPLD), a complex programmable logic device (CPLD), or a field programmable gate array (FPGA)), a conventional circuit configuration or circuitry, and any combination of these. A processor is considered to be processing circuitry or circuitry that includes a transistor and/or another circuitry. In the present disclosure, circuitry, a unit, a means, or a term similar to these is hardware that executes at least one or more functions disclosed herein, or hardware that is programmed to execute at least one or more functions disclosed herein. Hardware may be the hardware disclosed herein, or alternatively, known hardware that is programmed and/or configured to execute at least one or more functions described herein. In the case where the hardware is a processor, which may be considered as a certain type of circuitry, then circuitry, a unit, a means, or a term similar to these is a combination of hardware and software. In this case, the software is used to configure the hardware and/or the processor.

Any two or more of the aspect examples described herein may be combined in any manner. For example, any two or more aspect examples may be at least partially combined.

First Aspect Example

Figure 2:
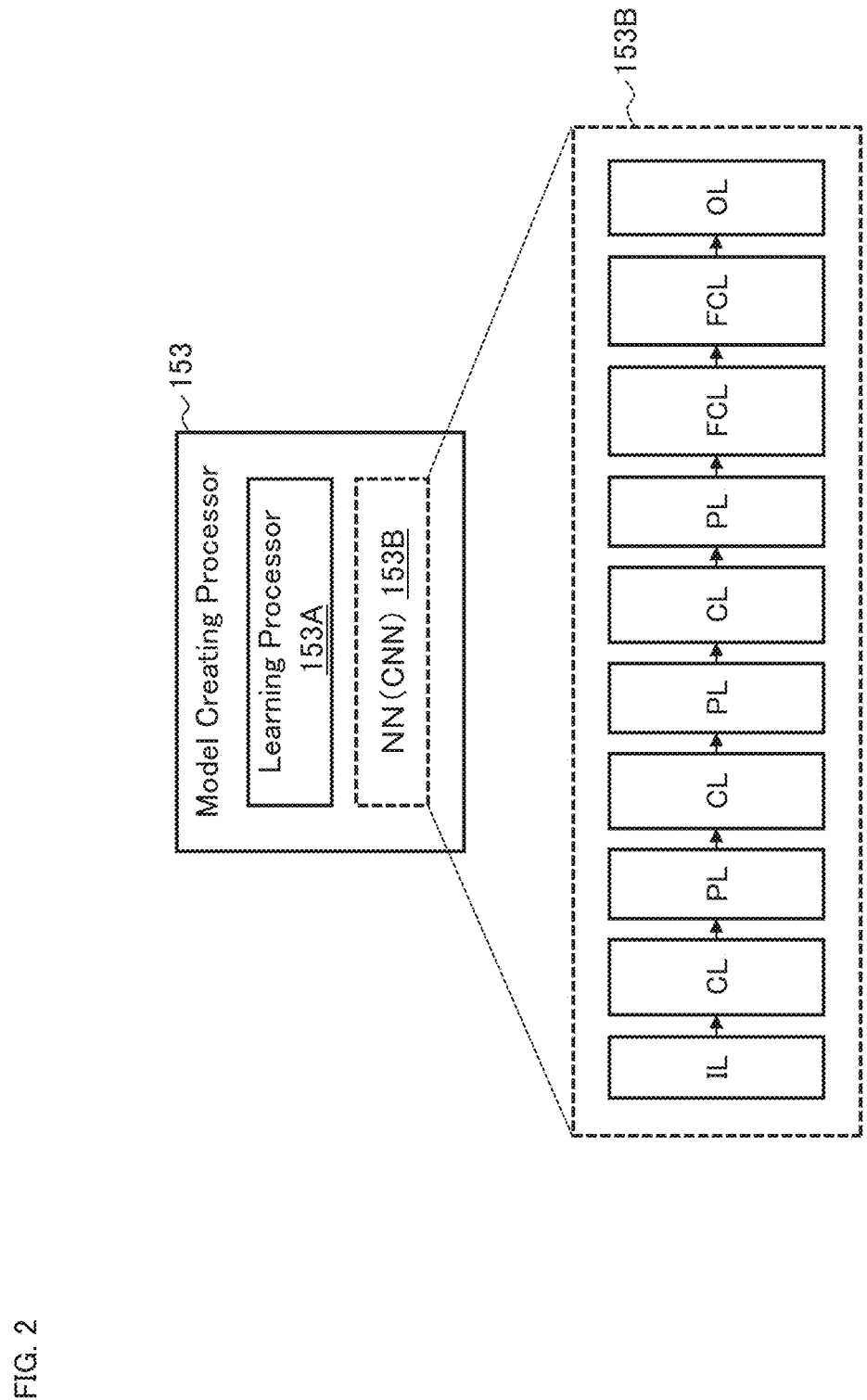
FIG. 2 is a schematic diagram showing an example of the configuration of the information processing apparatus according to some aspect examples.

FIG. 1 and FIG. 2 show a configuration example of the information processing apparatus according to the present aspect example. In some aspects, the information processing apparatus 1 may be included in a building photogrammetry system. The building photogrammetry system has the function of measuring an actual building (physical building, real building, etc.) and acquiring digital data. The present aspect example may be configured to generate a data structure (data format) for facilitating comparison between measured data of an actual building and design data thereof.

The information processing apparatus 1 according to the present aspect example includes at least the data set receiving unit 13 and the processor 15, and may further include the controller 11, the user interface (UI) 12, and the memory 14.

The controller 11 is configured to execute various kinds of control processing of the information processing apparatus 1. The controller 11 is implemented, for example, by the cooperation of hardware including a processor and a storage device, and control software. The controller 11 may be included in a single computer or decentralized among two or more computers.

The user interface 12 includes, for example, a display device, an operation device, an input device, and the like. The user interface 12 of some aspect examples includes a graphical user interface (GUI) configured with hardware and software such as a touch screen, a pointing device, and computer graphics software. The user interface 12 may be included in a single computer or decentralized among two or more computers.

The data set receiving unit 13 has the function of receiving data to be processed by the information processing apparatus 1. The data reception function is a function of receiving data from the outside. The data reception function may be implemented, for example, by using a communication device for performing data communication with an external device, an external system, an external database, and the like. In addition to or in place of this, the data reception function may be implemented by using a drive device for reading out data recorded on a recording medium. The data received from the outside by the data set receiving unit 13 may be, for example, data generated by using a computer (e.g., BIM data, CAD data, etc.), or data that has been acquired and/or processed in the past by any of the information processing apparatus 1, another apparatus, and another system. The data set receiving unit 13 of the present aspect example receives a data set that includes at least BIM data created in advance. The recording medium that can be employed for the data reception function is a computer-readable non-transitory recording medium, and examples thereof may include a magnetic disk, an optical disk, a magneto-optical disk, a semiconductor memory, or the like.

The information processing apparatus (or a system including the same) according to some aspect examples may have a data generation function in addition to or in place of the data reception function. The data generation function may include, for example, any of the following functions: a function of acquiring data from a physical object; a function of processing data acquired from a physical object; a function of generating data using a computer; and a function of processing data generated in advance.

The function of acquiring data from a physical object may include, for example, either one or both of the following functions: a function of photographing the physical object with a camera (e.g., an omnidirectional camera, also known as a 360-degree camera) or a video camera (e.g., an omnidirectional video camera, also known as a 360-degree video camera) mounted on a mobile object such as an unmanned aerial vehicle (UAV) or carried by a person; and a function of acquiring data by scanning the physical object with a scanner such as a laser scanner or a total station. The information processing apparatus (or a system including the same) having the function of acquiring data from a physical object may include one or more measuring apparatuses.

The function of processing data acquired from a physical object may be implemented, for example, by using at least a processor, and may include a function of applying a predetermined process to a photographed image or scan data of the physical object to generate other data. An example of this function is a data processing function implemented with any of SfM, MVS, SLAM (V-SLAM, or Visual SLAM) and the like described above. Another example is a data processing function with a learned model constructed using machine learning. The information processing apparatus (or a system including the same) having the function of processing data acquired from a physical object may be included in a single computer or decentralized among two or more computers.

The function of generating data using a computer may include, for example, a data generation function with computer graphics, such as a function of generating BIM data using a BIM application and a function of generating CAD data using a computer-aided design (CAD) application. In addition to these functions, the function of generating data using a computer may include a function of generating data using various kinds of applications relating to architecture or construction such as a construction control or management application, a maintenance control or management application, and a repair control or management application. The information processing apparatus (or a system including the same) having the function of generating data using a computer may be included in a single computer or decentralized among two or more computers.

The function of processing data generated in advance is implemented, for example, by using at least a processor, and may include a function of generating other data by applying a predetermined process to data of a physical object that has been acquired and/or processed in the past by any of the information processing apparatus 1, another apparatus, and another system. The technique or technology applicable to the function of processing data generated in advance may be the same as the technique or technology applicable to the function of processing data acquired from a physical object. BIM data is an example of the data generated in advance.

The information processing apparatus (or a system including the same) having the function of processing data generated in advance may be included in a single computer or decentralized among two or more computers.

The physical object in the present aspect example is a building. A building is constructed based on design data generated in advance. Examples of the design data include BIM data, a design specification, a construction drawing, a working drawing, a working diagram, a construction document, a construction plan, a construction schedule, and the like. The data set receiving unit 13 receives a data set that includes at least part of BIM data included in such design data.

The building data recorded in the design data (and/or the building data obtained by processing the design data) in the present disclosure may be referred to as a virtual building, and a structural element or a component (building material) of the virtual building may be referred to as a virtual material. In some aspect examples, the virtual material is a material model provided by a BIM model, and a building structured or configured using a plurality of material models is a virtual building.

In addition, a real building constructed based on design data may be referred to as a physical building, and a structural element or a component (building material) or the physical building may be referred to as a physical material in the present disclosure. The aforementioned physical object corresponds to such a physical building. The physical building may not only be a building completed based on design data, but also be a building under construction (an uncompleted building), or even be a building site before construction.

The building materials in the present disclosure may include structural materials as well as non-structural materials, various kinds of parts, various kinds of machines, various kinds of devices or equipment, various kinds of facilities, and the like. Here, examples of the structural materials include columns, beams, walls, slabs, roofs, foundations, and the like, and examples of the non-structural materials include windows, doors, stairs, tiles, floorings, and the like. More generally, a building material in the present disclosure may be any type of thing or object that can be registered as a virtual material, and may be any type of thing or object that can be used as a physical material.

The memory 14 is configured to store various kinds of data (information). The memory 14 stores, for example, data acquired by the data set receiving unit 13. The memory 14 includes a storage device that has a relatively large capacity (e.g., memory, secondary storage) such as a hard disk drive (HDD) or a solid state drive (SSD), for example. The memory 14 includes a single storage device or two or more storage devices. In the present aspect example, the memory 14 stores the data set 141, the route information 142, the training data 143, and the inference model 144.

The data set 141 has been received by the data set receiving unit 13. The data set 141 may be any data and/or any information relating to building design. The data set 141 of the present aspect example may include at least BIM data of a virtual building (a plurality of virtual materials) designed using a BIM application (a BIM tool) that is arranged outside the information processing apparatus 1. The data set 141 may further include a design specification, a construction drawing, a working drawing, a working diagram, a construction document, a construction plan, a construction schedule, and the like. Further, the data set 141 may include data generated from any one or more pieces of data among any data and/or any information relating to building design such as BIM data, a design specification, a construction drawing, a working drawing, a working diagram, a construction document, a construction plan, and a construction schedule.

The data set 141 of the present aspect example may include virtual material information. The virtual material information includes information on a plurality of virtual materials that are structural elements or components of a virtual building. More specifically, the virtual material information includes information relating to a plurality of attributes set in advance for each of the plurality of the virtual materials. The attributes mean properties, features, characteristics, or the like of the virtual materials.

In some aspect examples, the plurality of attributes of the virtual materials includes, for example, virtual material identification information (virtual material ID), virtual material shape information, virtual material position information, material installation date information, and the like. Note that the attributes of the virtual materials are not limited to these items, and may be any types of property, feature, or characteristic such as a raw material, an ingredient, a constituent, a substance, or the like.

The virtual material ID is information for identifying individual virtual materials. The virtual material ID indicates the types of virtual materials (e.g., column, beam, wall, slab, roof, foundation, window, door, stair, tile, flooring, part, machine, device, equipment, facility, or the like). The virtual material ID may be, for example, identification information given to individual physical materials (e.g., material numbers). The virtual material ID is acquired from BIM data, a design specification, a construction drawing, a working drawing, a working diagram, a construction document, or the like, for example. Further, the virtual material ID may be individually unique identification information. Examples of such virtual material ID include identification information provided in conformity with the Industry Foundation Classes (IFC), which is a file format of a neutral and open CAD data model. The virtual material shape information is information representing the shape of a virtual material. The virtual material shape information may also include information representing the orientation, direction, posture, or the like of a virtual material. The virtual material shape information is acquired from BIM data, a design specification, a construction drawing, a working drawing, a working diagram, a construction document, or the like, for example. The virtual material position information represents the position of a virtual material of a virtual building. The position of a virtual material is represented by, for example, the coordinates of the virtual material in the virtual space (three dimensional virtual space defined by a three dimensional coordinate system) in which the virtual building is defined and designed. The virtual material position information is acquired from BIM data, a design specification, a construction drawing, a working drawing, a working diagram, a construction document, or the like, for example. The material installation date information indicates the date on which the physical material corresponding to a virtual material is installed at the building site or the construction site (e.g., actual installation date, scheduled installation date, or the like). The material installation date information is obtained from a construction drawing, a working drawing, a working diagram, a construction document, a construction plan, a construction schedule, or the like, for example.

The information processing apparatus 1 (e.g., the controller 11 and the memory 14) provides, for example, a design database for managing the data set 141. For example, the design database stores data of a virtual building (a plurality of virtual materials of the virtual building) designed using a BIM application. The design database is configured to manage a plurality of virtual materials included in the virtual building one by one. For example, the design database stores the data set 141 including actual BIM data. The design database may be configured to manage the data set 141 for individual virtual buildings, for example. The design database is configured, for example, to manage the virtual material information using a table-type data structure (data format).

The data and information stored in the memory 14 are not limited to the above example items, and an example thereof is physical material data. The physical material data may be any type of data and/or any type of information relating to physical materials. The physical material data may be generated based on measured data obtained by measuring a physical building constructed on the basis of BIM data included in the data set 141 and the like, for example. Here, the physical building measurement may be conducted by photographing, laser scanning, or other techniques, and the measured data may be a photographed image, scan data, point cloud data, or other types of data. The physical building measurement can be performed by an external system such as a UAV, a total station, or the like. The generation of the physical material data based on the measured data can be executed by the information processing apparatus 1 or an external system. The physical material data may be generated and managed as BIM data in conformity with the same format as the data set 141, for example.

The physical material data includes information on a plurality of physical materials that are structural elements or components of a physical building. More specifically, the physical material data includes information relating to a plurality of attributes set in advance for each of the plurality of the physical materials. The attributes here mean properties, features, characteristics, and the like of physical materials.

In some aspect examples, the plurality of attributes of the physical material corresponds to the plurality of attributes of the virtual material described above. For example, the plurality of attributes of the physical material includes physical material identification information (physical material ID), physical material shape information, physical material position information, measurement date information, and the like. It should be noted that the attributes of the physical materials are not limited to these items, and may be any types of property, feature, or characteristic such as a raw material, an ingredient, a constituent, a substance, or the like. Attribute information of the physical materials is generated, for example, by the information processing apparatus 1, an external system, or the like.

The physical material ID is information for identifying individual physical materials. Similar to the virtual material ID, the physical material ID is information indicating the types of physical materials, and may be, for example, identification information given to each physical material (material number or the like). In some aspect examples, identifiers in the physical material ID may respectively be the same as corresponding identifiers in the virtual material ID, such as identification information provided by IFC. On the other hand, identifiers in the physical material ID of some aspect examples may respectively be different from corresponding identifiers in the virtual material ID, and may be defined in conformity with a predetermined format in which the information processing apparatus 1 (and an external system or the like) is capable of recognizing the relationship between the virtual material ID and the physical material ID. The physical material shape data is data representing the shape of a physical material acquired based on the measured data. The physical material shape data may include data representing the orientation, direction, posture, or the like of a physical material. The physical material position data represents the position of a physical material of a physical building. The position of a physical material is represented by, for example, the coordinates of the physical material in the virtual space (three dimensional virtual space defined by a three dimensional coordinate system) in which a BIM model of the physical building created based on the measured data is defined. The measurement date information indicates the date on which measurement of the physical building is conducted. The measurement date information is generated, for example, by a measurement system (e.g., a mobile object, a total station, a computer, etc.) that performs physical building measurement.

It should be noted that the material installation date information, which is an attribute of the virtual material, and the measurement date information, which is an attribute of the physical material, both include at least information of year, month, and day, and may further include information of hour, minute, second, or the like. The information processing apparatus 1 (or an external system, etc.) may be configured to perform the conversion for representing the material installation date information and the measurement date information in the same standard time in the case where the standard time of the place at which the building design is performed and the standard time of the place at which the physical building exists are different from each other.

The information processing apparatus 1 (e.g., the controller 11 and the memory 14) provides, for example, a physical material database for managing the physical material data. For example, the physical material database stores data of a BIM model of a physical building (a BIM model of a plurality of physical materials of the physical building) obtained by processing the measured data of the physical building. The physical material database is configured to manage a plurality of physical material models included in the physical building model one by one. For example, the physical material database stores a physical building BIM model. The physical material database may be configured to manage the physical material data for individual physical building BIM models, for example. The physical material database is configured to manage the physical material data by using a table-type data structure (data format), like the design database.

The route information 142 represents a route set by the processor 15 (the route setting processor 151 described later). The training data 143 includes a virtual image set generated by the processor 15 (the virtual image set generating processor 152 described later). The inference model 144 is created by the processor 15 (the inference model creating processor 153 described later). The route information 142, the training data 143, and the inference model 144 will be described later.

The processor 15 is configured to execute data processing. The processor 15 is implemented, for example, by the cooperation of hardware including a processor and a storage device, and data processing software. The processor 15 may be included in a single computer or decentralized among two or more computers. The processor 15 includes the route setting processor 151, the virtual image set generating processor 152, and the inference model creating processor 153.

The route setting processor 151 is configured to set a route based on the data set 141 that includes at least BIM data. The route is arranged inside and/or outside a virtual building represented by the BIM data (i.e., at least part of the route may be located inside the virtual building and/or at least part of the route may be located outside the virtual building). The controller 11 saves information representing the route determined by the route setting processor 151 in the memory 14. The route information 142 includes the saved information representing the route. The route setting processor 151 is implemented, for example, by the cooperation of hardware including a processor and a storage device, and route setting software.

Examples of algorithms available in the route setting process include dynamic programming, Held-Karp algorithm (Bellman-Held-Karp algorithm), linear programming (LP, linear optimization), logic tree (or issue tree), branch-and-bound algorithm (branch and bound, BB, B&B, or BnB), group theory algorithm, cutting-plane method, branch cut method, Lin-Kernighan algorithm, local search algorithm, simulated annealing (SA), Hopfield network (or Ising model of a neural network or Ising-Lenz-Little model), Boltzmann machine (also called stochastic Hopfield network with hidden units or Sherrington-Kirkpatrick model with external field or stochastic Ising-Lenz-Little model), genetic algorithm (GA), tabu search, heuristic algorithm, Christofides algorithm (Christofides-Serdyukov algorithm), polynomial time approximation algorithm, and the like.

Further, the route setting processor 151 may be configured to set a route using a learned model created by machine learning. The machine learning uses, for example, training data generated from a large number of pieces of BIM data. In addition, the machine learning is carried out in the same manner as the method or technique for solving the traveling salesman problem, and may include at least one method or technique among supervised learning, unsupervised learning, and reinforcement learning.

The route setting processor 151 may set a route such that the route passes near all the building materials of the virtual building (virtual building materials, virtual materials), for example. Typically, the route setting processor 151 may be configured to set a route such that the distances from the route to individual virtual materials are included within a predetermined allowable range (such that the distances belong to the allowable range). This makes it possible to conduct photographing of the physical materials of the physical building constructed based on the virtual building material at appropriately distant positions. For example, the allowable range (maximum distance, upper limit) may be determined in consideration of the tendency that the smaller (the closer) the distance from a route to a virtual material is, the higher the precision of measurement of the physical material corresponding the virtual material. Similarly, the allowable range (minimum distance, lower limit) may be determined in consideration of the tendency that the greater (the farther) the distance from a route to a virtual material is, the higher the measurement efficiency.

The route setting processor 151 may set a one dimensional area as a route. In other words, the route setting processor 151 may set a linear route that is arranged inside and/or outside the virtual building. Further, a route set by the route setting processor 151 may be a two dimensional area or a three dimensional area. A two dimensional area or a three dimensional area determined as a route by the route setting processor 151 represents, for example, an area in which a mobile object, which performs measurement while moving, is able to move in order to avoid or dodge obstacles.

The virtual image set generating processor 152 is configured to generate a plurality of images of the virtual building, which are arranged along the route represented by the route information 142, based on the data set 141 and the route information 142. Such an image of the virtual building will be referred to as a virtual image, and a plurality of virtual images will be referred to as a virtual image set. The virtual image set generating processor 152 is implemented, for example, by the cooperation of hardware including a processor and a storage device, and virtual image set generating software.

The controller 11 saves the virtual image set generated by the virtual image set generating processor 152 in the memory 14 (the training data 143). The training data 143 may include at least the virtual image set and may further include other data. Some examples thereof will be described later.

A virtual image is an image representing a virtual building, and is, for example, rendering data (rendered data) obtained by applying rendering to the BIM data included in the data set 141. The BIM data in the data set 141 is also referred to as design BIM data. Such rendering data (virtual image) is constructed for each of the plurality of positions in the design BIM data. In the present aspect example, a plurality of positions may be set on the route represented in the route information 142, and the virtual image set generating processor 152 may, for each of the plurality of positions on the route, apply volume rendering with that position as a viewpoint to the design BIM data. As a result of a plurality of times of volume rendering performed in that way, a plurality of pieces of rendering data of the design BIM data arranged along the route represented in the route information 142 can be obtained. The plurality of pieces of rendering data forms a virtual image set. To each piece of the rendering data, corresponding position information (the three dimensional coordinates of a corresponding viewpoint in the design BIM data) may be attached as attribute information. The attribute information of the rendering data is not limited to this. For example, the attribute information of the rendering data may include any information on the design BIM data, any information on the rendering process, any information on the rendering data, or the like.

The inference model creating processor 153 is configured to create an inference model, which can be used for identifying data of a building material from measured data of a building, by applying machine learning with the training data 143 that includes at least the virtual image set generated by the virtual image set generating processor 152, to a neural network. The controller 11 saves an inference model created by the inference model creating processor 153 in the memory 14. (the inference model 144). The inference model creating processor 153 is implemented, for example, by the cooperation of hardware including a processor and a storage device, and inference model creating software.

Examples of the applications of the inference model include the followings: control of a mobile object used to perform measurement (e.g., photographing, laser scanning) of a physical building; and creation of BIM data based on measured data (e.g., a photographed image, scan data, point cloud data, etc.) of a physical building.

FIG. 2 shows an example of the configuration of the inference model creating processor 153. The inference model creating processor 153 of the present example includes the learning processor 153A and the neural network (NN) 153B.

The neural network 153B typically includes a convolutional neural network (CNN). FIG. 2 also shows an example the structure of the convolutional neural network. An image is input to the input layer (IL).

Behind the input layer, a plurality of pairs of a convolutional layer (CL) and a pooling layer (PL) are arranged. While the example shown in FIG. 2 includes three pairs of a convolutional layer and a pooling layer, any number of pairs may be included in a convolutional neural network of some other aspect examples.

In the convolutional layer, a convolution operation is performed to detect or extract a feature (e.g., contour) from the image. The convolution operation is a multiply-accumulate operation (a multiply-add operation, a product-sum operation) on the input image. The multiply-accumulate operation is performed with a filter function (a weight coefficient, a filter kernel) having the same dimension as the processed image. In the convolutional layer, the convolution operation is applied to each of a plurality of parts (sections, portions) of the input image. More specifically, the convolutional layer is configured to calculate a product by multiplying the value of each pixel in a partial image, to which the filter function has been applied, by the value (weight) of the filter function corresponding to that pixel, and then calculate the sum of the products over a plurality of pixels in the partial image. The sum of products obtained in this way is substituted for the corresponding pixel in an image to be output from the convolutional layer. By repetitively performing such multiply-accumulate operation while moving the part to which the filter function is applied (while changing or switching partial images), a convolution operation result for the entire input image can be obtained. With this kind of convolution operation, a large number of images in which various kinds of features have been extracted using a large number of weight coefficients can be obtained. This means that a large number of filtered images, such as smoothed images and edge images, can be obtained. The large number of images generated by the convolutional layer are called feature maps (or activation maps).

The pooling layer executes data compression (e.g., data thinning) of the feature maps generated by the immediately preceding convolutional layer. More specifically, the pooling layer calculates statistical values in predetermined neighboring pixels of a predetermined pixel of interest in an input feature map at each predetermined pixel intervals, and outputs an image having a size smaller than the input feature map. The statistical values applied to the pooling operation may be maximum values (max pooling) or average values (average pooling), for example. The value of the pixel intervals applied to the pooling operation is referred to as a stride.

In general, a convolutional neural network is capable of extracting many features from an input image through processing carried out by a plurality of pairs of a convolutional layer and a pooling layer.

A fully connected layer (FCL) is arranged behind the last pair of a convolutional layer and a pooling layer. While the example shown in FIG. 2 includes two fully connected layers, any number of fully connected layers may be included in a convolutional neural network of some other aspect examples. The fully connected layer executes processing such as image classification, image segmentation, or regression using the features compressed by convolution and pooling. An output layer (OL) is arranged behind the last fully connected layer. The output layer yields an output result.

It should be noted that some aspect examples may employ a convolutional neural network including no fully connected layer, or some other aspect examples may include a support vector machine or a recurrent neural network (RNN). Machine learning applied to the neural network 153B may include transfer learning. In other words, the neural network 153B may include a neural network whose parameters have been adjusted through learning with other training data (with other training images). Further, the model creating processor 153 (the learning processor 153A) may perform fine tuning on a learned neural network (153B). The neural network 153B may include, for example, a known open source neural network architecture.

The learning processor 153A applies machine learning with the training data 143 to the neural network 153B. If the neural network 153B includes a convolutional neural network, parameters adjusted by the learning processor 153A are, for example, the filter coefficients of one or more convolutional layers therein and the connection weights and offsets of one or more fully connected layers therein.

The training data 143 includes at least a virtual image set as described above. The training data 143 may further include data other than the virtual images. For example, the training data 143 may include a photographed image of any object and a photographed image of a person. Examples of the photographed image of the object include an image of a building material, an image of a tool such as a ladder or a stepladder, and the like. Examples of the image of the person include an image of a worker at a building site or at a construction site. The training data 143 may also include measured data of other types, such as scan data or point cloud data, of a physical building. The number of pieces or the amount of training data may be increased by using a technique or technology such as data expansion or data augmentation.

The present aspect example may be configured to utilize virtual images created from the BIM data (the design BIM data) to reduce the time and effort required for collecting a large amount of measured data of the physical building. In particular, the quality of machine learning and the quality of the inference model may be improved, by generating a large number of virtual images (a virtual image set) based on a large number of pieces of BIM data and by using the large number of virtual images thus created as training data for machine learning.

In addition, an inference model may be trained to detect tools and workers by using training data that includes a photographed image of a building material, a photographed image of an object other than building materials, a photographed image of a person, or the like. Such machine learning makes it possible for an information processing apparatus to execute control of a mobile object to avoid or dodge obstacles and workers. Furthermore, such machine learning makes it possible for an information processing apparatus to analyze measured data of a physical building to identify and exclude data corresponding to obstacles and data corresponding to workers when creating BIM data from the measured data.

The virtual images and/or the measured data (e.g., photographed images, scan data, point cloud data, etc.) included in the training data 143 may include texture information indicating the state of the surface of a building material. By using the texture information, a final output that reflects the texture of the surface of an object may be obtained. This can thereby improve the quality of mobile object control and BIM data creation.

The training method employed for inference model construction may be optional. For example, the training method may be any of supervised learning, unsupervised learning, and reinforcement learning; or a combination of any two or more of them. Typically, supervised learning is conducted with training data in which a label as a final output is assigned to each input image. Further, in order to prevent the overconcentration of processes in a specific unit of the neural network 153B, the learning processor 153A may randomly select and invalidate some units and execute learning using the remaining units. Such a function is referred to as dropout.

The methods or techniques used for inference model creation are not limited to the examples shown above. For example, any methods or techniques such as the followings may be employed: support vector machine, Bayes classifier, boosting, k-means clustering, kernel density estimation, principal component analysis, independent component analysis, self-organizing map (or self-organizing feature map), random forest (or randomized trees, random decision forests), and generative adversarial network (GAN).

Figure 3:
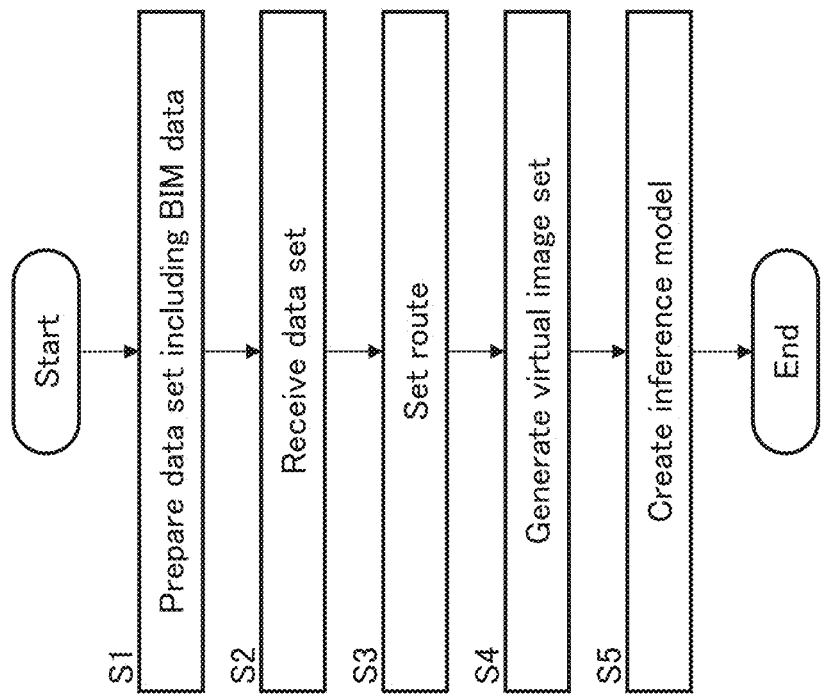
FIG. 3 is a flowchart showing an example of the operation of the information processing apparatus according to some aspect examples.

An operation example of the information processing apparatus 1 according to the present aspect example will now be described. FIG. 3 shows an example of the operation performed by the information processing apparatus 1.

To begin with, a data set that includes at least BIM data is prepared (S1). The preparation of the data set is performed automatically and/or manually, for example, using a computer such as a cloud computer.

The information processing apparatus 1 then receives the data set prepared in the step S1, by the data set receiving unit 13 (S2). The data set received is saved in the memory 14 by the controller 11 as the data set 141.

Next, the route setting processor 151 sets a route, which is arranged inside and/or outside a virtual building represented by the BIM data in the data set 141, based on the data set 141 received in the step S2 (S3). Information representing the route set by the route setting processor 151 is saved in the memory 14 by the controller 11 as the route information 142.

Subsequently, based on the data set 141 and the route information 142, the virtual image set generating processor 152 generates a virtual image set of the virtual building represented by the BIM data in the data set 141, wherein the virtual image set is (the multiple virtual images are) arranged along the route set in the step S3 (S4). The virtual image set generated is saved (along with other data) in the memory 14 by the controller 11 as the training data 143.

Next, the learning processor 153A of the inference model creating processor 153 creates an inference model, which will be used for identifying data of a building material from measured data of a building, by applying machine learning with the training data 143 that includes at least the virtual image set generated in the step S4 to the neural network 153B (S5). The inference model created is saved in the memory 14 by the controller 11 as the inference model 144 (End).

The inference model 144 created in the present aspect example may be provided, for example, to a mobile object configured to collect measured data while (autonomously or non-autonomously) moving inside and/or outside a building. Further, the inference model 144 may be provided to a computer configured to identify data of a building material from the measured data of the building collected by such a mobile object. It should be noted that the application of the inference model 144 is not limited to these examples and the inference model 144 may be used for any purpose. In addition, at least part of the inference model 144 can be used for transfer learning or fine tuning, for example.

As described above, the information processing apparatus 1 according to the present aspect example can be used for photogrammetry of a building or the like, and includes the data set receiving unit 13, the route setting processor 151, the virtual image set generating processor 152, and the inference model creating processor 153. The data set receiving unit 13 is configured to receive a data set that includes at least BIM data. The route setting processor 151 is configured to perform, based on the data set received by the data set receiving unit 13, setting of a route that is arranged inside and/or outside a virtual building represented by the BIM data in the data set. The virtual image set generating processor 152 is configured to generate a virtual image set of the virtual building arranged along the route, based on the data set received by the data set receiving unit 13 and the route set by the route setting processor 151. The inference model creating processor 153 is configured to apply machine learning with training data that includes at least the virtual image set generated by the virtual image set generating processor 152 to a neural network, thereby creating an inference model that can be used for identifying data of a building material from data acquired by measurement of a building.

The route setting processor 151 of the information processing apparatus 1 according to the present aspect example, may be configured to perform processing of setting the route such that the distance between the route and building material data (a virtual building material) recorded in the BIM data is included within a predetermined allowable range.

In addition, the route setting processor 151 of the information processing apparatus 1 according to the present aspect example, may be configured to perform processing of setting the route by setting any of a one dimensional area, a two dimensional area, and a three dimensional area.

Further, in the information processing apparatus 1 according to the present aspect example, the neural network used for inference model creation may include a convolutional neural network.

In addition to the above, the present aspect example may provide a method or technique of creating an inference model that can be used for photogrammetry of a building. The inference model creation method or technique includes at least the following steps: a step of preparing a data set that includes at least BIM data (a data set preparing step); a step of setting, based on the data set prepared, a route that is arranged inside and/or outside a virtual building represented by the BIM data in the data set (a route setting step); a step of generating a virtual image set of the virtual building arranged along the route, based on the prepared data set and the set route (a virtual image set generating step); and a step of creating an inference model, which can be used for identifying data of a building material from measured data of a building, by applying machine learning with training data that includes at least the generated virtual image set to a neural network (an inference model creating step). Note that any of these steps may include two or more sub-steps (the same applies below).

In the inference model creation method or technique according to the present aspect example, the route setting step may be executed to set a route such that the distance from the route to a virtual building material recorded in the BIM data belongs to a predetermined allowable range.

Further, in the inference model creation method or technique according to the present aspect example, the route setting step may be executed to set, as a route, any of a one dimensional area, a two dimensional area, and a three dimensional area.

In addition, in the inference model creation method or technique according to the present aspect example, the neural network used in the inference model creating step may include a convolutional neural network.

The present aspect example may provide a program that causes a computer to execute each of the data set preparing step, the route setting step, the virtual image set generating step, and the inference model creating step. For example, the computer may be a single computer or a computer system (i.e., a system including two or more computers) usable for photogrammetry of a building.

Furthermore, the present aspect example may provide a computer-readable non-transitory recording medium in which such a program is recorded. The non-transitory recording medium may be, for example, any of a magnetic disk, an optical disk, a magneto-optical disk, and a semiconductor memory.

The present aspect example may provide an inference model created through the data set preparing step, the route setting step, the virtual image set generating step, and the inference model creating step.

In addition, the present aspect example may provide a program that causes a computer to execute, using such an inference model, a process of identifying data of a building material from measured data of a building.

Further, the present aspect example may provide a computer-readable non-transitory recording medium in which such a program is recorded. The non-transitory recording medium may be, for example, any of a magnetic disk, an optical disk, a magneto-optical disk, and a semiconductor memory.

According to the present aspect example, an inference model trained with a virtual image set can be used to check the condition or state of each and every building material (e.g., columns, beams, walls, floors, ceilings, etc.) in building control operations or building management operations. As a result of this, for example, it becomes possible to save labor in checking whether each material included in the BIM data has actually been installed, and also to save labor in checking whether each material has appropriately been installed in its corresponding position. In addition, the present aspect example allows these tasks to be conducted using a learned model, it becomes unnecessary to assign workers with sufficient experience to each and every building site (construction site). Furthermore, since the information processing apparatus according to the present aspect example is configured to perform machine learning using a virtual image set, there is no need to collect a large number of images of actual buildings. This, in turn, can save the work of collecting training data and facilitate the collection of a large amount of training data. Therefore, the present aspect example makes it possible to improve the efficiency of building control or management from various perspectives or viewpoints.

Second Aspect Example

The second aspect example (and also the third aspect example) will give descriptions of some examples for creating an inference model by applying, to a neural network, machine learning that corresponds to both an installation date of a building material and a measurement date of a building. Here, the installation date of a building material may be the date on which the building material has actually been installed or a scheduled date on which the building material is to be installed, and the measurement date of a building may be the date on which measurement of the building has actually been conducted or a scheduled date on which measurement of the building is to be conducted.

Figure 4:
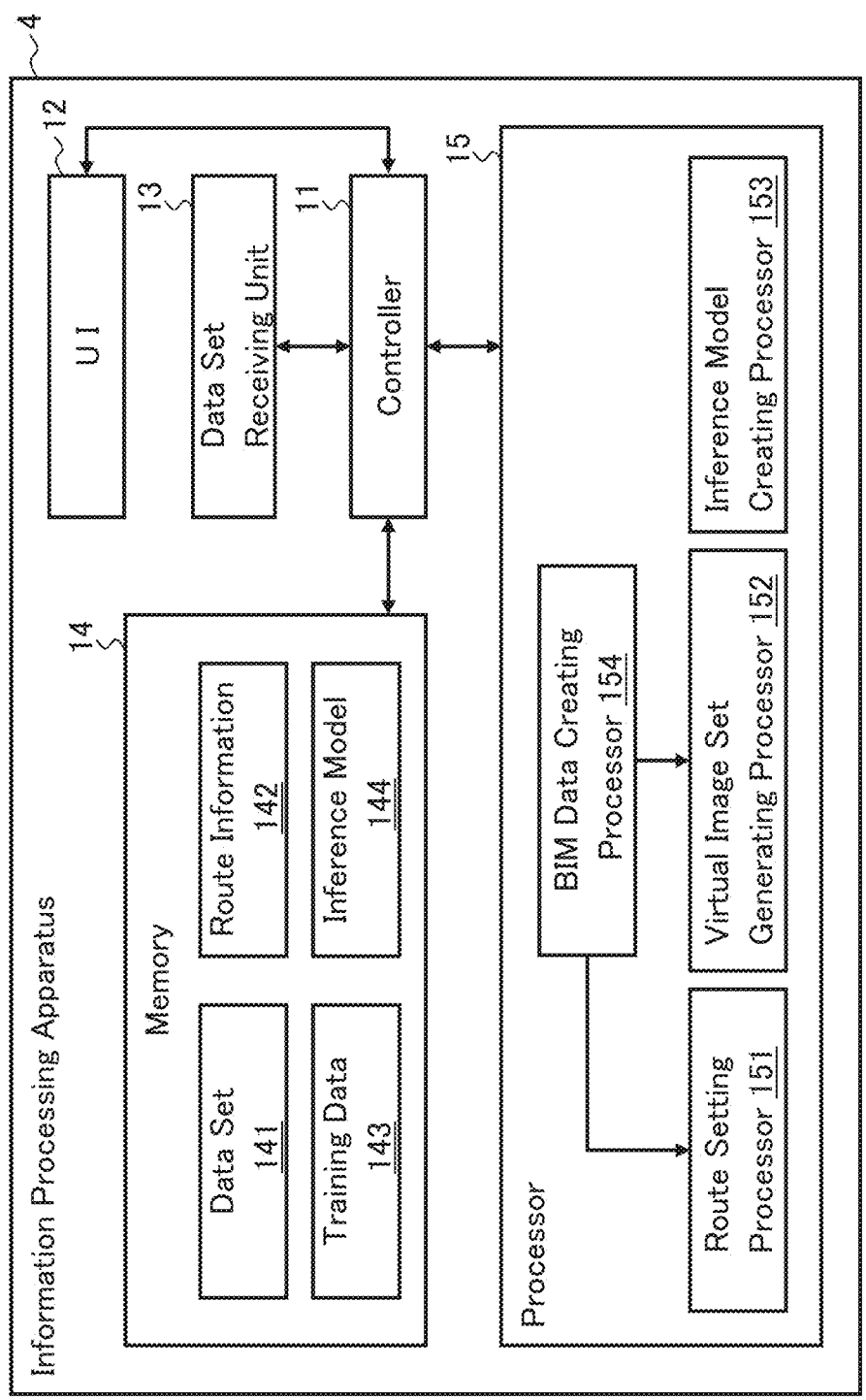
FIG. 4 is a schematic diagram showing an example of the configuration of the information processing apparatus according to some aspect examples.

FIG. 4 shows a configuration example of the information processing apparatus according to the second aspect example. The information processing apparatus 4 may be configured by adding the BIM data creating processor 154 to the processor 15 of the information processing apparatus 1 of the first aspect example, and may be configured to provide an output from the BIM data creating processor 154 to both the route setting processor 151 and the virtual image set generating processor 152. The BIM data creating processor 154 is implemented, for example, by the cooperation of hardware including a processor and a storage device, and BIM data creating software. Below, the descriptions of the elements common to the first aspect example will be omitted unless otherwise mentioned.

In addition to including the same BIM data as in the first aspect example, the data set 141 prepared in the present aspect example may further include installation date information (material installation date information) and measurement date information. The material installation date information indicates the installation dates for individual virtual building materials recorded in the BIM data, and the measurement date information indicates the measurement date of the building.

More specifically, the material installation date information indicates the date on which the physical material corresponding to a virtual material is installed at the building site or the construction site (e.g., actual installation date, or scheduled installation date). The material installation date information is obtained from a construction drawing, a working drawing, a working diagram, a construction document, a construction plan, a construction schedule, or the like, for example.

The measurement date information indicates the measurement date of the physical building. The measurement date information in the present aspect example indicates the date on which measurement is to be conducted in the future (i.e., scheduled measurement date). For example, the measurement date information in the present aspect example indicates the date on which next measurement will be carried out. It should be noted that the measurement of the physical building is carried out by using a building measurement system that includes a mobile object, a total station, a computer, and the like. The measurement date information is obtained from, for example, a construction document, a construction plan, a construction schedule, a control plan, a management plan, or the like.

The material installation date information and the measurement date information each may include at least information of year, month, and day, and may further include information of hour, minute, second, or the like. The information processing apparatus 4 (or an external system, etc.) may perform date conversion for representing both the material installation date information and the measurement date information in the same standard time in the case where the standard time of the place at which the building design is performed and the standard time of the place at which the physical building exists are different from each other.

The BIM data creating processor 154 is configured to create BIM data corresponding to a state in which only one or more virtual building materials whose installation dates are same as or earlier than the measurement date of interest are installed, based on the data set 141, that includes at least the BIM data, the material installation date information, and the measurement date information. The BIM data created here may be referred to as first BIM data herein.

For example, the BIM data creating processor 154 first compares the installation dates of virtual materials recorded in the BIM data in the data set 141 with the measurement date of interest, thereby selecting virtual materials whose installation dates are same as or earlier than the measurement date of interest from among the plurality of virtual materials recorded in the BIM data. Here, the virtual materials whose installation dates are same as or earlier than the measurement date of interest may be virtual materials whose installation dates are the same as the measurement date of interest or may be virtual materials whose installation dates are earlier than the measurement date of interest.

Next, the BIM data creating processor 154 creates the first BIM data that includes only the virtual material group selected as above. For example, the BIM data creating processor 154 may be configured to create the first BIM data that includes only the selected virtual material group, by deleting each unselected virtual material from the BIM data in the data set 141.

The first BIM data created in this way is BIM data corresponding to the arrangements of building materials on the measurement date of interest. The first BIM data is useful and effective for measurements of physical buildings under construction, for example.

The first BIM data created by the BIM data creating processor 154 is sent to both the route setting processor 151 and the virtual image set generating processor 152.

The route setting processor 151 of the present aspect example sets a route, which is arranged inside and/or outside a virtual building represented by the first BIM data, based on the first BIM data created by the BIM data creating processor 154. The route set based on the first BIM data may be referred to as the first route.

The first route determined in this way takes into account only the building materials will have been installed on the measurement date of interest. In other words, it can be said that the first route is a route optimized for the measurement works conducted on the measurement date of interest. This makes it possible to efficiently carry out the measurement works on the measurement date of interest.

The virtual image set generating processor 152 of the present aspect generates a virtual image set of the virtual building arranged along the first route, based on the first BIM data created by the BIM data creating processor 154 and the first route set based on the first BIM data by the route setting processor 151. The virtual image set generated based on the first BIM data and the first route may be referred to as the first virtual image set.

The inference model creating processor 153 of the present aspect example creates an inference model corresponding to the measurement date of interest, by applying machine learning to the neural network. The machine learning is executed using training data that includes at least the first virtual image set. The training data including at least the first virtual image set may be referred to as the first training data.

The first virtual image set consists of a plurality of virtual images that are arranged (located) along the first route optimized for the measurement works performed on the measurement date of interest. Performing machine learning using such a first virtual image set makes it possible to improve or enhance the performance of the inference model that will be used for controlling a mobile object on the measurement date of interest and analyzing measured data acquired on the measurement date of interest.

Some aspect examples may be configured to create an inference model corresponding to each of a plurality of future measurement dates. In other words, some aspect examples may be configured to prepare a plurality of inference models respectively corresponding to a plurality of measurement dates. In addition, some aspect examples may utilize a large number of virtual images obtained in the processes of preparing the plurality of inference models (i.e., a large number of virtual images for different measurement dates) for creating a corresponding inference model to each of the plurality of virtual images (i.e., for executing each machine learning). As a result of this, the number of pieces of training data may be increased. Furthermore, it becomes possible to cause the information processing apparatus 4 to learn material identification processing according to changes in the number of building materials, the positions of building materials, or the like.

As described above, the information processing apparatus 4 according to the present aspect example includes the BIM data creating processor 154, in addition to the elements of the first aspect example. Furthermore, the data set received by the data set receiving unit 13 further includes the installation date information that shows the installation dates of virtual building materials recorded in the BIM data, and the measurement date information that shows the measurement date of the building. The BIM data creating processor 154 is configured to create, based on the data set received by the data set receiving unit 13, the first BIM data corresponding to a state in which only one or more virtual building materials, whose installation dates are same as or earlier than the measurement date, are already installed. Further, the route setting processor 151 of the present aspect example is configured to set the first route based on the first BIM data thus created. Also, the virtual image set generating processor 152 of the present aspect example is configured to generate the first virtual image set based on the first BIM data and the first route. In addition to these, the inference model creating processor 153 of the present aspect example is configured to apply, to the neural network, machine learning with the first training data that includes at least the first virtual image set, thereby creating an inference model corresponding to the measurement date of interest.

In addition, the present aspect example may provide a method or technique of creating an inference model that can be used for photogrammetry of buildings. In this inference model creation method or technique, the data set preparing step is executed to prepare a data set that further includes installation date information that shows the installation dates of virtual building materials recorded in the BIM data, and measurement date information that shows a measurement date of a building. Further, the inference model creating step is executed to create an inference model by applying to the neural network machine learning corresponding to the installation date of interest and the measurement date of interest.

More specifically, the inference model creation method or technique of the present aspect example further includes the first BIM data creating step. The first BIM data creating step is executed to create the first BIM data corresponding to a state in which only one or more virtual building materials whose installation dates are same as or earlier than the measurement date of interest are installed, based on the data set prepared in the data set preparing step. Further, the route setting step of the present aspect example is executed to set the first route based on the first BIM data. Furthermore, the virtual image set generating step of the present aspect example is executed to generate the first virtual image set based on the first BIM data and the first route. In addition to these steps, the inference model creating step of the present aspect example is executed to create an inference model corresponding to the measurement date of interest, by applying machine learning with the first training data that includes at least the first virtual image set to the neural network.

The present aspect example may provide a program that causes a computer to execute each of the data set preparing step, the first BIM data creating step, the route setting step, the virtual image set generating step, and the inference model creating step. For example, the computer may be a single computer or a computer system (i.e., a system including two or more computers) usable for photogrammetry of a building.

Further, the present aspect example may provide a computer-readable non-transitory recording medium in which such a program is recorded. The non-transitory recording medium may be, for example, any of a magnetic disk, an optical disk, a magneto-optical disk, and a semiconductor memory.

The present aspect example may provide an inference model created through the data set preparing step, the first BIM data creating step, the route setting step, the virtual image set generating step, and the inference model creating step.

Furthermore, the present aspect example may provide a program that causes a computer to execute a process of identifying data of a building material from measured data of a building using such an inference model.

In addition, the present aspect example may provide a computer-readable non-transitory recording medium that records such a program. The non-transitory recording medium may be, for example, any of a magnetic disk, an optical disk, a magneto-optical disk, and a semiconductor memory.

As described above, according to the present aspect example, an optimum measurement route for the measurement works performed on the measurement date of the building can be determined based on the BIM data corresponding to the arrangements of the building materials on the measurement date. In addition, the present aspect example is capable of generating an optimum virtual image set arranged along the optimum route determined, and also of creating an inference model optimized for the measurement date by performing machine learning with the optimum virtual image set. Therefore, the measurement works on the building measurement date and the processing of the measured data acquired by the measurement on the measurement date can be performed in an appropriate manner.

Third Aspect Example

In the second aspect example described above, the BIM data created by the BIM data creating processor 154 (the first BIM data) is used by both the route setting processor 151 and the virtual image set generating processor 152. On the other hand, in the third aspect example described below, the BIM data created by the BIM data creating processor 154 is used only by the virtual image set generating processor 152. The BIM data created by the BIM data creating processor 154 of the present aspect example may be referred to as the second BIM data.

To be more specific, the present aspect example is configured to generate a virtual image set from the BIM data corresponding to the arrangements of building materials on the measurement date of interest, but perform a process of setting a route regardless of the measurement date. For example, the route of the present aspect example may be a route determined based on the BIM data in the data set 141 received by the data set receiving unit 13, as in the first aspect example. Alternatively, the route of the present aspect example may be a route determined for a certain measurement date.

Figure 5:
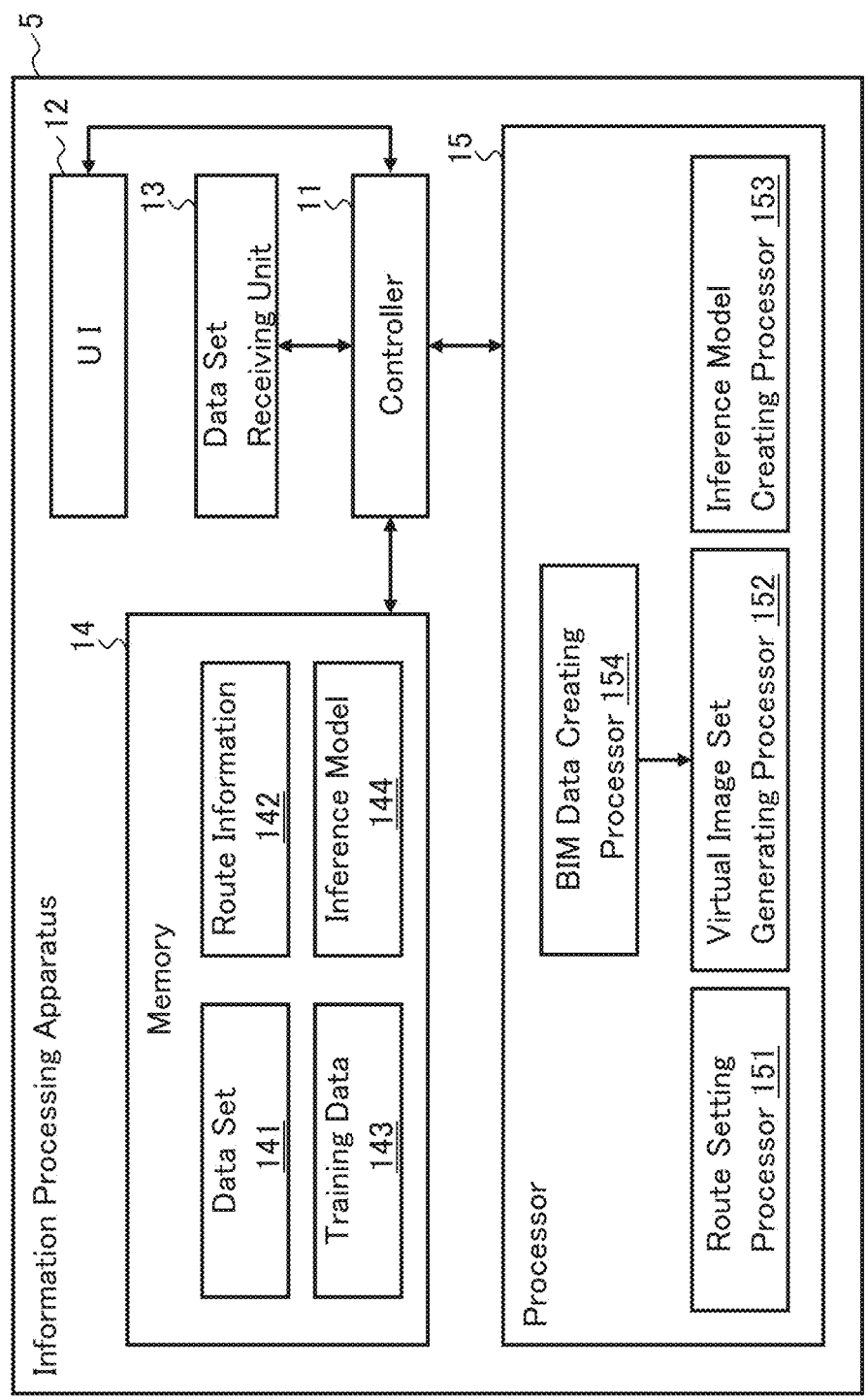
FIG. 5 is a schematic diagram showing an example of the configuration of the information processing apparatus according to some aspect examples.

FIG. 5 shows a configuration example of the information processing apparatus according to the present aspect example. The information processing apparatus 5 may be configured by adding the BIM data creating processor 154 to the processor 15 of the information processing apparatus 1 of the first aspect example, and may be configured to provide output from the BIM data creating processor 154 only to the virtual image set generating processor 152.

As with the second aspect example, the data set 141 prepared in the present aspect example includes the same BIM data as in the first aspect example, and further includes the installation date information (the material installation date information) indicating the installation dates for respective virtual building materials recorded in the BIM data, and the measurement date information indicating the measurement date of the building.

The BIM data creating processor 154 has the same function and configuration as the second aspect example, and is configured to create BIM data (the second BIM data) corresponding to a state in which only one or more virtual building materials whose installation dates are same as or earlier than the measurement date of interest are installed, based on the data set 141 that includes at least the BIM data, the material installation date information, and the measurement date information. The second BIM data thus created is BIM data corresponding to the arrangements of building materials on the measurement date of interest. The second BIM data created by the BIM data creating processor 154 is sent to the virtual image set generating processor 152.

As described above, the route setting processor 151 of the present aspect example determines a route based on the BIM data in the data set 141 as in the first aspect example, for example. Alternatively, the present aspect example may use a route already set for a certain measurement date.

The virtual image set generating processor 152 of the present aspect example generates, based on the second BIM data created by the BIM data creating processor 154 and the route set by the route setting processor 151, a virtual image set of the virtual building arranged along the route determined. The virtual image set generated based on the second BIM data may be referred to as the second virtual image set herein.

The inference model creating processor 153 of the present aspect example creates an inference model corresponding to the measurement date of interest, by applying machine learning with training data that includes at least the second virtual image set generated in the manner described thus far to the neural network. The training data that includes at least the second virtual image set may be referred to as the second training data.

As described above, the information processing apparatus 5 according to the present aspect example includes the BIM data creating processor 154 in addition to the elements of the first aspect example. Furthermore, the data set received by the data set receiving unit 13 further includes the installation date information that shows the installation date of a virtual building material recorded in the BIM data, and the measurement date information that shows a measurement date of a building. The BIM data creating processor 154 is configured to create the second BIM data corresponding to a state in which only one or more virtual building materials whose installation dates are same as or earlier than the measurement date of interest are installed, based on the data set received by the data set receiving unit 13. Further, the virtual image set generating processor 152 of the present aspect example is configured to generate the second virtual image set based on the second BIM data and a route determined based on other one or more pieces of BIM data. In addition to these, the inference model creating processor 153 of the present aspect example is configured to create an inference model corresponding to the measurement date of the interest, by applying machine learning with the second training data that includes at least the second virtual image set to the neural network.

In addition, the present aspect example may provide a method or technique of creating an inference model that can be used for photogrammetry of a building. In the inference model creation method or technique, the data set prepared by the data set preparing step further includes the installation date information that shows the installation date of a virtual building material recorded in the BIM data, and the measurement date information that shows a measurement date of a building. Further, the inference model creating step is executed to create an inference model by applying machine learning corresponding to both the installation date and the measurement date to the neural network.

More specifically, the inference model creation method or technique of the present aspect example may further include the second BIM data creating step. The second BIM data creating step is executed to create the second BIM data corresponding to a state in which only one or more virtual building materials whose installation dates are same as or earlier than the building measurement date are installed, based on the data set prepared in the data set preparing step. Furthermore, the virtual image set generating step of the present aspect example is executed to generate the second virtual image set based on the second BIM data and the route set based on other one or more pieces of BIM data. In addition to these steps, the inference model creating step of the present aspect example is executed to create an inference model corresponding to the measurement date of interest, by applying machine learning with the second training data that includes at least the second virtual image set to the neural network.

The present aspect example may provide a program that causes a computer to execute each of the data set preparing step, the second BIM data creating step, the route setting step, the virtual image set generating step, and the inference model creating step. For example, the computer may be a single computer or a computer system (i.e., a system including two or more computers) usable for photogrammetry of a building.

Further, the present aspect example may provide a computer-readable non-transitory recording medium that records such a program. The non-transitory recording medium may be, for example, any of a magnetic disk, an optical disk, a magneto-optical disk, and a semiconductor memory.

The present aspect example may provide an inference model created through the data set preparing step, the second BIM data creating step, the route setting step, the virtual image set generating step, and the inference model creating step.

Furthermore, the present aspect example may provide a program that causes a computer to execute a process of identifying data of a building material from measured data of a building using such an inference model.

In addition, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example, while the optimization of a measurement route as in the second aspect example is not made, machine learning can be performed with a virtual image set generated based on the BIM data corresponding to the arrangements of building materials on the measurement date of interest. Therefore, the present aspect example makes possible to create a suitable inference model for the date on which the building will be measured.

Figure 6:
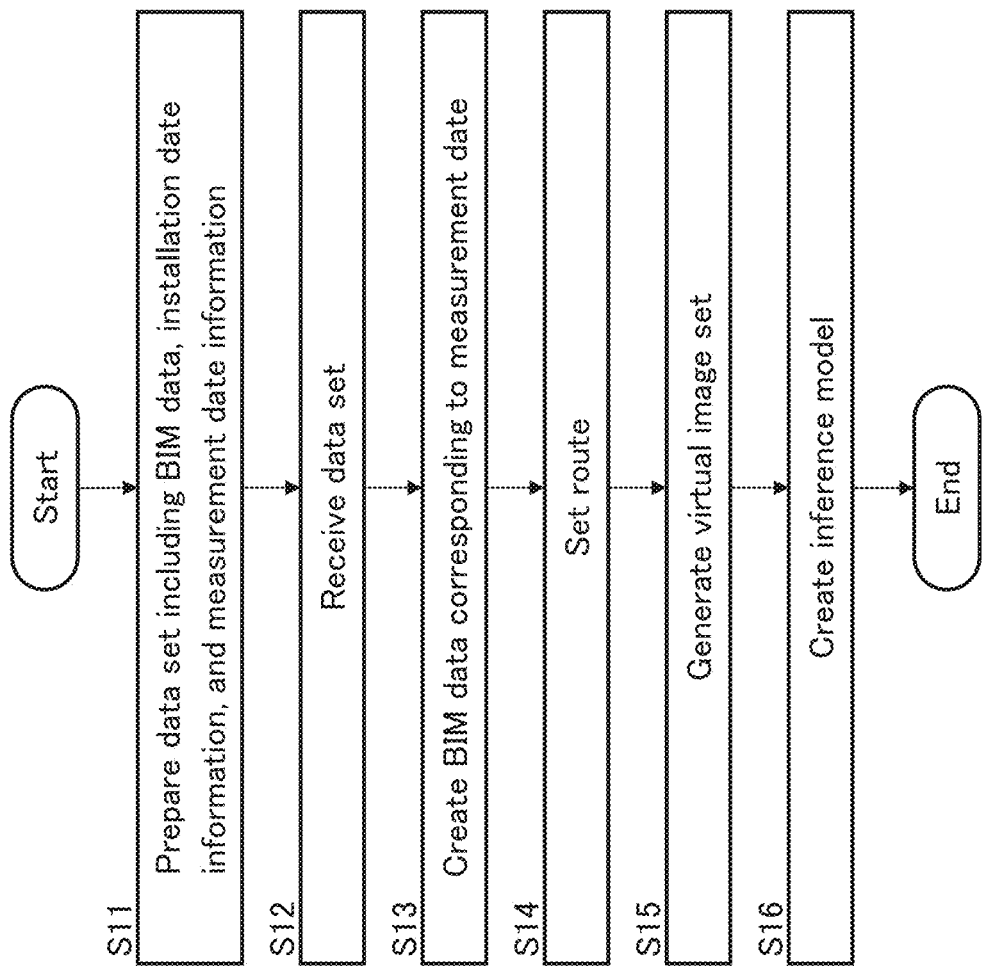
FIG. 6 is a flowchart showing an example of the operation of the information processing apparatus according to some aspect examples.

The second aspect example utilizes the BIM data corresponding to the measurement date in both the route setting process and the virtual image set generation process, and the third aspect example utilizes the BIM data corresponding to the measurement date only in the virtual image set generation process. On the other hand, some aspect examples may be configured to utilize the BIM data corresponding to the measurement date only in the route setting process. FIG. 6 shows an example of these operations.

To begin with, a data set is prepared which includes at least the BIM data, the installation date information, and the measurement date information (S11). The preparation of the data set may be made automatically and/or manually, using a computer such as a cloud computer, for example.

Then, the information processing apparatus 4 or 5 receives the data set prepared in the step S11, by the data set receiving unit 13 (S12). The data set received is saved in the memory 14 by the controller 11 (the data set 141).

Subsequently, the BIM data creating processor 154 creates BIM data corresponding to a state in which only one or more virtual building materials whose installation dates are same as or earlier than the measurement date are installed, based on the data set 141 received in the step S12 (S13). The BIM data created in the step S13 is referred to as measurement date corresponding BIM data. The measurement date corresponding BIM data is saved in the memory 14 by the controller 11 (the data set 141).

Next, the route setting processor 151 determines a route, which is arranged inside and/or outside a virtual building, based on the BIM data received in the step S12 or based on the measurement date corresponding BIM data created in the step S13, for example (S14). Information representing the determined route is saved in the memory 14 by the controller 11 (the route information 142).

Following the above, the virtual image set generating processor 152 generates a virtual image set, based on the BIM data received in the step S12 or the measurement date corresponding BIM data created in the step S13, and also on the route set in the step S14 (S15). The virtual image set generated is saved (along with other data) in the memory 14 by the controller 11 (the training data 143).

Subsequently, the inference model creating processor 153 creates an inference model by applying machine learning with the training data 143 that includes at least the virtual image set generated in the step S15 to the neural network (S16). The inference model created is saved in the memory 14 by the controller 11 (the inference model 144) (End).

Fourth Aspect Example

Figure 7:
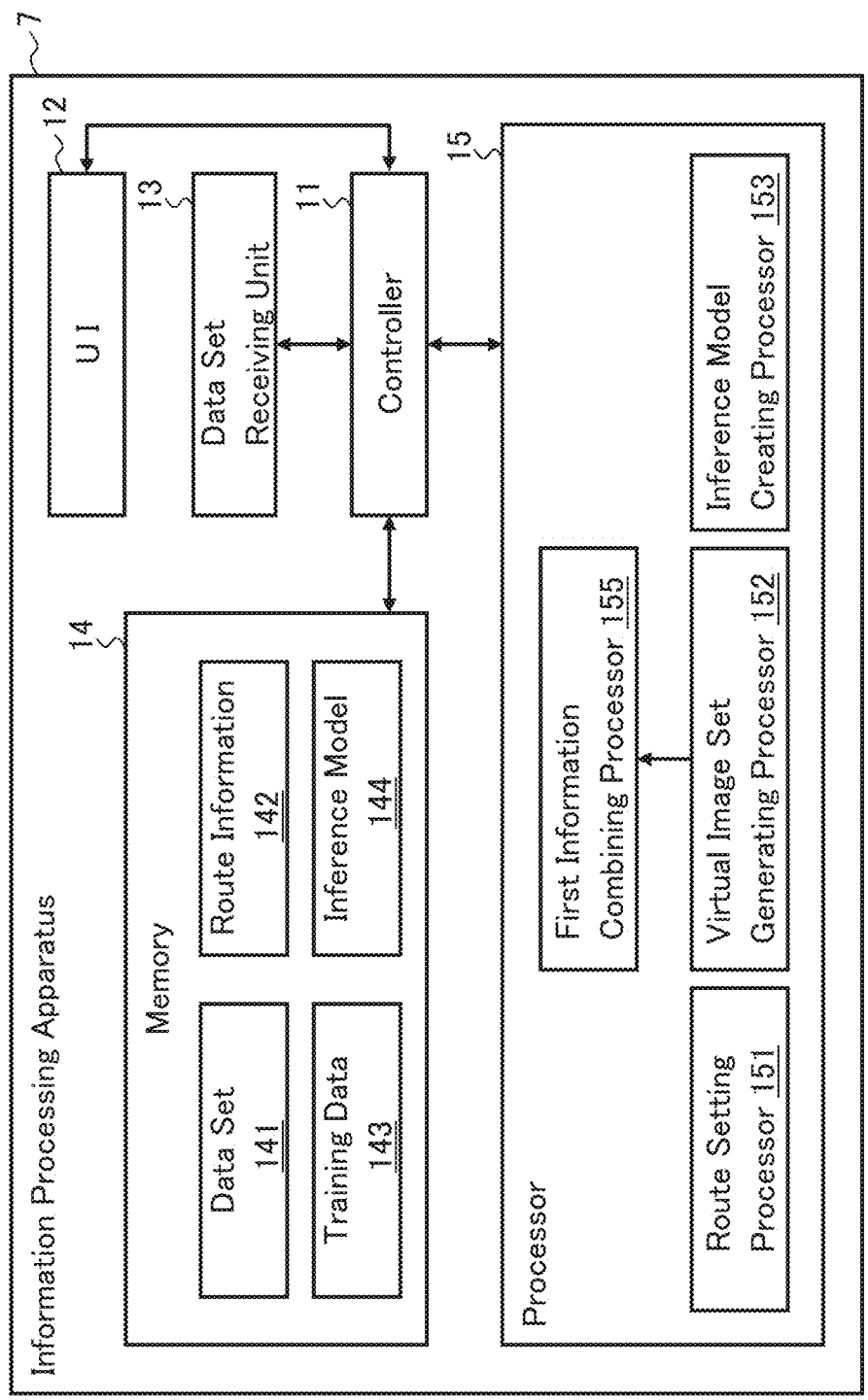
FIG. 7 is a schematic diagram showing an example of the configuration of the information processing apparatus according to some aspect examples.

FIG. 7 shows a configuration example of the information processing apparatus according to the fourth aspect example. The information processing apparatus 7 may be configured by adding the first information combining processor 155 to the processor 15 of the information processing apparatus 1 of the first aspect example. The first information combining processor 155 is implemented, for example, by the cooperation of hardware including a processor and a storage device, and first information combining software. Below, the description of the elements common to the first aspect example will be omitted unless otherwise mentioned.

The information processing apparatus 7 of the present aspect example is configured to take account of the texture of a building material. The texture is a parameter that indicates the state of the surface of an object. Examples of the texture may include a parameter representing a color of an object surface, a parameter representing brightness of an object surface, and a parameter representing the degree of homogeneity (e.g., fine asperities) of an object surface. The texture of the present aspect example represents the surface state of a building material according to raw material, material, ingredient, constituent, substance, surface finish, or the like. The texture may be identified or determined by the type of raw material, material, ingredient, constituent, substance, surface finish, or the like.

A data set prepared in the present aspect example includes, in addition to the same BIM data as in the first aspect example, texture information that represents a state of a surface of a material of the virtual building (a state of a surface of a virtual building material). The data set receiving unit 13 receives the data set that includes at least the BIM data and the texture information. The data set received is saved in the memory 14 by the controller 11 (the data set 141).

The first information combining processor 155 is configured to combine the texture information in the data set 141 with a virtual image set generated based on the data set 141 and the route information 142 by the virtual image set generating processor 152. The information thus generated may be referred to as the first combined information. The first combined information generated is saved in the memory 14 by the controller 11 (the training data 143).

For example, the first information combining processor 155 may be configured to check the position (three dimensional coordinates) of a virtual material in the BIM data and the three dimensional coordinates in a virtual image generated from the BIM data against each other. By performing this process, the first information combining processor 155 can identify the position in the virtual image that corresponds to the position of the virtual material of interest in the BIM data. Stated differently, the first information combining processor 155 performs an association between the virtual materials in the BIM data and the virtual materials in the virtual image. Further, the first information combining processor 155 assigns the texture information of the virtual material of interest in the BIM data to the virtual material in the virtual image corresponding to the virtual material of interest in the BIM data. In the case where a single virtual material in the BIM data is depicted (photographed) in two or more virtual images, the first information combining processor 155 may assign the texture information of the virtual image of interest to each of the two or more corresponding virtual images in the two or more respective virtual images. The virtual image set and the texture information are combined (synthesized, composed) in this way, thereby generating the first combined information.

The inference model creating processor 153 of the present aspect example is configured to apply, to the neural network, machine learning with the training data 143 that includes at least the first combined information generated from the virtual image set and the texture information. As a consequence, an inference model that can be used for identifying data of a building material from measured data of a building, is created.

Figure 8:
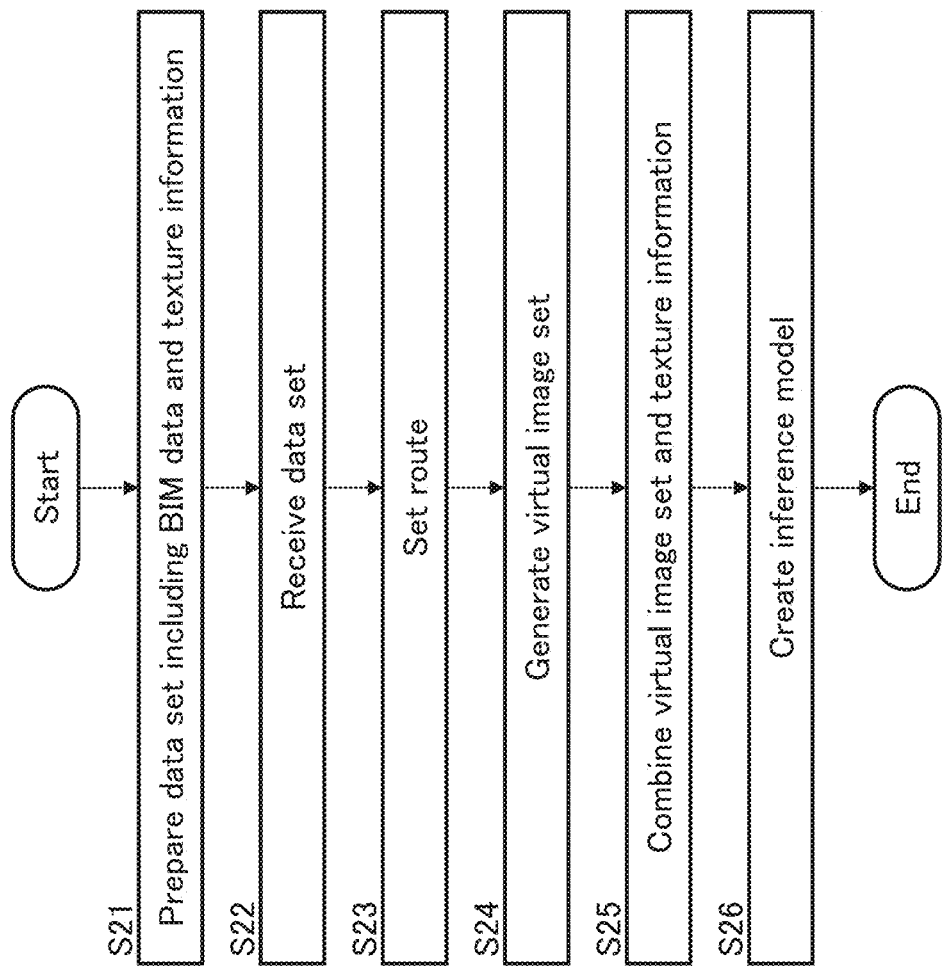
FIG. 8 is a flowchart showing an example of the operation of the information processing apparatus according to some aspect examples.

A description will be given of the operation of the information processing apparatus 7 according to the present aspect example. FIG. 8 shows an example of the operation of the information processing apparatus 7.

To begin with, a data set that includes at least the BIM data and the texture information is prepared (S21). The preparation of the data set may be made automatically and/or manually, using a computer such as a cloud computer, for example.

Then, the information processing apparatus 7 receives the data set prepared in the step S21, by the data set receiving unit 13 (S22). The data set received is saved in the memory 14 by the controller 11 (the data set 141).

Subsequently, the route setting processor 151 sets a route, which is arranged inside and/or outside a virtual building represented by the BIM data in the data set 141, based on the data set 141 received in the step S22 (S23). Information representing the route determined is saved in the memory 14 by the controller 11 (the route information 142).

Following the above, the virtual image set generating processor 152 generates a virtual image set of the virtual building represented by the BIM data in the data set 141 arranged along the route set in the step S23, based on the data set 141 and the route information 142 (S24). The virtual image set generated is sent to the first information combining processor 155.

Next, the first information combining processor 155 generates the first combined information by combining the virtual image set generated in the step S24 with the texture information in the data set 141 received in the step S22 (S25). The first combined information generated is saved (along with other data) in the memory 14 by the controller 11 (the training data 143).

Subsequently, the inference model creating processor 153 creates an inference model, which can be used for identifying data of a building material from measured data of a building, by applying machine learning with the training data 143 that includes at least the first combined information (i.e., combined (composed, synthesized) information of the virtual image set and the texture information) generated in the step S25 to the neural network (S26). The inference model created is saved in the memory 14 by the controller 11 (the inference model 144) (End).

As described above, the information processing apparatus 7 according to the present aspect example includes the first information combining processor 155 in addition to the elements of the first aspect example. Furthermore, in addition to the BIM data, the data set 141 includes the texture information that represents the states of the surfaces of one or more virtual building materials. The first information combining processor 155 is configured to generate the first combined information by combining (composing, synthesizing) the texture information included in the data set 141 with the virtual image set generated by the virtual image set generating processor 152. Further, the inference model creating processor 153 is configured to create an inference model by applying to the neural network machine learning with the training data 143 that includes at least the first combined information generated by the first information combining processor 155.

In addition to the above, the present aspect example may provide a method or technique of creating an inference model that can be used for photogrammetry of a building. In the inference model creation method or technique, the data set prepared in the data set preparing step is executed to prepare a data set that includes BIM data and texture information representing the states of the surfaces of one or more virtual building materials. The inference model creation method or technique of the present aspect example further includes a step of combining the texture information with the virtual image set to generate the first combined information (the first combining step). The inference model creating step is executed to create an inference model by applying machine learning with training data that includes at least the first combined information generated in the first combining step to the neural network.

The present aspect example may provide a program that causes a computer to execute each of the data set preparing step, the route setting step, the virtual image set generating step, the first combining step, and the inference model creating step. For example, the computer may be a single computer or a computer system (i.e., a system including two or more computers) usable for photogrammetry of a building.

Further, the present aspect example may provide a computer-readable non-transitory recording medium that records such a program. The non-transitory recording medium may be, for example, any of a magnetic disk, an optical disk, a magneto-optical disk, and a semiconductor memory.

The present aspect example may provide an inference model created through the data set preparing step, the route setting step, the virtual image set generating step, the first combining step, and the inference model creating step.

Further, the present aspect example may provide a program that causes a computer to execute a process of identifying data of a building material from measured data of a building using such an inference model.

Further, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example, machine learning can be performed with the texture information of a building material. The inference model created in this way is configured to extract a feature of a surface state (texture) of an object represented in measured data of a building, and to identify data of a building material in consideration of the texture feature extracted. Using such an inference model makes it possible to improve the precision and accuracy of the building material data identifying process in comparison to the case where texture is not taken into account when creating an inference model.

Fifth Aspect Example

Figure 9:
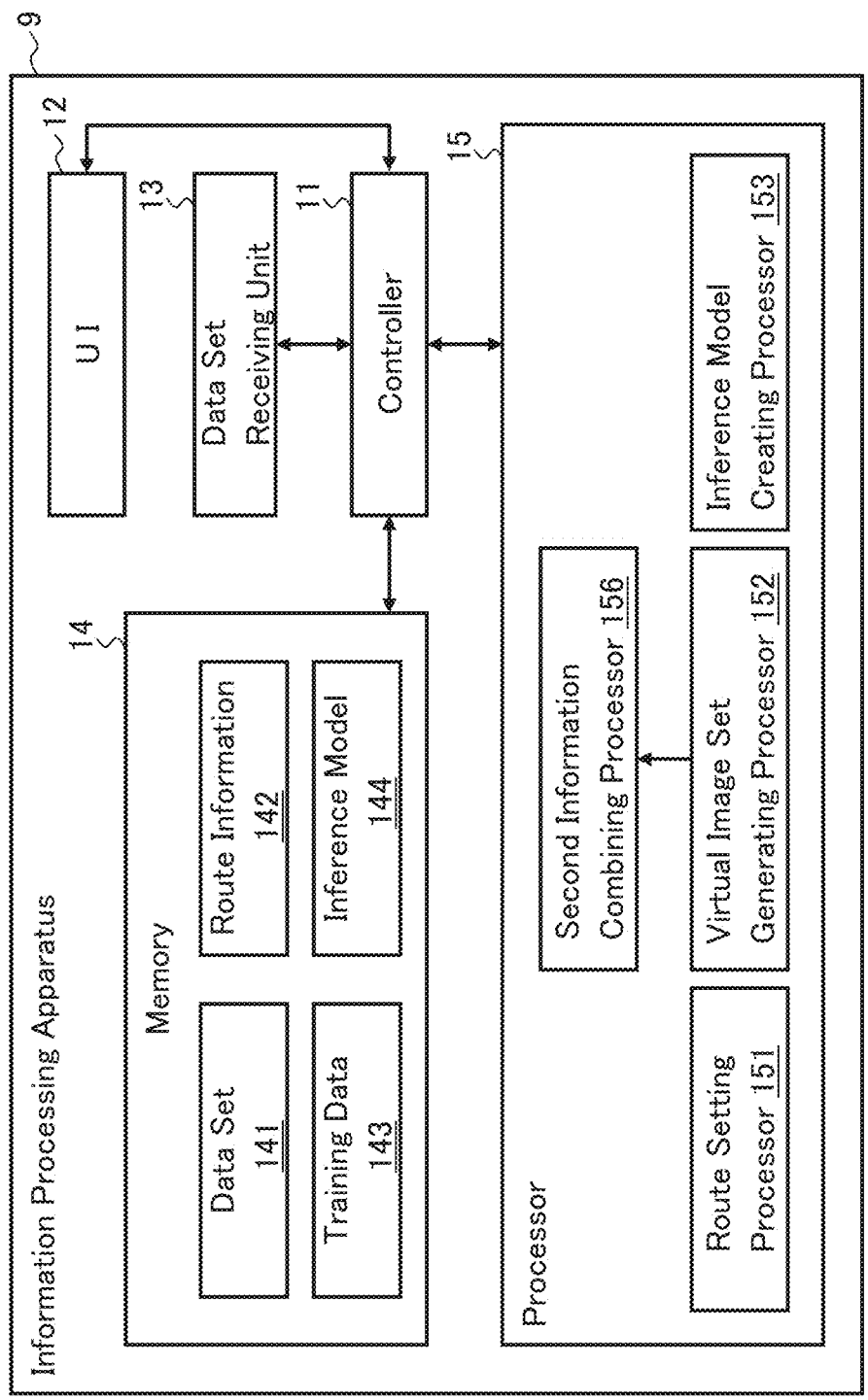
FIG. 9 is a schematic diagram showing an example of the configuration of the information processing apparatus according to some aspect examples.

FIG. 9 shows a configuration example of the information processing apparatus according to the fifth aspect example. The information processing apparatus 9 may be configured by adding the second information combining processor 156 to the processor 15 of the information processing apparatus 1 of the first aspect example. The second information combining processor 156 is implemented, for example, by the cooperation of hardware including a processor and a storage device, and second information combining software. Below, the description of the elements common to the first aspect example will be omitted unless otherwise mentioned.

The present aspect example takes into account an object (obstacle) that hinders measurement of a building. In other words, the present aspect example refers to information relating to an obstacle that may be present at the construction site when the measurement of the building takes place. Examples of the obstacle include a tool such as a ladder and a stepladder, a worker, a device and equipment used for building measurement such as a mobile object, a total station and a computer, and the like.

A data set prepared in the present aspect example includes obstacle information that represent obstacles in addition to the same BIM data as in the first aspect example. The data set receiving unit 13 receives the data set that includes at least the BIM data and the obstacle information. The data set received is saved in the memory 14 by the controller 11 (the data set 141).

The obstacle information includes, for example, a photographed image of an obstacle and scan data of an obstacle. To be more specific, the obstacle information may include a photographed image and/or scan data of a tool such as a ladder, a stepladder, or the like, a photographed image and/or scan data of a worker at a building site or a construction site, and the like.

The second information combining processor 156 is configured to combine the obstacle information in the data set 141 with a virtual image set generated based on the data set 141 and the route information 142 by the virtual image set generating processor 152. The information thus generated may be referred to as the second combined information. The second combined information generated is saved in the memory 14 by the controller 11 (the training data 143).

For example, the second information combining processor 156 may generate the second combined information by embedding obstacle information, such as a photographed image of an obstacle, in a virtual image. This yields a virtual image set in which obstacle information is embedded in various locations or positions (the second combined information). The embedding location or position of the obstacle information is determined based on a photographed image of an actual building site or construction site, for example.

The inference model creating processor 153 of the present aspect example is configured to apply machine learning with the training data 143, which includes at least the second combined information generated from the virtual image set and the obstacle information, to the neural network. As a consequence, an inference model that can be used for identifying data of a building material from measured data of a building, is created.

Figure 10:
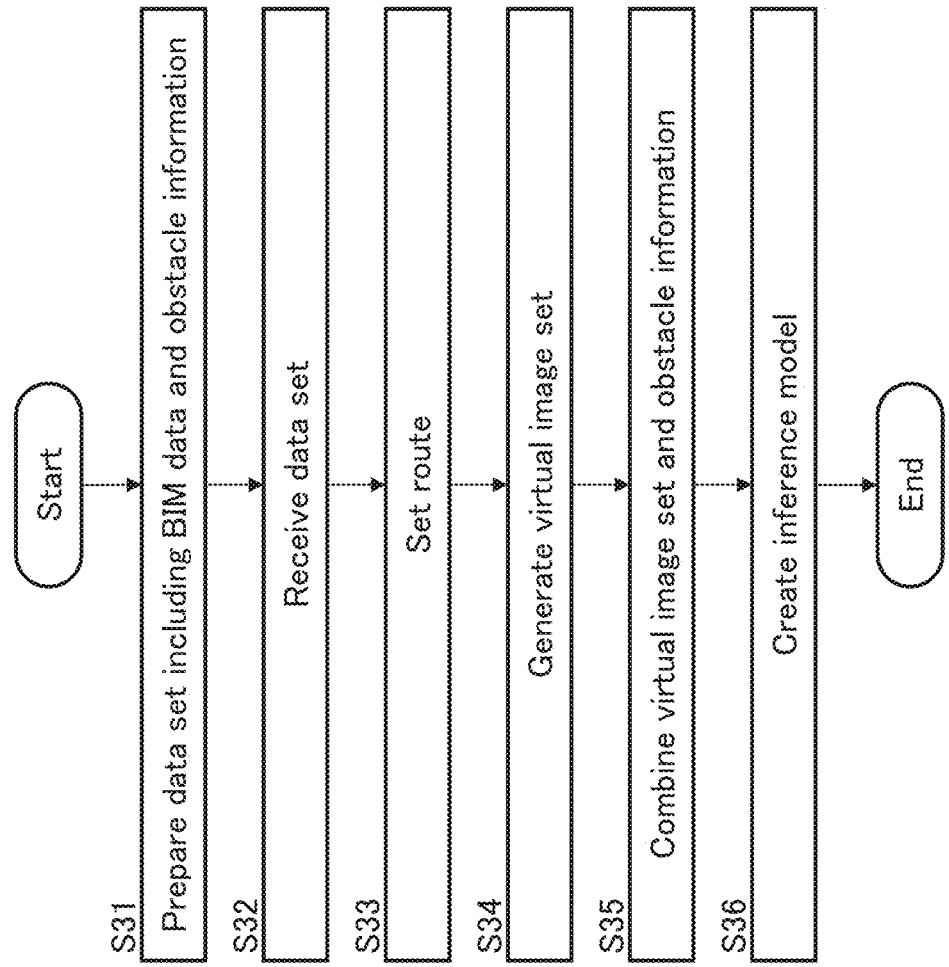
FIG. 10 is a flowchart showing an example of the operation of the information processing apparatus according to some aspect examples.

A description will be given of the operation of the information processing apparatus 9 according to the present aspect example. FIG. 10 shows an example of the operation of the information processing apparatus 9.

To begin with, a data set that includes at least the BIM data and the obstacle information is prepared (S31). The preparation of the data set may be made automatically and/or manually, using a computer such as a cloud computer, for example.

Then, the information processing apparatus 9 receives the data set prepared in the step S31, by the data set receiving unit 13 (S32). The data set received is saved in the memory 14 by the controller 11 (the data set 141).

Subsequently, the route setting processor 151 sets a route, which is arranged inside and/or outside a virtual building represented by the BIM data in the data set 141, based on the data set 141 received in the step S32 (S33). Information representing the route determined is saved in the memory 14 by the controller 11 (the route information 142).

Following the above, the virtual image set generating processor 152 generates a virtual image set of the virtual building represented by the BIM data in the data set 141 arranged along the route set in the step S33, based on the data set 141 and the route information 142 (S34). The virtual image set generated is sent to the second information combining processor 156.

Next, the second information combining processor 156 generates the second combined information by combining the virtual image set generated in the step S34 with the obstacle information in the data set 141 received in the step S32 (S35). The second combined information generated is saved (along with other data) in the memory 14 by the controller 11 (the training data 143).

Subsequently, the inference model creating processor 153 creates an inference model, which can be used for identifying data of a building material from measured data of a building, by applying machine learning with the training data 143 that includes at least the second combined information (the combined information of the virtual image set and the obstacle information) generated in the step S35 to the neural network (S36). The inference model created is saved in the memory 14 by the controller 11 (the inference model 144) (End).

As described above, the information processing apparatus 9 according to the present aspect example includes the second information combining processor 156 in addition to the elements of the first aspect example. Further, the data set 141 includes the obstacle information in addition to the BIM data. The second information combining processor 156 is configured to generate the second combined information by combining the obstacle information included in the data set 141 with the virtual image set generated by the virtual image set generating processor 152. Furthermore, the inference model creating processor 153 is configured to create an inference model by applying machine learning with the training data 143 that includes at least the second combined information generated by the second information combining processor 156 to the neural network.

In addition, the present aspect example may provide a method or technique of creating an inference model that can be used for photogrammetry of a building. In the inference model creation method or technique, the data set preparing step is executed to prepare a data set that includes the BIM data and the obstacle information. The inference model creation method or technique of the present aspect example further includes a step of combining the obstacle information with the virtual image set to generate the second combined information (the second combining step). The inference model creating step is executed to create an inference model by applying machine learning with training data that includes at least the second combined information generated in the second combining step to the neural network.

The present aspect example may provide a program that causes a computer to execute each of the data set preparing step, the route setting step, the virtual image set generating step, the second combining step, and the inference model creating step. For example, the computer may be a single computer or a computer system (i.e., a system including two or more computers) usable for photogrammetry of a building.

Further, the present aspect example may provide a computer-readable non-transitory recording medium that records such a program. The non-transitory recording medium may be, for example, any of a magnetic disk, an optical disk, a magneto-optical disk, and a semiconductor memory.

The present aspect example may provide an inference model created through the data set preparing step, the route setting step, the virtual image set generating step, the second combining step, and the inference model creating step.

Further, the present aspect example may provide a program that causes a computer to execute a process of identifying data of a building material from measured data of a building using such an inference model.

Further, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example, machine learning can be performed with the obstacle information. The inference model created in this way is configured to extract a feature of an obstacle mixed in measured data of a building, and to identify data of a building material in consideration of the obstacle feature extracted. Using such an inference model makes it possible to improve the precision and accuracy of the building material data identifying process in comparison to the case where obstacles are not taken into account when creating an inference model.

For example, the present aspect example uses, as training data, a virtual image set in which a photographed image of an object other than building materials and a photographed image of a person are combined (composed, synthesized, superimposed). Therefore, in the case where a data region corresponding to an obstacle is mixed in measured data of a building (e.g., a photographed image, scan data, point cloud data, etc.), the present aspect example is capable of performing training on an inference model to detect the obstacle data region by using such training data. Such machine learning makes it possible for an information processing apparatus to control the mobile object to avoid or dodge obstacles. In addition, such machine learning makes it possible for an information processing apparatus to analyze measured data of a building to identify and exclude data corresponding to obstacles when creating BIM data from the measured data.

Sixth Aspect Example

Figure 11:
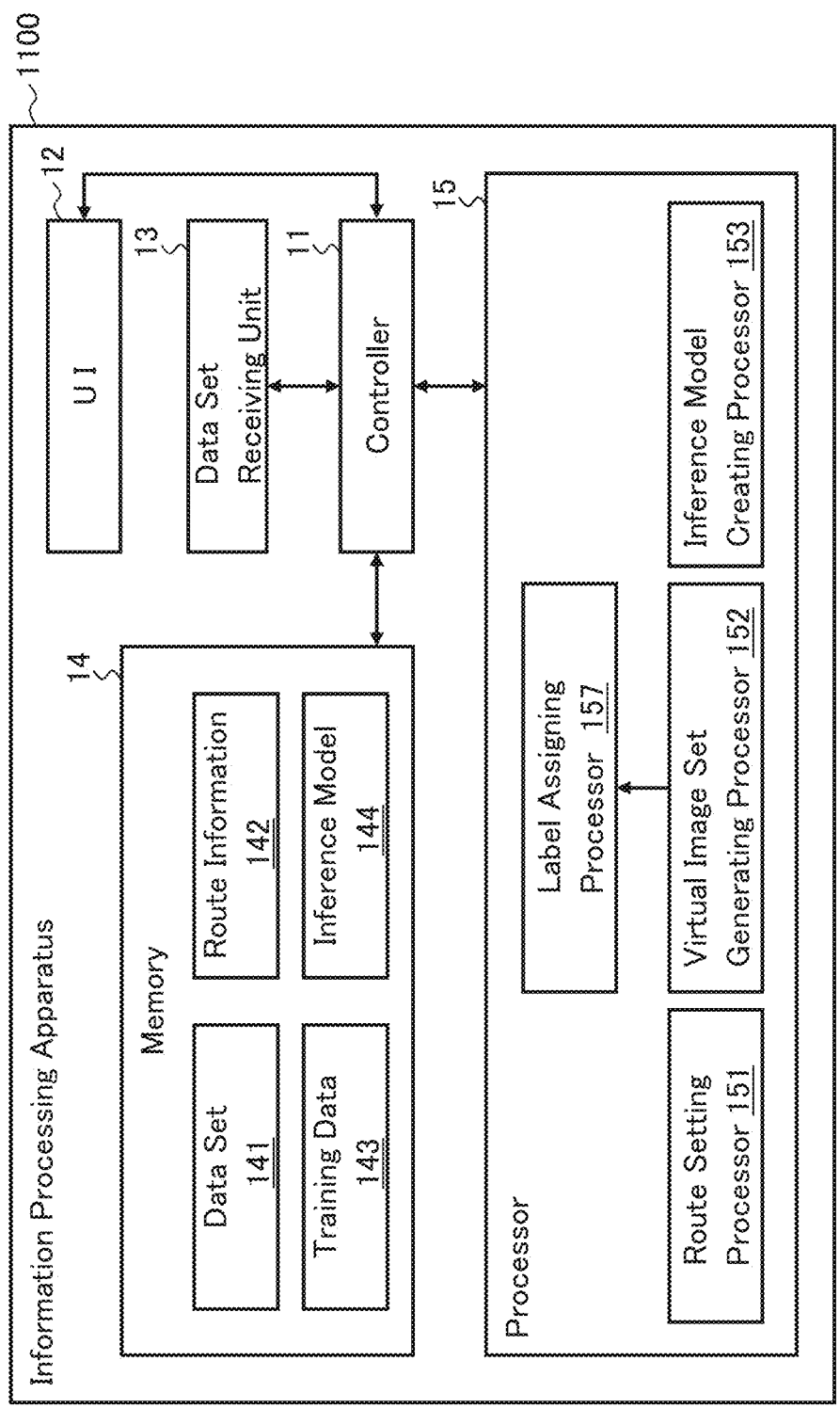
FIG. 11 is a schematic diagram showing an example of the configuration of the information processing apparatus according to some aspect examples.

FIG. 11 shows a configuration example of the information processing apparatus according to the sixth aspect example. The information processing apparatus 1100 may be configured by adding the label assigning processor 157 to the processor 15 of the information processing apparatus 1 of the first aspect example. The label assigning processor 157 is implemented, for example, by the cooperation of hardware including a processor and a storage device, and label assigning software. Below, the description of the elements common to the first aspect example will be omitted unless otherwise mentioned.

The present aspect example is employed when supervised learning is used for inference model creation. In supervised learning, pairs of data and a label (correct answer label) are prepared, and parameter adjustment is performed by comparing an output of the neural network in response to input data with a label. The present aspect example has a function of assigning a label to data. Stated differently, the present aspect example creates training data for supervised learning.

The label assigning processor 157 is configured to assign a label relating to a virtual building material recorded in the BIM data in the data set 141, to the virtual image set generated by the virtual image set generating processor 152.

Examples of the label include types of building materials. The types of building materials may include, for example, columns, beams, walls, slabs, roofs, foundations, windows, doors, stairs, tiles, floorings, various kinds of parts, various kinds of machines, various kinds of devices or equipment, various kinds of facilities, and the like. Further, the label may include information that represents the texture of a building material.

Another example of the category of the label is types of obstacles. The types of obstacles may include, for example, a tool such as a ladder and a stepladder, a worker, a device and equipment used for building measurement such as a mobile object, a total station and a computer, and the like.

The label assigning (or, labeling, annotation, or the like) in the present aspect example may be executed manually or automatically. Further, the cooperation of manual annotation and automatic annotation may be possible and/or switching between manual annotation and automatic annotation may be possible.

In the case where manual annotation is employed, the label assigning processor 157 operates together with the controller 11 to display a GUI for annotation tasks on the user interface 12, for example. The annotation GUI displays, for example, a virtual image and a software key. The label assigning processor 157 is configured to assign a label entered using the software key, to a corresponding virtual image.

For example, the user observes a virtual image displayed and designates an image region corresponding to a building material. The user further designates the type of the building material. The user performs these designation operations using the user interface 12. The label assigning processor 157 assigns to the image region designated, the type of the building material designated. As a result of such an assigning process, a label that represents the type of the building material is assigned to the virtual image. It should be noted that the label assigning processor 157 may assign a plurality of labels to a single virtual image. For example, the label assigning processor 157 may assign, to each of different image regions in a single virtual image, a label that represents the type of a corresponding building material. In addition to this, the label assigning processor 157 may assign, to a single image region in a single virtual image, both a label that represents the type of a corresponding building material and a label that represents the texture of the corresponding building material.

In the case where automatic annotation is employed, the label assigning processor 157 may be configured to assign a label to a virtual image through, for example, semi-supervised learning. The training data used for the semi-supervised learning is only partially labeled. The label assigning processor 157 is configured to include, for example, a classifier (identifier) created by machine learning with labeled data. Also, the label assigning processor 157 is configured to classify (identify, estimate) unlabeled data using the classifier and assign the result of the classification as a label to this unlabeled data. An inference model may be created by performing supervised learning with the data to which the labels have been assigned in this way.

Here, the semi-supervised learning method employable for the present aspect example may be optional. For example, any method or technique such as the followings may be employed: bootstrap method or bootstrapping such as self-training, co-training, semi-supervised support vector machine, active learning, or the like; graph-based semi-supervised learning such as semi-supervised k-nearest neighbor graph (semi-supervised kNN), semi-supervised Gaussian mixture model (semi-supervised GMM), semi-supervised support vector machine, active learning, or the like; generative model such as conditional generative adversarial network (conditional GAN), conditional cycle GAN, semi-supervised GMM, variational auto encoder, ladder network, adversarial autoencoder, or the like.

In addition, automatic annotation is not limited to the methods or techniques using semi-supervised learning, and any known automatic annotation method or technique may be employed.

The controller 11 saves, in the memory 14, the virtual image set generated by the virtual image set generating processor 152 and the labels assigned to the virtual image set by the label assigning processor 157 (the training data 143). In other words, the training data 143 of the present aspect example includes at least the virtual image set generated by the virtual image set generating processor 152 and the labels assigned to the virtual image set by the label assigning processor 157.

The inference model creating processor 153 of the present aspect example is configured to apply, to the neural network, supervised learning with the training data 143 thus created. As a result, an inference model that can be used for identifying data of a building material from measured data of a building, is created.

In some modification examples of the present aspect example, the inference model creating processor 153 may be configured to create an inference model by applying semi-supervised learning with the training data 143 to the neural network.

Figure 12:
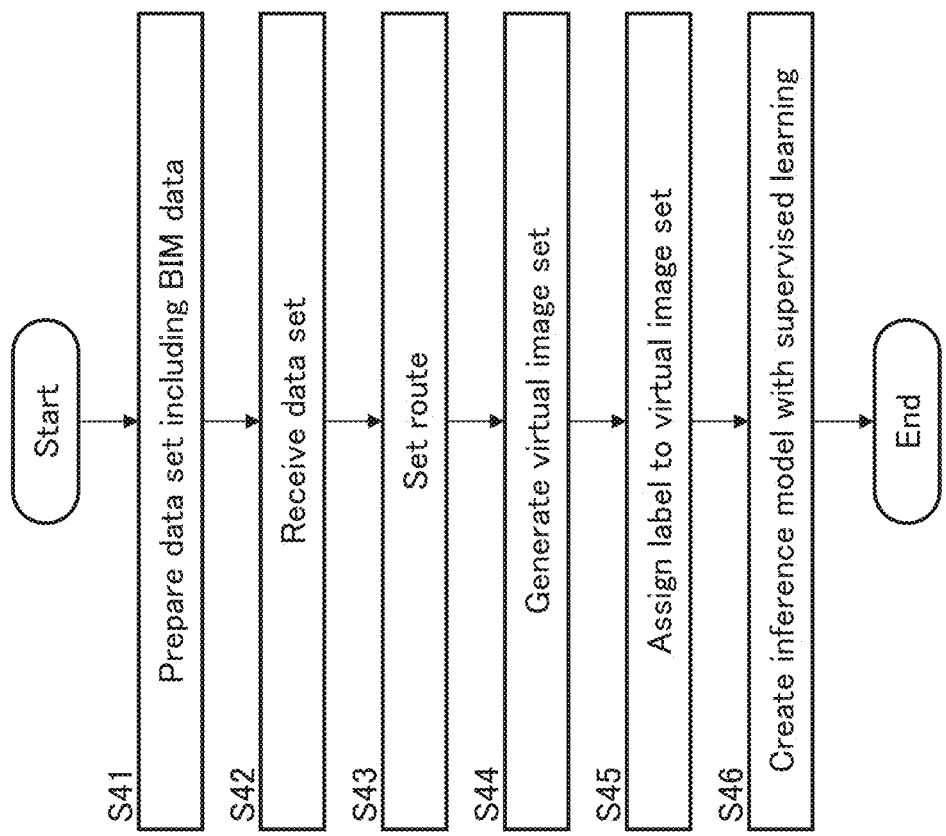
FIG. 12 is a flowchart showing an example of the operation of the information processing apparatus according to some aspect examples.

A description will be given of the operation of the information processing apparatus 1100 according to the present aspect example. FIG. 12 shows an example of the operation of the information processing apparatus 1100.

To begin with, a data set that includes at least the BIM data is prepared (S41). The preparation of the data set may be made automatically and/or manually, using a computer such as a cloud computer, for example.

Then, the information processing apparatus 1100 receives the data set prepared in the step S41, by the data set receiving unit 13 (S42). The data set received is saved in the memory 14 by the controller 11 (the data set 141).

Subsequently, the route setting processor 151 sets a route, which is arranged inside and/or outside a virtual building represented by the BIM data in the data set 141, based on the data set 141 received in the step S42 (S43). Information representing the route determined is saved in the memory 14 by the controller 11 (the route information 142).

Following the above, the virtual image set generating processor 152 generates a virtual image set of the virtual building represented by the BIM data in the data set 141 arranged along the route set in the step S43, based on the data set 141 and the route information 142 (S44). The virtual image set generated is sent to the label assigning processor 157.

Next, the label assigning processor 157 assigns a label relating to a virtual building material recorded in the BIM data in the data set 141 to the virtual image set generated in the step S44 (S45). The labeled virtual image set is saved (along with other data) in the memory 14 by the controller 11 (the training data 143).

Subsequently, the inference model creating processor 153 creates an inference model, which can be used for identifying data of a building material from measured data of a building, by applying supervised learning with the training data 143 that includes at least the labeled virtual image set generated in the step S45, to the neural network (S46). The inference model created is saved in the memory 14 by the controller 11 (the inference model 144) (End).

As described above, the information processing apparatus 1100 according to the present aspect example includes the label assigning processor 157 in addition to the elements of the first aspect example. The label assigning processor 157 is configured to assign a label relating to a virtual building material recorded in the BIM data to the virtual image set. Further, the inference model creating processor 153 is configured to create an inference model by applying supervised learning with the training data 143 that includes at least the virtual image set and the label to the neural network.

In addition, the present aspect example may provide a method or technique of creating an inference model that can be used for photogrammetry of a building. The inference model creation method or technique further includes a step of assigning a label relating to a virtual building material recorded in the BIM data to the virtual image set (the label assigning step). The inference model creating step is executed to create an inference model by applying supervised learning with training data that includes at least the virtual image set and the label to the neural network.

The present aspect example may provide a program that causes a computer to execute each of the data set preparing step, the route setting step, the virtual image set generating step, the label assigning step, and the inference model creating step. For example, the computer may be a single computer or a computer system (i.e., a system including two or more computers) usable for photogrammetry of a building.

Further, the present aspect example may provide a computer-readable non-transitory recording medium that records such a program. The non-transitory recording medium may be, for example, any of a magnetic disk, an optical disk, a magneto-optical disk, and a semiconductor memory.

The present aspect example may provide an inference model created through the data set preparing step, the route setting step, the virtual image set generating step, the label assigning step, and the inference model creating step.

Furthermore, the present aspect example may provide a program that causes a computer to execute a process of identifying data of a building material from measured data of a building using such an inference model.

In addition, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example, a label relating to a virtual building material recorded in the BIM data can be manually and/or automatically assigned to a virtual image set. Therefore, supervised learning (or, semi-supervised learning) for creating an inference model can be appropriately performed.

Seventh Aspect Example

Figure 13:
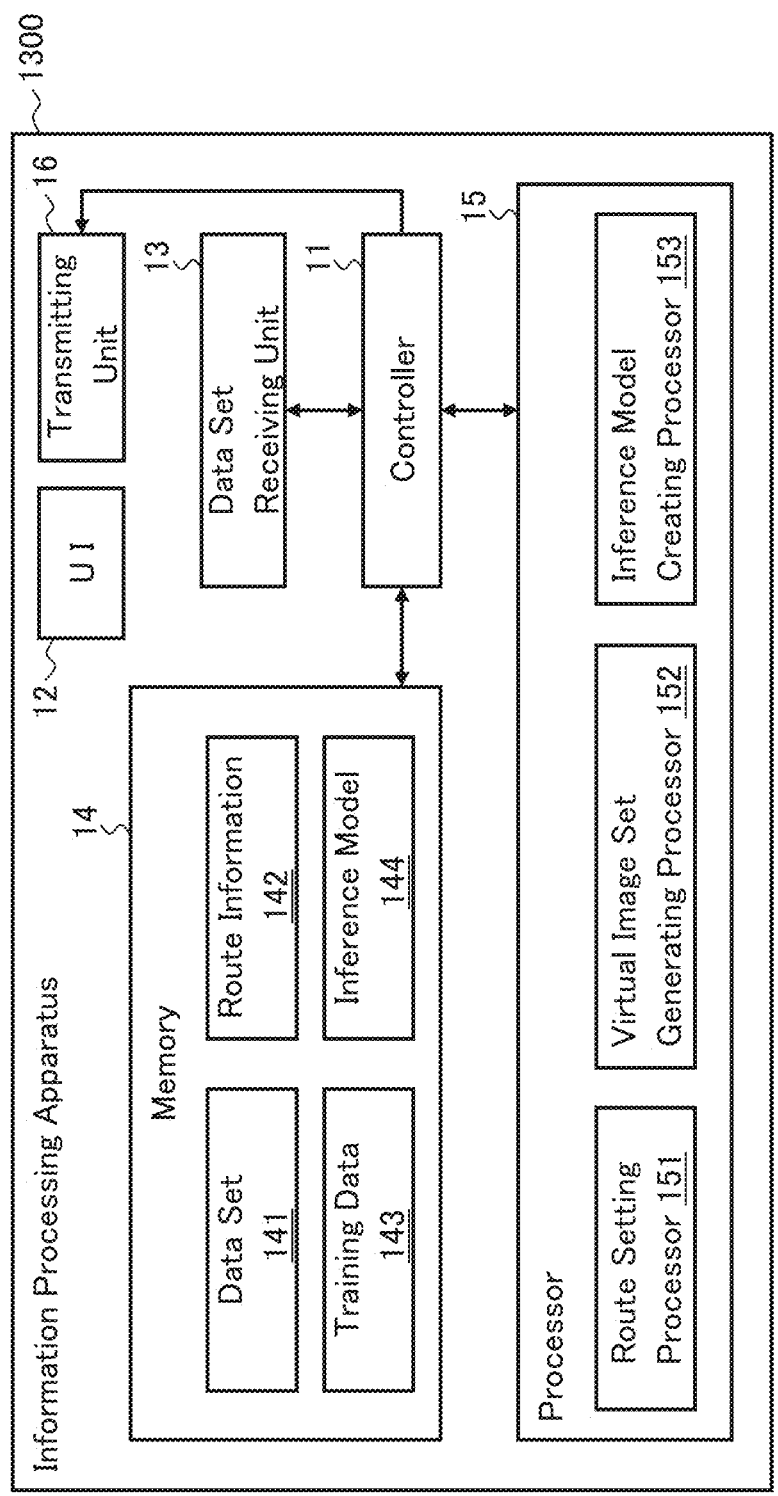
FIG. 13 is a schematic diagram showing an example of the configuration of the information processing apparatus according to some aspect examples.

FIG. 13 shows a configuration example of the information processing apparatus according to the seventh aspect example. The information processing apparatus 1300 may be configured by adding the transmitting unit 16 to the information processing apparatus 1 of the first aspect example. In FIG. 13, the arrow connecting the controller 11 and the user interface (UI) 12 is omitted, but the form of this connection is the same as that in the first aspect example. Below, the description of the elements common to the first aspect example will be omitted unless otherwise mentioned.

The transmitting unit 16 is configured to transmit an inference model created by the inference model creating processor 153 to a predetermined mobile object. The transmitting unit 16 may include at least one of a wired communication device and a wireless communication device. The mobile object is configured to perform measurement of a building while autonomously moving inside and/or outside the building. The mobile object is, for example, a UAV or an autonomous vehicle. In addition, the mobile object may be a person, and the inference model may be transmitted to a mobile terminal.

The processor 15 may be configured to create information for controlling the mobile object based on the inference model created by the inference model creating processor 153. This information may be referred to as movement control information herein. The movement control information created is provided to the mobile object by the transmitting unit 16. The movement control information may be created by applying rule-based processing to the information stored in the memory 14.

Figure 14:
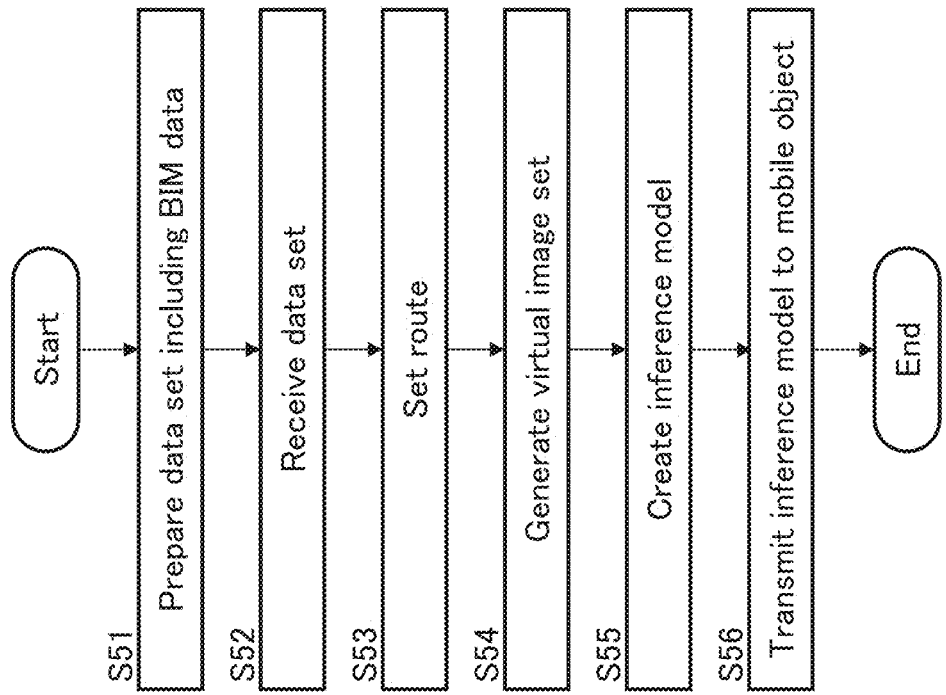
FIG. 14 is a flowchart showing an example of the operation of the information processing apparatus according to some aspect examples.

A description will be given of the operation of the information processing apparatus 1300 according to the present aspect example. FIG. 14 shows an example of the operation of the information processing apparatus 1300.

To begin with, a data set that includes at least the BIM data is prepared (S51). The preparation of the data set may be made automatically and/or manually, using a computer such as a cloud computer, for example.

Then, the information processing apparatus 1300 receives the data set prepared in the step S51, by the data set receiving unit 13 (S52). The data set received is saved in the memory 14 by the controller 11 (the data set 141).

Subsequently, the route setting processor 151 sets a route, which is arranged inside and/or outside a virtual building represented by the BIM data in the data set 141, based on the data set 141 received in the step S52 (S53). Information representing the route determined is saved in the memory 14 by the controller 11 (the route information 142).

Following the above, the virtual image set generating processor 152 generates a virtual image set of the virtual building represented by the BIM data in the data set 141 arranged along the route set in the step S53, based on the data set 141 and the route information 142 (S54). The virtual image set generated is saved (along with other data) in the memory 14 by the controller 11 (the training data 143).

Subsequently, the inference model creating processor 153 creates an inference model, which can be used for identifying data of a building material from measured data of a building, by applying machine learning with the training data 143 that includes at least the virtual image set generated in the step S54 to the neural network (S55). The inference model created is saved in the memory 14 by the controller 11 (the inference model 144).

Next, the controller 11 reads out the inference model 144 from the memory 14 and sends the inference model 144 to the transmitting unit 16. Further, the processor 15 may create the movement control information mentioned above. The movement control information created is sent to the transmitting unit 16. The transmitting unit 16 transmits the inference model 144 and/or the movement control information to a predetermined mobile object (S56). The mobile object receives the inference model 144 and/or the movement control information, and performs measurement of a building while autonomously moving inside and/or outside the building (End).

As described above, the information processing apparatus 1300 according to the present aspect example includes the transmitting unit 16 in addition to the elements of the first aspect example. The transmitting unit 16 is configured to transmit the inference model 144 created by the inference model creating processor 153 to a mobile object configured to perform building measurement while autonomously moving inside and/or outside a building.

In addition, the present aspect example may provide a method or technique of creating an inference model that can be used for photogrammetry of a building. The inference model creation method or technique further includes a step of transmitting the created inference model to a mobile object configured to perform building measurement while autonomously moving inside and/or outside a building (the transmitting step).

The present aspect example may provide a program that causes a computer to execute each of the data set preparing step, the route setting step, the virtual image set generating step, the inference model creating step, and the transmitting step. For example, the computer may be a single computer or a computer system (i.e., a system including two or more computers) usable for photogrammetry of a building.

Further, the present aspect example may provide a computer-readable non-transitory recording medium that records such a program. The non-transitory recording medium may be, for example, any of a magnetic disk, an optical disk, a magneto-optical disk, and a semiconductor memory.

The present aspect example may provide an inference model created through the data set preparing step, the route setting step, the virtual image set generating step, the inference model creating step, and the transmitting step.

Furthermore, the present aspect example may provide a program that causes a computer to execute a process of identifying data of a building material from measured data of a building using such an inference model.

In addition, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example, an inference model created can be easily provided to a mobile object. Therefore, the transition from inference model creation to building measurement by the mobile object can be facilitated.

Eighth Aspect Example

Figure 15:
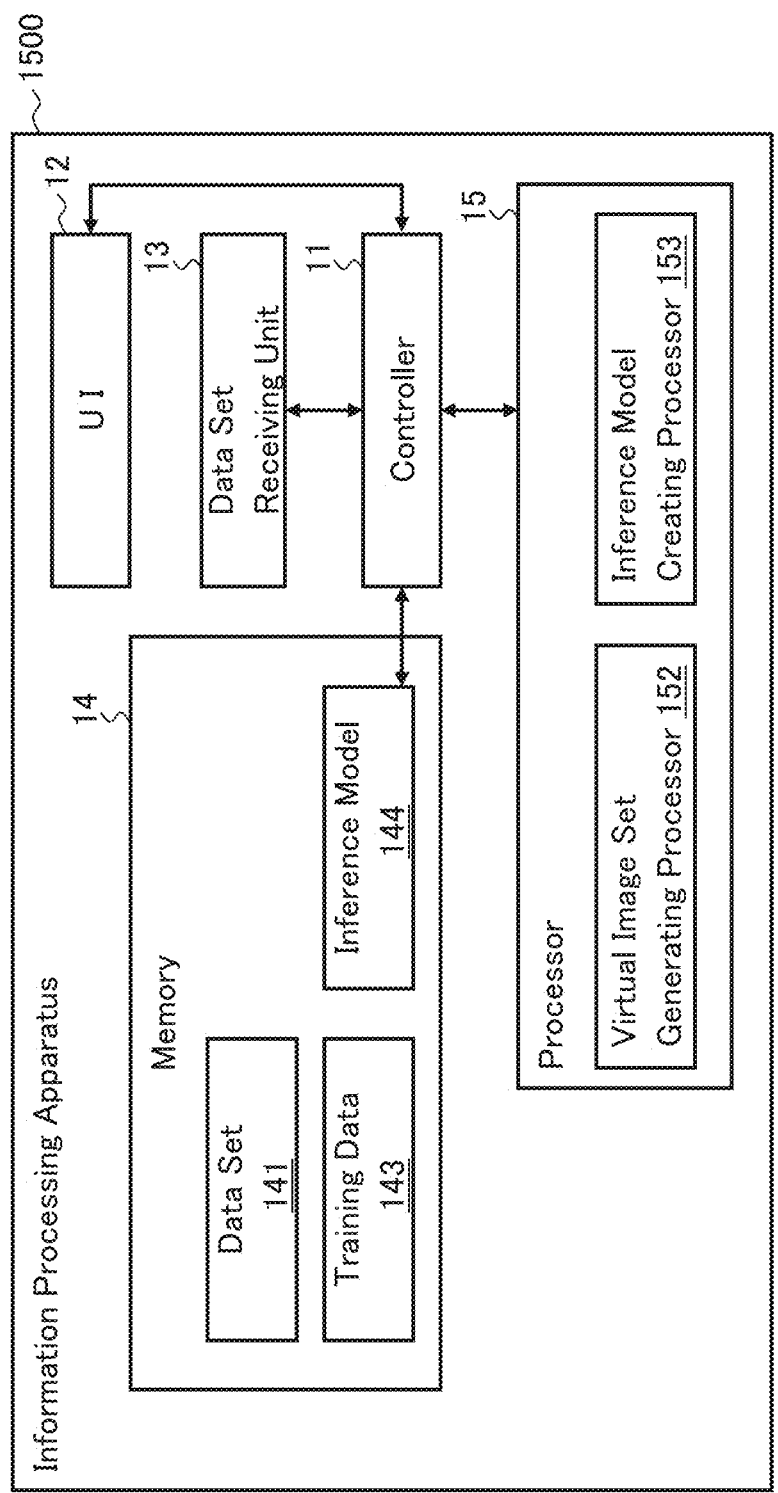
FIG. 15 is a schematic diagram showing an example of the configuration of the information processing apparatus according to some aspect examples.

FIG. 15 shows a configuration example of the information processing apparatus according to the eighth aspect example. The information processing apparatus 1500 may be configured by removing the route setting processor 151 from the processor 15 of the information processing apparatus 1 of the first aspect example. Below, the description of the elements common to the first aspect example will be omitted unless otherwise mentioned.

In the present aspect example, a data set that includes at least BIM data and route information is prepared. The route information is information that represents a route arranged inside and/or outside a virtual building represented by the BIM data. The method or technique of setting the route may be the same as or similar to that of the first aspect example, but the route may have been set using an apparatus or system other than the information processing apparatus 1500.

The virtual image set generating processor 152 of the present aspect example is configured to generate a virtual image set of interior and/or exterior of the virtual building represented by the BIM data, where multiple virtual images in the virtual image set are arranged along the route represented by the route information, based on the data set received by the data set receiving unit 13.

The inference model creating processor 153 of the present aspect example is configured to create an inference model, which can be used for identifying data of a building material from measured data of a building, by applying machine learning with training data that includes at least the virtual image set generated by the virtual image set generating processor 152 to a neural network.

Figure 16:
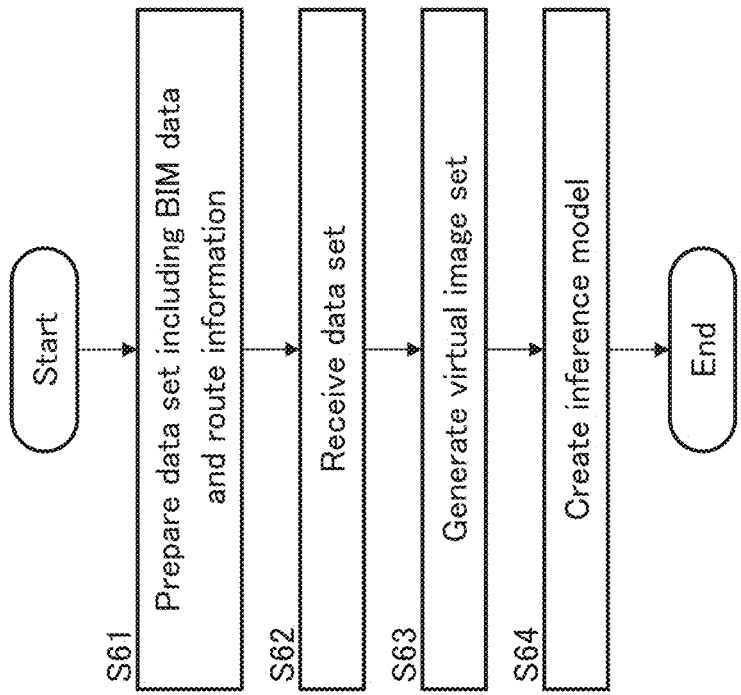
FIG. 16 is a flowchart showing an example of the operation of the information processing apparatus according to some aspect examples.

A description will be given of the operation of the information processing apparatus 1500 according to the present aspect example. FIG. 16 shows an example of the operation of the information processing apparatus 1500.

To begin with, a data set that includes at least the BIM data and the route information is prepared (S61). The preparation of the data set may be made automatically and/or manually, using a computer such as a cloud computer, for example.

Next, the information processing apparatus 1500 receives the data set prepared in the step S61, by the data set receiving unit 13 (S62). The data set received is saved in the memory 14 by the controller 11 (the data set 141). It should be noted that while the route information is also included in the data set 141 in the example shown in FIG. 15, the route information included in the data set received by the data set receiving unit 13 may be saved in the memory 14 as the route information 142 similar to the first aspect example.

Next, the virtual image set generating processor 152 generates a virtual image set of the virtual building represented by the BIM data arranged along the route represented by the route information, based on the data set 141 received in the step S62 (S63). The virtual image set generated is saved (along with other data) in the memory 14 by the controller 11 (the training data 143).

Subsequently, the inference model creating processor 153 creates an inference model, which can be used for identifying data of a building material from measured data of a building, by applying machine learning with the training data 143 that includes at least the virtual image set generated in the step S63 to the neural network (S64). The inference model created is saved in the memory 14 by the controller 11 (the inference model 144) (End).

As described above, the information processing apparatus 1500 according to the present aspect example has a configuration in which the route setting processor 151 is excluded from the elements of the first aspect example. The data set receiving unit 13 is configured to receive a data set that includes at least BIM data and route information. The virtual image set generating processor 152 is configured to generate a virtual image set of interior and/or exterior of the virtual building represented by the BIM data, where multiple virtual images in the virtual image set are arranged along the route represented by the route information, based on the data set received by the data set receiving unit 13. The inference model creating processor 153 is configured to create an inference model, which can be used for identifying data of a building material from measured data of a building, by applying machine learning with training data that includes at least the virtual image set generated by the virtual image set generating processor 152 to a neural network.

Further, the present aspect example may provide a method or technique of creating an inference model that can be used for photogrammetry of a building. The inference model creation method or technique includes at least the following steps: a step of preparing a data set that includes at least BIM data and route information (the data set preparing step); a step of generating a virtual image set of the virtual building represented by the BIM data arranged along the route represented by the route information, based on the data set prepared (the virtual image set generating step); and a step of creating an inference model, which can be used for identifying data of a building material from measured data of a building, by applying machine learning with training data that includes at least the virtual image set generated to a neural network (the inference model creating step). In other words, the inference model creation method or technique of the present aspect example is configured to exclude the route setting step from the method or technique of the first aspect example and prepare route information in the data set preparing step.

The present aspect example may provide a program that causes a computer to execute each of the data set preparing step, the virtual image set generating step, and the inference model creating step. For example, the computer may be a single computer or a computer system (i.e., a system including two or more computers) usable for photogrammetry of a building.

Furthermore, the present aspect example may provide a computer-readable non-transitory recording medium that records such a program. The non-transitory recording medium may be, for example, any of a magnetic disk, an optical disk, a magneto-optical disk, and a semiconductor memory.

The present aspect example may provide an inference model created through the data set preparing step, the virtual image set generating step, and the inference model creating step.

In addition, the present aspect example may provide a program that causes a computer to execute a process of identifying data of a building material from measured data of a building using such an inference model.

Further, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example, as with the first aspect example, it is possible to improve the efficiency of building control or management from various perspectives. In addition, the present aspect example is configured to use the route information created in advance. This gives the present aspect example the advantage of having a lower processing load and requiring smaller processing resources compared to the first aspect example.

Ninth Aspect Example

Figure 17:
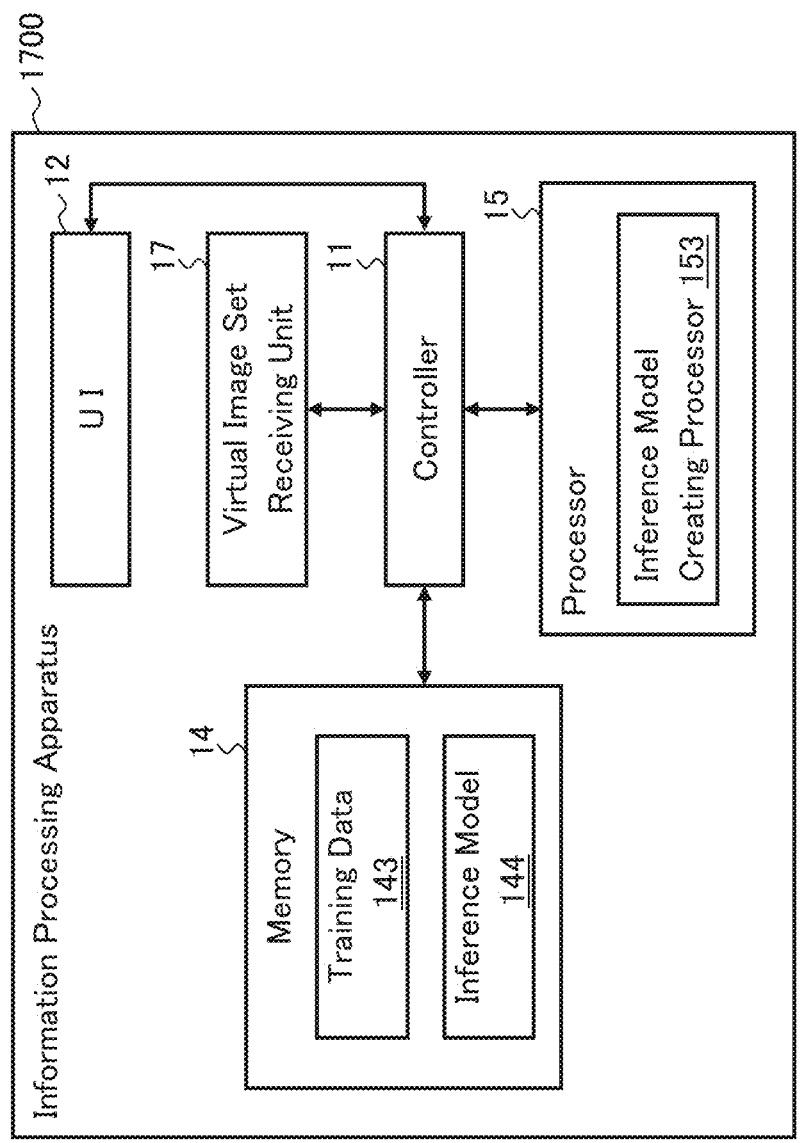
FIG. 17 is a schematic diagram showing an example of the configuration of the information processing apparatus according to some aspect examples.

FIG. 17 shows a configuration example of the information processing apparatus according to the ninth aspect example. The information processing apparatus 1700 may be configured by: removing the route setting processor 151 and the virtual image set generating processor 152 from the processor 15 of the information processing apparatus 1 of the first aspect example; and adding the virtual image set receiving unit 17 in place of the data set receiving unit 13. In other words, the information processing apparatus 1700 may be configured by removing the virtual image set generating processor 152 from the processor 15 of the information processing apparatus 1500 of the eighth aspect example, and adding the virtual image set receiving unit 17 in place of the data set receiving unit 13. Below, the description of the elements common to the first aspect example will be omitted unless otherwise mentioned.

In the present aspect example, a virtual image set arranged along a predetermined route, the virtual image set representing interior and/or exterior of a virtual building represented by BIM data, is prepared. The route setting method or technique and the virtual image set generation method or technique may be the same as or similar to those in the first aspect example, but the route setting and the virtual image set generation are executed using an apparatus or system other than the information processing apparatus 1700.

The virtual image set receiving unit 17 may have the same configuration as the data set receiving unit 13 of the first aspect example, and has the function of receiving data (virtual image set) to be processed by the information processing apparatus 1700. The virtual image set receiving unit 17 may include, for example, a communication device for performing data communication with an external device, an external system, an external database, and the like. Further, the virtual image set receiving unit 17 may also include a drive device for reading out data recorded on a recording medium.

The inference model creating processor 153 of the present aspect example is configured to create an inference model, which can be used for identifying data of a building material from measured data of a building, by applying machine learning with training data that includes at least the virtual image set received by the virtual image set receiving unit 17 to a neural network.

Figure 18:
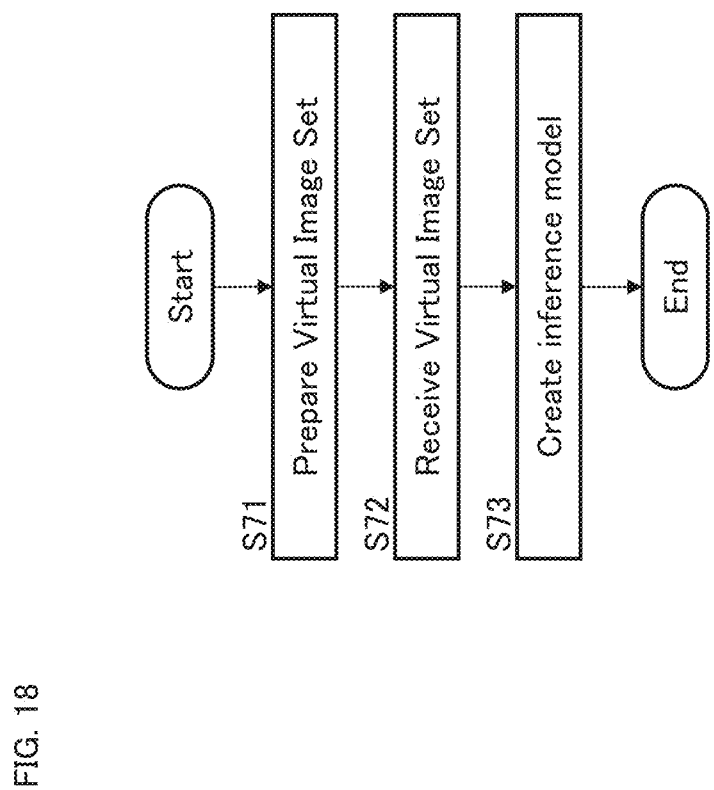
FIG. 18 is a flowchart showing an example of the operation of the information processing apparatus according to some aspect examples.

A description will be given of the operation of the information processing apparatus 1700 according to the present aspect example. FIG. 18 shows an example of the operation of the information processing apparatus 1700.

First, a route arranged inside and/or outside a virtual building is determined based on the BIM data, and a virtual image set of the virtual building arranged along the route is prepared (S71). The preparation of the virtual image set may be made automatically and/or manually, using a computer such as a cloud computer, for example.

Next, the information processing apparatus 1700 receives the virtual image set prepared in the step S71, by the virtual image set receiving unit 17 (S72). The data set received is saved in the memory 14 by the controller 11 (the training data 143).

Following the above, the inference model creating processor 153 creates an inference model, which can be used for identifying data of a building material from measured data of a building, by applying machine learning with the training data 143 that includes at least the virtual image set received in the step S72 to a neural network (S73). The inference model created is saved in the memory 14 by the controller 11 (the inference model 144) (End).

As described above, the information processing apparatus 1700 according to the present aspect example has a configuration in which the route setting processor 151 and the virtual image set generating processor 152 are excluded from the elements of the first aspect example, and the virtual image set receiving unit 17 is provided in place of the data set receiving unit 13. The virtual image set receiving unit 17 is configured to receive a virtual image set arranged along a predetermined route, the virtual image set representing interior and/or exterior of a virtual building represented by BIM data. The inference model creating processor 153 is configured to create an inference model, which can be used for identifying data of a building material from measured data of a building, by applying machine learning with training data that includes at least the virtual image set received by the virtual image set receiving unit 17 to a neural network.

Further, the present aspect example may provide a method or technique of creating an inference model that can be used for photogrammetry of a building. The inference model creation method or technique includes at least the following steps: a step of preparing a virtual image set arranged along a predetermined route, the virtual image set representing interior and/or exterior of a virtual building represented by BIM data (the virtual image set preparing step); and a step of creating an inference model, which can be used for identifying data of a building material from measured data of a building, by applying machine learning with training data that includes at least the virtual image set prepared to a neural network (the inference model creating step). In other words, the inference model creation method or technique of the present aspect example may be configured by excluding the route setting step and the virtual image set generating step from the method or technique of the first aspect example, and adding the virtual image set preparing step in place of the data set preparing step.

The present aspect example may provide a program that causes a computer to execute each of the virtual image set preparing step and the inference model creating step. For example, the computer may be a single computer or a computer system (i.e., a system including two or more computers) usable for photogrammetry of a building.

Furthermore, the present aspect example may provide a computer-readable non-transitory recording medium that records such a program. The non-transitory recording medium may be, for example, any of a magnetic disk, an optical disk, a magneto-optical disk, and a semiconductor memory.

The present aspect example may provide an inference model created through the virtual image set preparing step and the inference model creating step.

In addition, the present aspect example may provide a program that causes a computer to execute a process of identifying data of a building material from measured data of a building using such an inference model.

Further, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example as described above, as with the first aspect example, it is possible to improve the efficiency of building control or management from various perspectives. In addition, the present aspect example is configured to use the virtual image set generated in advance, which gives the present aspect example the advantage of having a lower processing load and requiring smaller processing resources compared to the first aspect example. The same advantage is achieved in comparison with the eighth aspect example.

Tenth Aspect Example

The aspect examples described thus far (the first to ninth aspect examples) are relating to the creation of an inference model. On the other hand, the tenth aspect example is relating to the use of an inference model.

The inference model used in the present aspect example may be any of the followings, for example: an inference model according to any of the first to ninth aspect examples; an inference model equivalent to an inference model according to any of the first to ninth aspect examples; or an inference model created based on an inference model according to any of the first to ninth aspect examples.

Examples of the inference model equivalent to an inference model according to any of the first to ninth aspect examples include the followings, for example: an inference model that belongs to an scope of equivalent of an inference model according to any of the first to ninth aspect examples; an inference model obtained by a creation method or technique substantially the same as that of an inference model according to any of the first to ninth aspect examples; an inference model that has a configuration substantially the same as that of an inference model according to any of the first to ninth aspect examples; and an inference model that has a function substantially the same as that of an inference model according to any of the first to ninth aspect examples.

Further, examples of the inference model created based on an inference model according to any of the first to ninth aspect examples include the followings, for example: an inference model obtained by applying further machine learning to an inference model according to any of the first to ninth aspect examples; an inference model obtained by applying transfer learning to an inference model according to any of the first to ninth aspect examples; and an inference model that includes at least part of an inference models according to any of the first to ninth aspect examples.

While the present aspect example is configured to use an inference model to identify data of a building material from data obtained by measuring a building (measured data of a building), the use of an inference model is not limited to this, as described below. For example, some aspect examples are configured to identify data other than data of a building material from measured data of a building, or to identify certain data from measured data of an object other than a building.

Figure 19:
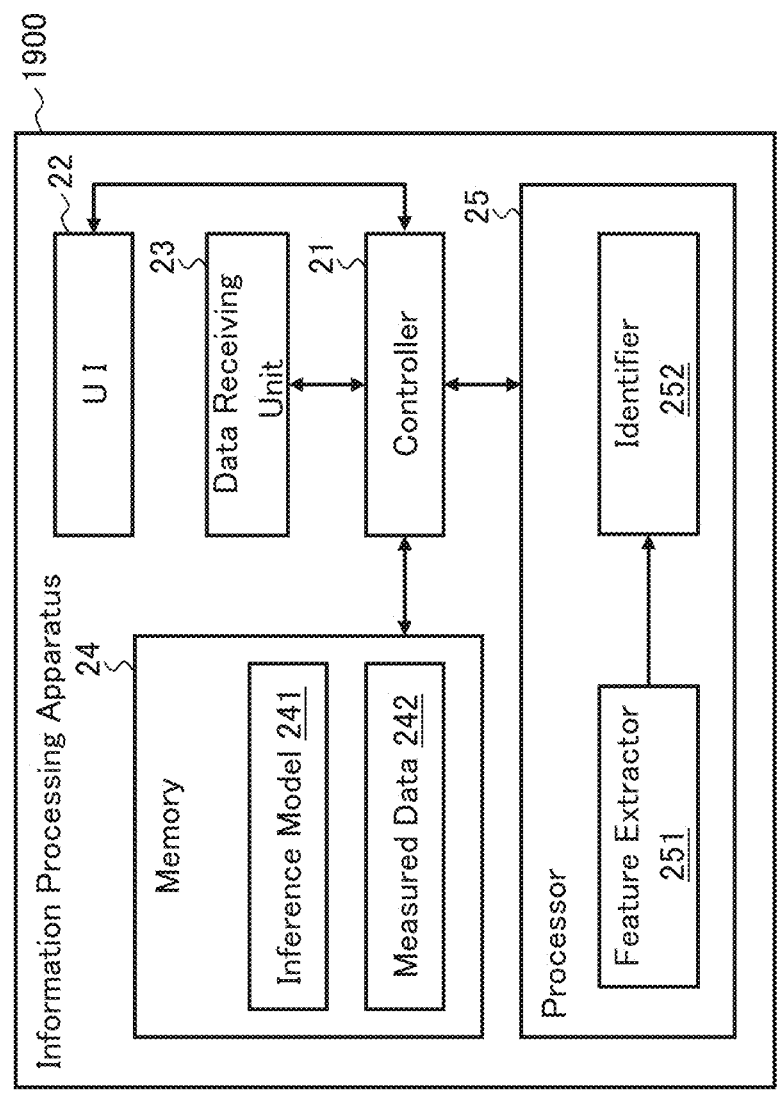
FIG. 19 is a schematic diagram showing an example of the configuration of the information processing apparatus according to some aspect examples.

FIG. 19 shows a configuration example of the information processing apparatus according to the present aspect example. The information processing apparatus 1900 may be included, for example, in a building photogrammetry system (building reality capture system). The building photogrammetry system has the function of measuring an actual building and acquiring digital data. The digital data includes measured data such as a photographed image, scan data, point cloud data, or the like. The measured data acquired in this way is input to the information processing apparatus 1900.

The information processing apparatus 1900 of some aspect examples may be mounted on a mobile object such as a UAV or an autonomous vehicle. The information processing apparatus 1900 of some aspect examples may be a mobile computer carried by a person who is conducting measurement. The information processing apparatus 1900 of some aspect examples may be a computer used at a measurement site such as a building site or a construction site (e.g., an edge computer, etc.). The information processing apparatus 1900 of some aspect examples may be a computer used or placed at a location other than a measurement site (e.g., a cloud computer, etc.).

The information processing apparatus 1900 according to the present aspect example includes at least the memory 24 and the processor 25, and may further include the controller 21, the user interface 22, and the data receiving unit 23.

The controller 21 is configured to execute various kinds of control processing of the information processing apparatus 1900. The controller 21 is implemented, for example, by the cooperation of hardware including a processor and a storage device, and control software. The controller 21 may be included in a single computer or decentralized among two or more computers.

The user interface 22 includes, for example, a display device, an operation device, an input device, and the like. The user interface 22 of some aspect examples includes a graphical user interface (GUI) configured with hardware and software such as a touch screen, a pointing device, and computer graphics software. The user interface 22 may be included in a single computer or decentralized among two or more computers.

The data receiving unit 23 has the function of receiving data to be processed by the information processing apparatus 1900. The data receiving unit 23 may include a communication device for performing data communication with an external device, an external system, an external database, and the like. In addition, the data receiving unit 23 may also include a drive device for reading out data recorded on a recording medium. In the case where the information processing apparatus 1900 is incorporated in an apparatus that generates data to be received (e.g., measuring apparatus, information processing apparatus, etc.), the data receiving unit 23 may include a bus in the apparatus.

The data receiving unit 23 of some aspect examples receives measured data of a building. Further, the data receiving unit 23 of some aspect examples receives an inference model. Note that when the information processing apparatus 1900 has the inference model creation function, the data receiving unit 23 does not have to receive an inference model from the outside.

The measured data to be received by the data receiving unit 23 may be acquired by, for example, photographing a building with a camera (e.g., an omnidirectional camera, also known as a 360-degree camera) or a video camera (e.g., an omnidirectional video camera, also known as a 360-degree video camera) mounted on a mobile object such as a UAV, and an autonomous vehicle, or carried by a person. Alternatively, the measured data to be received by the data receiving unit 23 may be acquired by scanning a building with a scanner such as a laser scanner or a total station.

In some aspect examples, the measured data to be received by the data receiving unit 23 may be generated by applying a predetermined process to data (raw data) acquired by photographing or scanning of a building. Examples of the process applied to the raw data include SfM, MVS, SLAM (V-SLAM, or Visual SLAM), and the like.

The memory 24 stores various kinds of data (information). The memory 24 stores, for example, data received by the data receiving unit 23. The memory 24 includes a storage device that has a relatively large capacity (e.g., memory, secondary storage) such as an HDD or an SSD, for example. In the present aspect example, the memory 24 stores the inference model 241 and the measured data 242.

The inference model 241 is a learned model that has been created by applying, to a neural network, machine learning with training data that includes at least a virtual image set arranged along a predetermined route arranged inside and/or outside a virtual building represented by BIM data. The inference model 241 is received by the data receiving unit 23 and stored in the memory 24 by the controller 21.

The inference model 241 may be, for example, the inference model 144 of any of the first to ninth aspect examples. Further, the inference model 241 may also be any of the followings: an inference model created based on the inference model 144 of any of the first to ninth aspect examples; an inference model equivalent to the inference model 144; and an inference model created based on the inference model equivalent to the inference model 144.

The measured data 242 is data that has been acquired by conducting measurement of an actual building. The measured data 242 may contain ancillary information (incidental information, supplementary information, attached information). The ancillary information may be, for example, information relating to any of the above-mentioned attributes, or may be any other information.

The measured data 242 may be, for example, a photographed image (still image, moving image (video)) obtained by photographing a building with a camera (e.g., an omnidirectional camera, also known as a 360-degree camera) or a video camera (e.g., an omnidirectional video camera, also known as a 360-degree video camera) mounted on a mobile object. Alternatively, the measured data 242 may be scan data obtained by scanning a building with a scanner such as a laser scanner or a total station. Furthermore, the measured data 242 may also be data obtained by processing raw data such as a photographed image, scan data, or the like.

The measured data 242 is received by the data receiving unit 23 and saved in the memory 24 by the controller 21. It should be noted that the measured data received by the data receiving unit 23 may be sent to the processor 25. In some aspect examples, the data receiving unit 23 may receive certain measured data, the measured data received may be sent to the processor 25, the processor 25 may apply a certain process to this measured data to create the measured data 242, and the measured data 242 may be saved in the memory 24. The process executed by the processor 25 of such aspect examples may be regarded as preprocessing executed prior to data processing using the inference model 241. Examples of the preprocessing include SfM, MVS, SLAM (V-SLAM, or Visual SLAM), and the like.

The processor 25 is configured to execute data processing. The processor 25 is implemented, for example, by the cooperation of hardware including a processor and a storage device, and data processing software. The processor 25 may be included in a single computer or decentralized among two or more computers. The processor 25 of the present aspect example includes the feature extractor 251 and the identifier 252.

The feature extractor 251 is implemented by using the inference model 241. The feature extractor 251 is configured to extract a feature from the measured data 242 that has been input to the inference model 241.

In the case where the inference model 241 includes a convolutional neural network, the feature extractor 251 includes, for example, a plurality of convolutional layers and a plurality of pooling layers (see FIG. 2).

The type of a feature extracted from the measured data 242 is determined by the configuration of the inference model 241. For example, if the inference model 241 includes a convolutional neural network, the type of a feature (feature map) extracted by the feature extractor 251 is determined by the configuration of the convolutional layer therein such as a kernel (filter), activation function, or the like.

The identifier 252 is also implemented by using the inference model 241. The identifier 252 is configured to identify data of a building material included in the measured data 242, based on the feature extracted by the feature extractor 251.

In the case where the inference model 241 includes a convolutional neural network, the feature extractor 251 includes, for example, one or more fully connected layers and an output layer (see FIG. 2).

The type of data of a building material to be identified based on the extracted feature is determined by the configuration of the inference model 241. For example, if the inference model 241 includes a convolutional neural network, the type of data of a building material to be identified by the identifier 252 is determined by the configuration of the fully connected layer such as a weight, bias, activation function, etc., and/or, by the configuration of the output layer such as the number of nodes etc.

The number of nodes in the output layer may be equal to, for example, the number of types of building materials to be identified. Here, examples of the types of building materials include columns, beams, walls, slabs, roofs, foundations, windows, doors, stairs, tiles, floorings, various kinds of parts, various kinds of machines, various kinds of devices or equipment, various kinds of facilities, and the like. When the number of nodes in the output layer is the same as the number of types of building material to be identified, for example, the following processes are executed by the output layer: a process of calculating the probabilities that a certain data region of interest (a data region corresponding to a certain building material) in the measured data 242 is of respective types; and a process of selecting the type with the highest one of the probabilities derived. With the probability calculation process and the type selection process, the type of a building material corresponding to the data region of interest in the measured data 242 can be identified. The inference model 241 of the present example is configured to perform image segmentation such as semantic segmentation.

Figure 20:
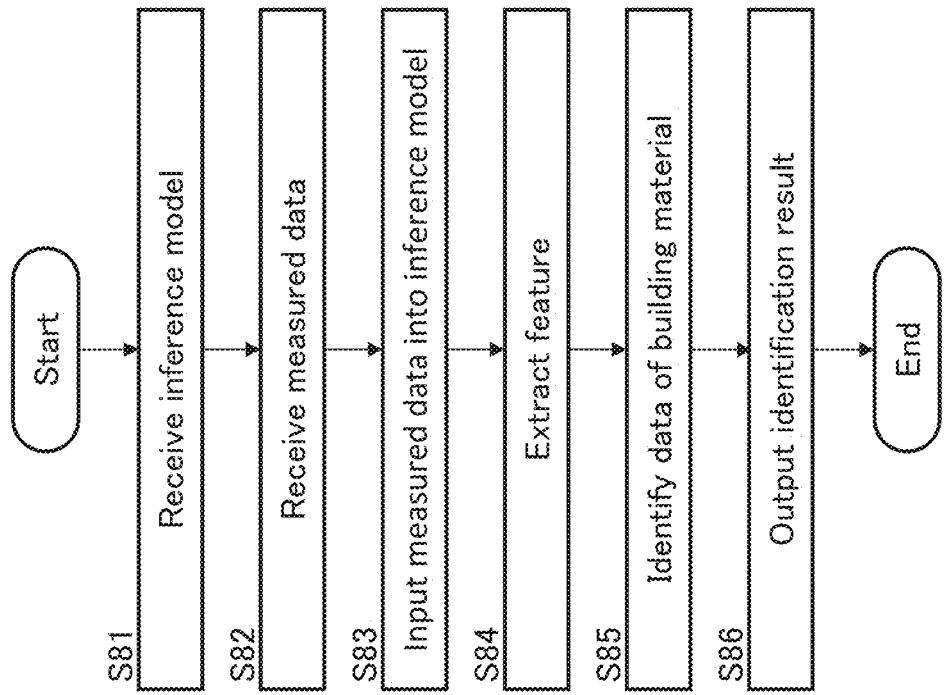
FIG. 20 is a flowchart showing an example of the operation of the information processing apparatus according to some aspect examples.

A description will be given of the operation of the information processing apparatus 1900 according to the present aspect example. FIG. 20 shows an example of the operation of the information processing apparatus 1900.

To begin with, the information processing apparatus 1900 receives, by the data receiving unit 23, an inference model created in advance (S81). The inference model received is saved in the memory 24 by the controller 21 (the inference model 241).

Then, the information processing apparatus 1900 receives, by the data receiving unit 23, measured data of a building acquired in advance (S82). The measured data received is saved in the memory 24 by the controller 21 (the measured data 242).

Subsequently, the controller 21 loads the inference model 241 into the processor 25 (processor). With the loading of the inference model 241, the processor 25 becomes capable of operating as the feature extractor 251 and the identifier 252. The controller 21 inputs the measured data 242 to the processor 25 (the inference model 241) (S83).

Next, the feature extractor 251 extracts a feature from the measured data 242 input (S84).

Then, the identifier 252 identifies the data of the building material based on the feature extracted in the step S84 (S85).

Subsequently, the controller 21 displays the data of the building material identified in the step S85 on the display device of the user interface 22 (S86) (End).

As described above, the information processing apparatus 1900 according to the present aspect example includes the memory 24 and the processor 25. The memory 24 stores the inference model 241 created by applying machine learning with training data that includes at least a virtual image set arranged along a predetermined route arranged inside and/or outside a virtual building represented by BIM data, to a neural network. The processor 25 performs data processing using the inference model 241. More specifically, the processor 25 functions as the feature extractor 251 and the identifier 252 by using the inference model 241. The feature extractor 251 extracts a feature from the measured data 242. The identifier 252 identifies the data of the building material based on the feature extracted by the feature extractor 251.

In addition, the present aspect example may provide a method or technique of processing information that can be used in photogrammetry of a building. The information processing method or technique includes at least the following steps: a step of receiving an inference model created by applying, to a neural network, machine learning with training data that includes at least a virtual image set arranged along a predetermined route arranged inside and/or outside a virtual building represented by BIM data (the inference model receiving step); a step of extracting a feature from measured data of a building, by a processor configured to perform data processing using the inference model received (the feature extracting step); and a step of identifying data of a building material based on the feature extracted in the feature extracting step, by the processor configured to perform data processing using the inference model received (the building material data identifying step).

The present aspect example may provide a program that causes a computer to execute each of the inference model receiving step, the feature extracting step, and the building material data identifying step. For example, the computer may be a single computer or a computer system (i.e., a system including two or more computers) usable for photogrammetry of a building.

Furthermore, the present aspect example may provide a computer-readable non-transitory recording medium that records such a program. The non-transitory recording medium may be, for example, any of a magnetic disk, an optical disk, a magneto-optical disk, and a semiconductor memory.

According to the present aspect example, data of a building material can be automatically identified from measured data of a building such as a photographed image, scan data, point cloud data, or the like. This makes it possible to improve the efficiency of building control or management.

Eleventh Aspect Example

The eleventh aspect example describes a system and some usage modes of the system that can be implemented by applying any of the first to tenth aspect examples. The system of the present aspect example can be used for information management in the field of architecture such as construction control or management, maintenance control or management, and repair control or management. The system of the present aspect example is an integrated system configured by utilizing and combining various techniques and technologies such as a mobile object (e.g., a UAV, an autonomous vehicle, a person, etc.), a surveying instrument (e.g., a total station, an electro-optical distance measuring instrument (also known as a laser rangefinder or a telemeter), a theodolite, a rangefinder), a data processing technique and technology (e.g., SfM, MVS, SLAM, etc.), and a modeling technique and technology (e.g., computer graphics, CAD, BIM, etc.).

Figure 21:
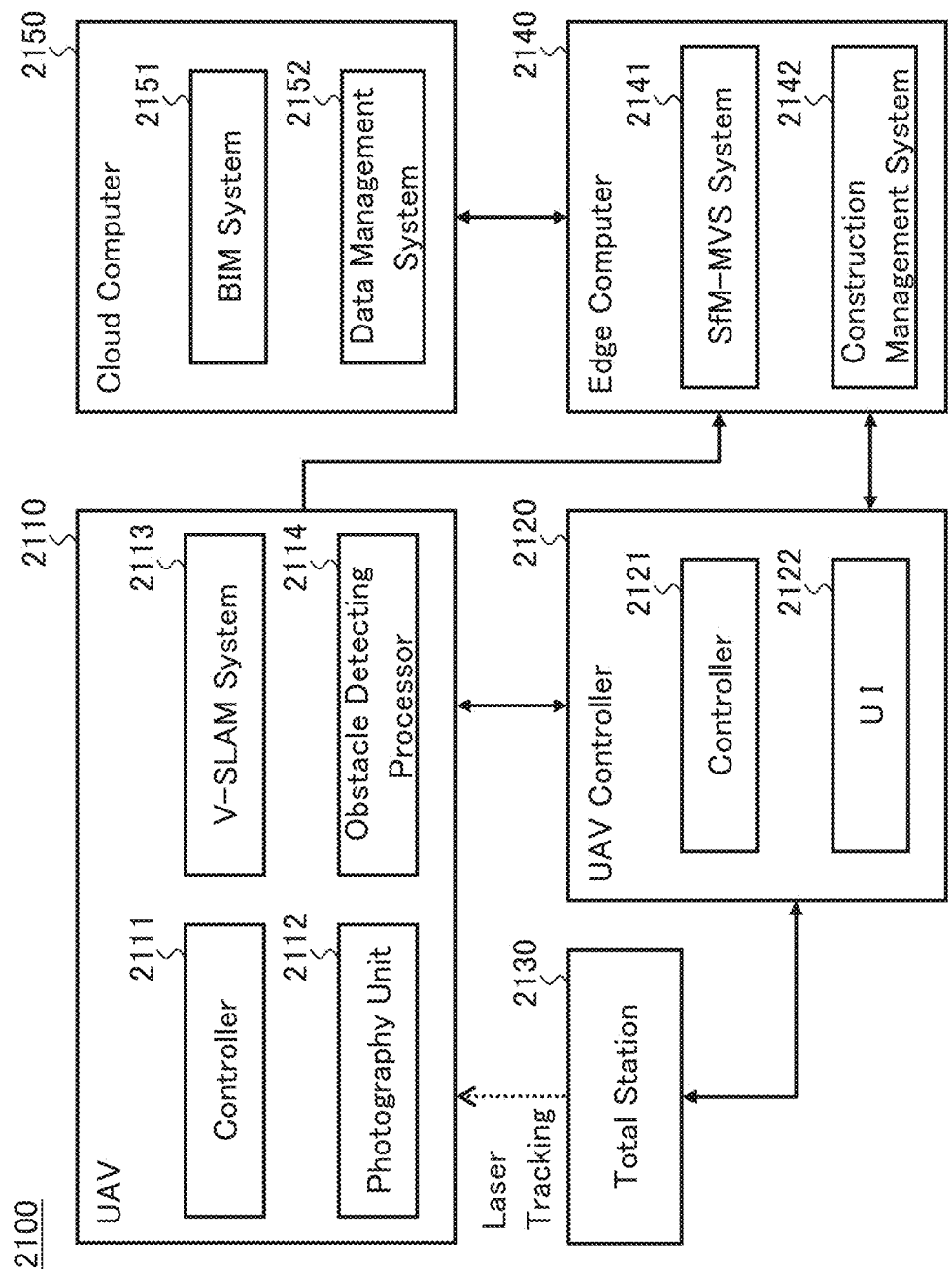
FIG. 21 is a schematic diagram showing an example of the configuration of the system according to some aspect examples.

FIG. 21 shows a configuration example of the system according to the present aspect example. The system 2100 includes the UAV 2110, the UAV controller 2120, the total station 2130, and the edge computer 2140. The cloud computer 2150 may be included in the system 2100, or may be an external device capable of data communication with the system 2100. At least one of the UAV 2110, the UAV controller 2120, the total station 2130, and the edge computer 2140 may be an external device of the system 2100.

Note that any of the techniques and/or any of the technologies disclosed in the following Patent Documents may be combined or incorporated with the present aspect example: U.S. Patent Publication No. 2016/0034137; European Patent Publication No. 3522003; Japanese Unexamined Patent Application Publication No. 2018-116572; Japanese Unexamined Patent Application Publication No. 2018-119882; Japanese Unexamined Patent Application Publication No. 2018-124984; Japanese Unexamined Patent Application Publication No. 2018-151964; Japanese Unexamined Patent Application Publication No. 2019-023653; Japanese Unexamined Patent Application Publication No. 2019-105789; Japanese Unexamined Patent Application Publication No. 2019-194883; Japanese Unexamined Patent Application Publication No. 2019-219206; Japanese Unexamined Patent Application Publication No. 2020-004278; and Japanese Unexamined Patent Application Publication No. 2020-008423. Further, any of the techniques and/or any of the technologies described in Japanese Unexamined Patent Application Publication No. 2018-138922, Japanese Unexamined Patent Application Publication No. 2018-138923, and other known documents or literatures of the related fields, may be combined or incorporated with the present aspect example.

The UAV 2110 is a small unmanned aerial vehicle that makes a flight inside and/or outside a (physical) building to acquire data of the building. The UAV 2110 includes the controller 2111 configured to perform various kinds of controls, the photography unit 2112 configured to acquire data of the building, the V-SLAM system 2113 configured to execute V-SLAM processing, and the obstacle detecting processor 2114 configured to execute obstacle detection processing.

Although details are not shown in the drawings, the UAV 2110 includes elements for making a flight, such as a plurality of propellers and propeller motors configured to respectively rotate the propellers, as with general and standard UAVs. Further, the UAV 2110 may also include any kinds of means that can be mounted on general and standard UAVs, such as an inertial measurement unit (IMU), a device for position measurement, navigation, and timekeeping using a global navigation satellite system (GNSS), although not shown in the drawings. In addition, the UAV 2110 may include an element or a material for automatic tracking of the UAV 2110 using the total station 2130 (not shown in the drawings). The element for the automatic tracking may be a retroreflector such as a prism or a reflective sticker, for example.

The controller 2111 is implemented, for example, by the cooperation of hardware including a processor and a storage device, and control software. The UAV 2110 is capable of autonomous flight under the control of the controller 2111. The UAV 2110 is also capable of remote-controlled flight using the UAV controller 2120 or the like. In the case where the UAV 2110 is remotely controlled, the controller 2111 performs flight control of the UAV 2110 based on operation instruction signals transmitted from the UAV controller 2120 or other controllers. The controller 2111 includes a communication device for performing data communication with other devices such as the UAV controller 2120, the edge computer 2140, and other devices. This data communication is typically wireless communication; however, wired communication may be employed instead or additionally.

The photography unit 2112 may include, for example, any one or more of a digital camera, a laser scanner, and a spectral camera. The digital camera is typically an omnidirectional camera (also referred to as a 360-degree camera or the like). While the present aspect example mainly describes some cases where the photography unit 2112 acquires images (video, moving image, moving picture) of the surrounding environment by an omnidirectional camera in detail, the same or similar processing may be performed in other cases as well.

The V-SLAM system 2113 is implemented, for example, by the cooperation of hardware including a processor and a storage device, and V-SLAM software. The V-SLAM system 2113 is configured to perform real time analysis of the video being acquired by the photography unit 2112 to generate three dimensional information of the surrounding environment (e.g., the building) of the UAV 2110, and also perform estimation of the position and the orientation of the UAV 2110. In particular, executed is the estimation of the position and the orientation of the photography unit 2112 of the UAV 2110. The processing executed by the V-SLAM system 2113 may be the same as or similar to any known V-SLAM processing. It should be noted that other techniques or technologies capable of generating the same or similar output as or to that of V-SLAM can be employed as an alternative of V-SLAM.

The obstacle detecting processor 2114 is implemented, for example, by the cooperation of hardware including a processor and a storage device, and obstacle detecting software. The obstacle detecting processor 2114 is configured to detect an image region corresponding to an obstacle (e.g., a tool, a worker, etc.), by inputting an image (frame) constituting the video acquired by the photography unit 2112 into an inference model (learned model). The inference model may be, for example, an inference model described in any of the first to tenth aspect examples. Note that the obstacle detecting processor 2114 may use rule-based processing to detect an image region corresponding to an obstacle. In some aspect examples, the obstacle detecting processor 2114 may be configured to perform obstacle detection by a combination of processing using an inference model and rule-based processing.

The output from the obstacle detecting processor 2114 is input into the controller 2111. The controller 2111 then performs control to avoid a collision with the detected obstacle, based on the output from the obstacle detecting processor 2114. This control may be, for example, any of the following: changing the flight route, levitating (floating on air), landing, switching from autonomous flight to non-autonomous flight, outputting a warning sound, and instructing the UAV controller 2120 to output warning information such as warning sound, warning display, or the like.

The UAV controller 2120 may be used as a remote controller for performing remote control of the UAV 2110. Further, the UAV controller 2120 may be used to display information on the building to be measured, such as a BIM model, a CAD model, material information, a construction plan, and the like. Furthermore, the UAV controller 2120 may be used to output information on the UAV 2110, such as a flight route, a video obtained by the photography unit 2112, a warning, and the like. The UAV controller 2120 may also be used to create or edit a flight plan (flight route) of the UAV 2110.

The UAV controller 2120 includes the controller 2121 and the user interface 2122. The controller 2121 controls each part of the UAV controller 2120. The controller 2121 is implemented, for example, by the cooperation of hardware including a processor and a storage device, and control software. The controller 2121 includes a communication device for performing data communication with other devices such as the UAV 2110, the edge computer 2140, and other devices. This data communication is typically wireless communication; however, wired communication may be employed instead or additionally.

The user interface 2122 includes, for example, a display device, an operation device, an input device, and the like. A typical example of the user interface 2122 is a mobile computer such as a tablet, a smartphone, or the like, and includes a touch screen, a GUI, and the like.

The total station 2130 is used for tracking of the UAV 2110 in flight. In the case where the UAV 2110 includes the retroreflector described above, the total station 2130 performs tracking (or, follows, chases, or pursues) the retroreflector, by outputting tracking light (distance measuring light) and receiving the returned light of the tracking light reflected by the retroreflector. The total station 2130 measures three dimensional coordinates (e.g., a slope distance, a horizontal angle, a vertical angle, etc.) on the basis of the position at which the total station 2130 is installed (or other reference position) while tracking the retroreflector. Such a tracking function is implemented, for example, by the cooperation of hardware including a processor and a storage device, and tracking software. Further, the three dimensional coordinate measurement function is implemented, for example, by the cooperation of hardware including a processor and a storage device, and three dimensional coordinate measuring software.

In the case where the UAV 2110 does not include a retroreflector, the UAV 2110 may include a plurality of light receiving sensors (not shown in the drawings), for example. Each light receiving sensor is capable of receiving the tracking light emitted from the total station 2130. By judging or determining which of the light receiving sensors has received the tracking light, the direction or the orientation of the UAV 2110 with respect to the total station 2130 may be estimated. Such estimation processing may be carried out by any of the UAV 2110, the UAV controller 2120, the total station 2130, and the edge computer 2140, for example.

The total station 2130 includes a communication device for performing data communication with other devices such as the UAV 2110, the UAV controller 2120, the edge computer 2140, and other devices. This data communication is typically wireless communication; however, wired communication may be employed instead or additionally. The total station 2130 is capable of transmitting the position information (three dimensional coordinates) of the UAV 2110, which is sequentially acquired along with the tracking, to the UAV 2110 in real time.

In this way, the UAV 2110 is capable of recognizing its own current position based on the information transmitted from the total station 2130. In addition, the UAV 2110 is also capable of recognizing its own current position based on the information obtained by the V-SLAM system 2113.

When the UAV 2110 is flying in a blind area of the tracking by the total station 2130, the UAV 2110 perceives in real time only the (relatively rough) position information based on V-SLAM.

On the other hand, when the UAV 2110 is in flight in a region other than blind areas, the UAV 2110 may perceive in real time (relatively detailed or fine) position information based on the total station 2130 as well as (relatively rough) position information based on V-SLAM. When both pieces of the position information can be acquired in real time, the UAV 2110 may perform determination of an association between the position information based on the total station 2130 and the position information based on V-SLAM.

Further, the UAV 2110 may be configured to perform autonomous flight with referring to the (relatively detailed) position information based on the total station 2130 while both pieces of the position information can be acquired, and also perform autonomous flight with referring to the (relatively rough) position information based on V-SLAM at other times.

The edge computer 2140 is a computer for implementing edge computing at a construction site, and is configured to process data from devices such as the UAV 2110, the UAV controller 2120, and the total station 2130 at the construction site (or near the construction site). The introduction of such edge computing can eliminate the load increase and the communication delay in the entire system 2100.

The edge computer 2140 includes a communication device for performing data communication with a device used at a construction site, such as the UAV 2110, the UAV controller 2120, and the total station 2130. This data communication is typically wireless communication; however, wired communication may be employed instead or additionally.

Further, the edge computer 2140 includes a communication device for performing data communication with the cloud computer 2150. This data communication is typically wireless communication; however, wired communication may be employed instead or additionally.

Further, the edge computer 2140 may include a BIM data processing application and/or a building or construction data management application. In the present aspect example, the edge computer 2140 includes the SfM/MVS system 2141 and the construction management system 2142.

The SfM/MVS system 2141 is implemented, for example, by the cooperation of hardware including a processor and a storage device, and SfM software as well as MVS software. The SfM/MVS system 2141 is configured to create position information of the UAV 2110 (actual flight route) and a three dimensional model of the (physical) building, based on the following data and information, for example: the video acquired by the photography unit 2112 of the UAV 2110; the position information of the UAV 2110 acquired by the V-SLAM system 2113 of the UAV 2110; and the position information of the UAV 2110 acquired by the total station 2130.

The SfM/MVS system 2141 is configured to executes, as SfM processing, estimation of the position information of the UAV 2110 from the video acquired by the UAV 2110 while being in flight. More specifically, the SfM/MVS system 2141 is configured to apply SfM processing to the video acquired by the UAV 2110 while being in flight, to collect time series three dimensional coordinates representing the actual flight route of the UAV 2110 and also obtain the orientation of the UAV 2110 corresponding to each three dimensional coordinate in the time series three dimensional coordinates collected. In other words, the SfM/MVS system 2141 acquires both the time series three dimensional coordinates representing the movement route of the camera included in the photography unit 2112 and the time series orientation information (time series posture information) of the camera along the movement route. The position information (three dimensional coordinates) of the UAV 2110 acquired by the total station 2130 may be referred to in the SfM processing. As a result of this, the precision of the time series three dimensional coordinates and the time series orientation information to be acquired can be improved. The SfM processing of the present example may be the same as or similar to any known SfM processing. Note that another technique or technology capable of generating an output same as or similar to the SfM processing of the present example may be employed as an alternative to the SfM processing.

Further, the SfM/MVS system 2141 executes, as MSV processing, generation of point cloud data of the (physical) building, based on the position information of the UAV 2110 obtained with the SfM processing (e.g., the time series position information and the time series orientation information of the camera) and on the video acquired by the UAV 2110 while being in flight.

In the present aspect example, the edge computer 2140 (the SfM/MVS system 2141, the construction management system 2142, or another data processor) may be configured to detect an image region (material region) corresponding to a building material by inputting an image (frame) constituting the video acquired by the photography unit 2112 into an inference model (image segmentation). The inference model may be, for example, an inference model described in any of the first to tenth aspect examples. In addition, the edge computer 2140 (the SfM/MVS system 2141, the construction management system 2142, or another data processor) may identify material attributes (e.g., type, identification information (ID), shape, position, measurement date, measurement time, etc.) corresponding to each material region detected. In this processing as well, an inference model may be used. Note that the edge computer 2140 may employ rule-based processing for material region detection and material attribute identification. In some aspect examples, the edge computer 2140 may be configured to perform material region detection and material attribute identification through a combination of processing using an inference model and rule-based processing.

The construction management system 2142 is implemented, for example, by the cooperation of hardware including a processor and a storage device, and construction management software. The construction management system 2142 is configured to perform management of various kinds of data handled or processed by the system 2100. The processing executed by the construction management system 2142 will be described later.

The cloud computer 2150 is a computer for implementing cloud computing that provides computer resources in the form of services to the construction site from a remote location via a computer network. The introduction of such cloud computing can improve the extensibility, flexibility, and efficiency of the services that can be provided to the system 2100.

For example, the cloud computer 2150 is configured to manage a BIM tool, a data management tool, and data used for these tools (e.g., design BIM data, installation information, construction information, measurement BIM data, etc.), and also provide the tools and the data to the edge computer 2140. In the present aspect example, the cloud computer 2150 includes the BIM system 2151 and the data management system 2152.

The BIM system 2151 is configured to provide various kinds of tools such as BIM tools and various kinds of data such as data used for the BIM tools to the edge computer 2140. The BIM system 2151 is implemented, for example, by the cooperation of hardware including a processor and a storage device, and BIM software. The processing executed by the BIM system 2151 will be described later.

The data management system 2152 is configured to manage various kinds of tools and various kinds of data. The data management system 2152 is implemented, for example, by the cooperation of hardware including a processor and a storage device, and data management software. The processing executed by the data management system 2152 will be described later.

Figure 22:
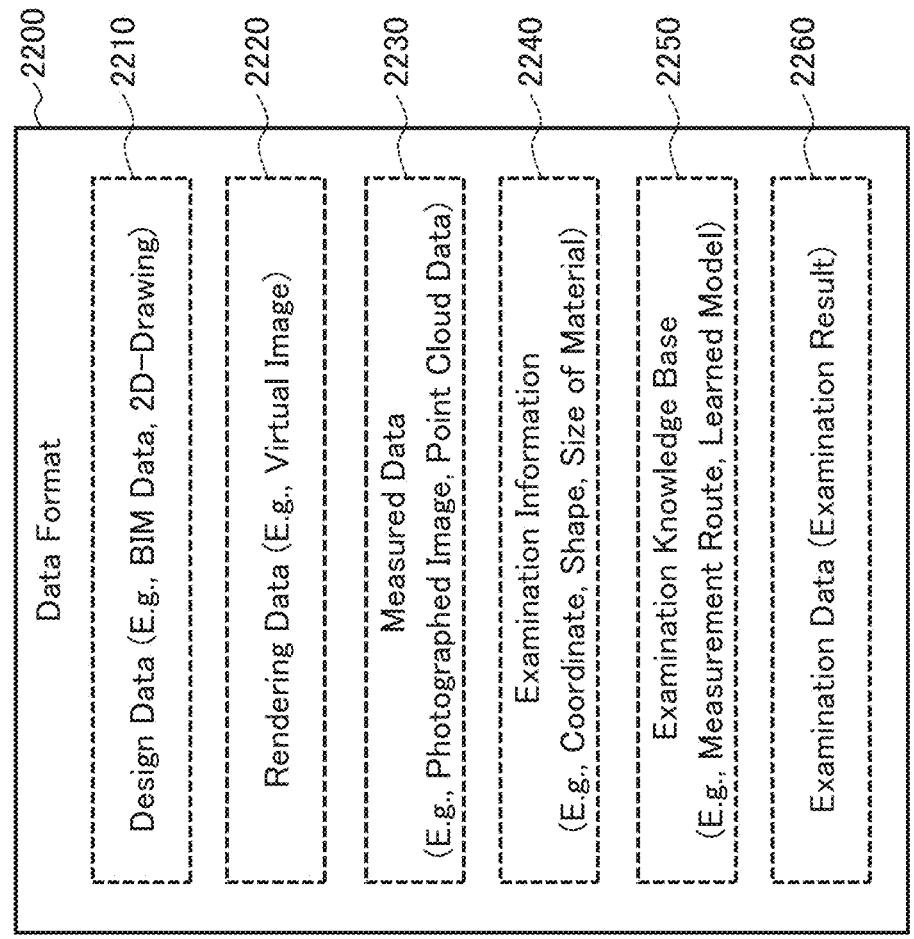
FIG. 22 is a schematic diagram showing an example of the data format (data structure) used in the system according to some aspect examples.

FIG. 22 shows an example of the data structure (data format) handled by the system 2100 of the present aspect example. The data format 2250 includes the design data 2210, the rendering data 2220, the measured data 2230, the examination information 2240, the examination knowledge base 2250, and the examination data 2260. In other words, the data format 2250 has a data structure that includes regions in which at least the above types of data 2210 to 2260 are entered and recorded respectively.

The recording region for the design data 2210 records various kinds of design data described above such as BIM data (design BIM data) and design drawings.

The recording region for the rendering data 2220 records image data (virtual images) obtained by applying rendering to the design BIM data. Rendering data is constructed for each of the plurality of positions in the design BIM data. For example, a plurality of positions may be set on a flight route in advance, and volume rendering with each of the plurality of positions as a viewpoint may be applied to the design BIM data. As a result of this, a plurality of pieces of rendering data (a plurality of virtual images) along the flight route in the design BIM data can be obtained. Corresponding position information (three dimensional coordinates of a corresponding viewpoint in the design BIM data) may be attached to each piece of the rendering data as attribute information. The attribute information of the rendering data is not limited to this. For example, the attribute information of the rendering data may include any information on the design BIM data, any information on the rendering process, any information on the rendering data, or the like.

The recording region for the measured data 2230 records various kinds of data acquired by measurement of the (physical) building. Examples of such data include point cloud data of the building (scan data), three dimensional coordinates of each measurement position, video (images) acquired by the photography unit 2112 of the UAV 2110, a two dimensional image, size information, measurement date, measurement time, and the like. Further, parameter information relating to any of the above data examples may also be recorded. For example, parameter information relating to the point cloud data creating process, parameter information relating to the photographing process by the photography unit 2112, and other kinds of parameter information may be recorded.

The recording region for the examination information 2240 records various kinds of information (examination information) for conducting examination of the physical materials respectively corresponding to the virtual materials. The examination information 2240 includes, for example, the shape, size, installation date, installation time, and the like of the examination target (virtual material) at each examination position (position of each virtual material). In other words, the examination information 2240 may include information relating to a plurality of attributes of each virtual material. The examination information is not limited to such data examples, and may include any information relating to the examination.

The recording region for the examination knowledge base 2250 records various kinds of knowledge used for the examination of the physical materials respectively corresponding to the virtual materials. The examination knowledge base 2250 includes, for example, a measurement route (a plurality of examination positions along a flight route), the inference model described above, and the like. The examination knowledge base 2250 may also include a rule-based algorithm.

The recording region for the examination data 2260 records various kinds of data (examination data) acquired by the examination of the physical materials respectively corresponding to the virtual materials. The examination data 2260 includes, for example, the presence or absence of an object at the examination position (presence or absence of a physical material corresponding to a virtual material), deviation of a physical material with respect to a virtual material (presence or absence of position deviation, direction of position deviation, orientation of position deviation, etc.), and a judgement result of whether an examination position satisfies a predetermined condition. The judgement may include, for example, a judgement of whether or not the examination has been performed based on the data obtained from a flight route set in advance, that is, a judgement of whether or not obstacle avoidance (or deviation from the flight route due to another reason) has been performed at that time point.

Figure 23A:
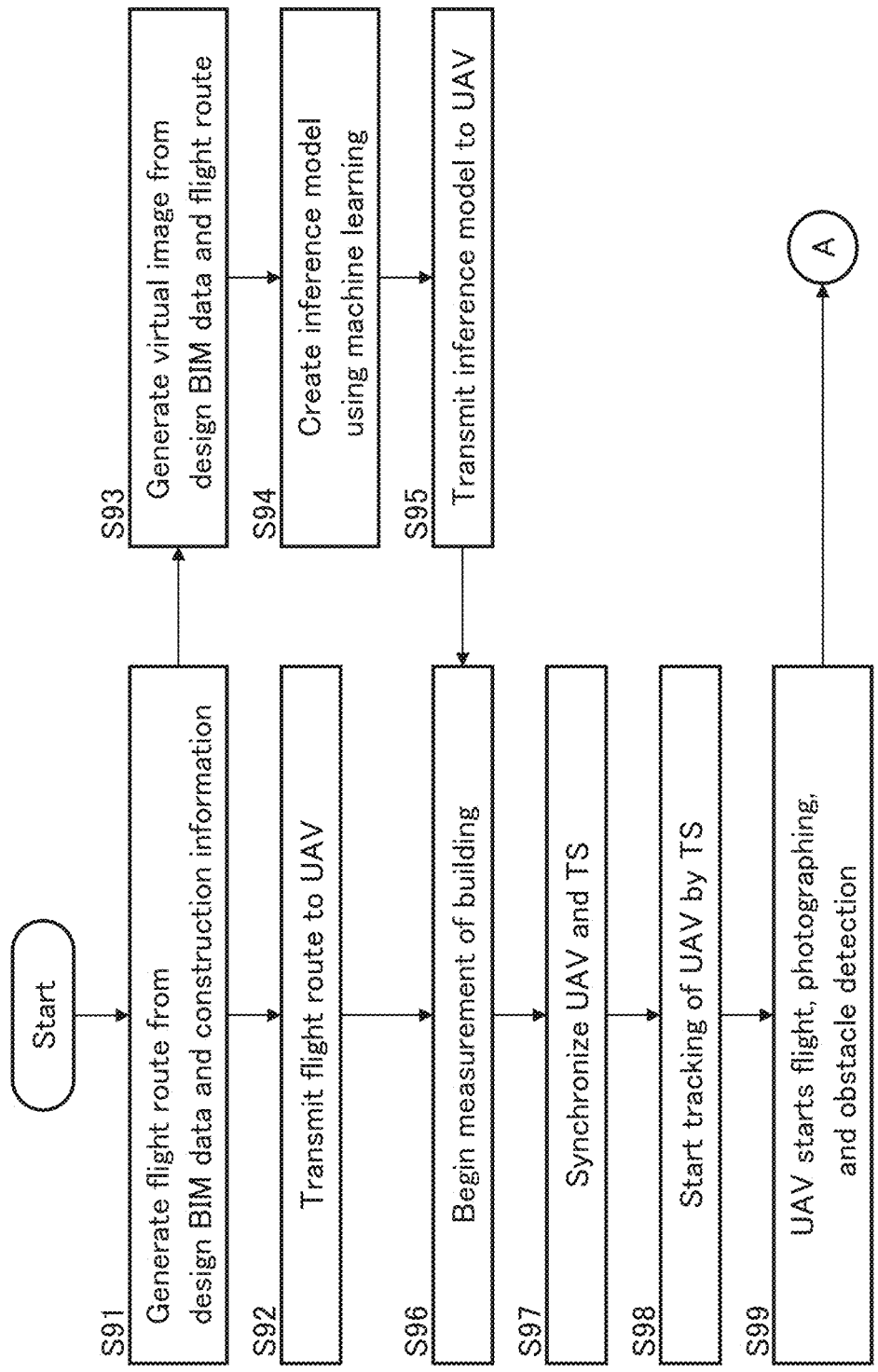
FIG. 23A is a flowchart showing an example of the operation of the system according to some aspect examples.
Figure 23B:
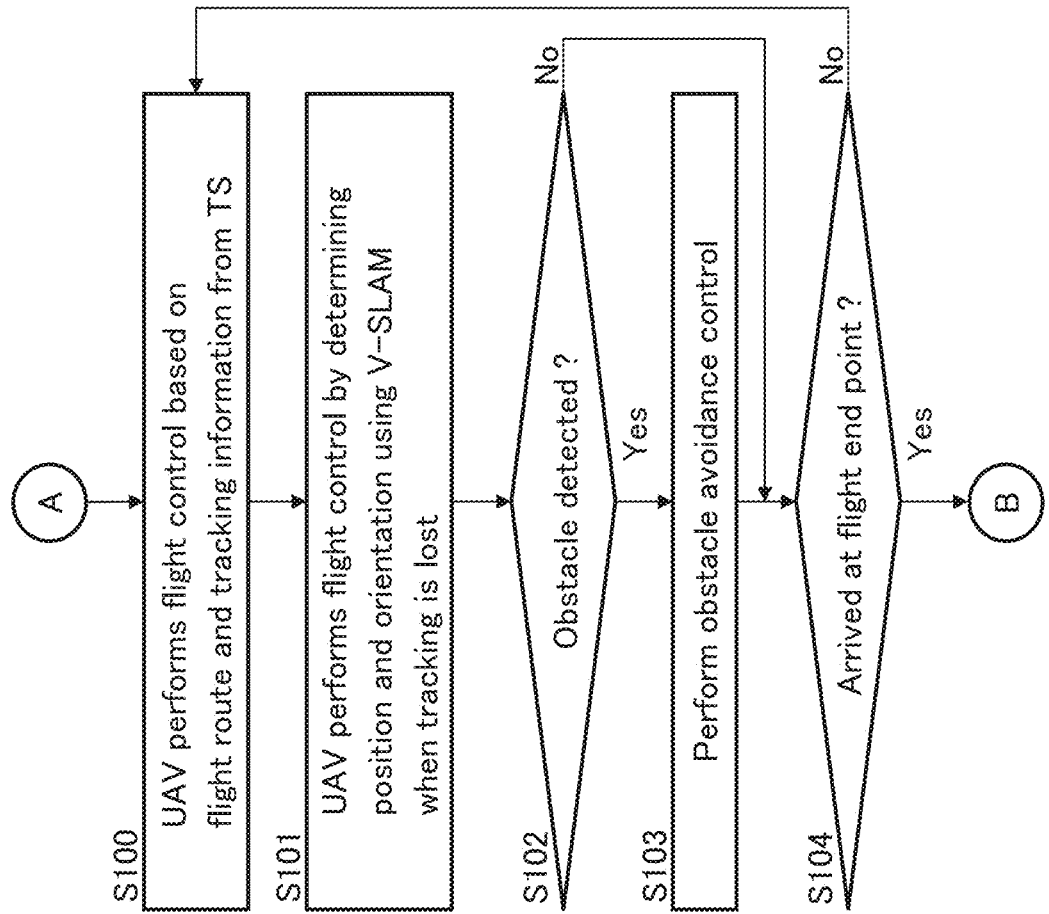
FIG. 23B is a flowchart showing an example of the operation of the system according to some aspect examples.
Figure 23C:
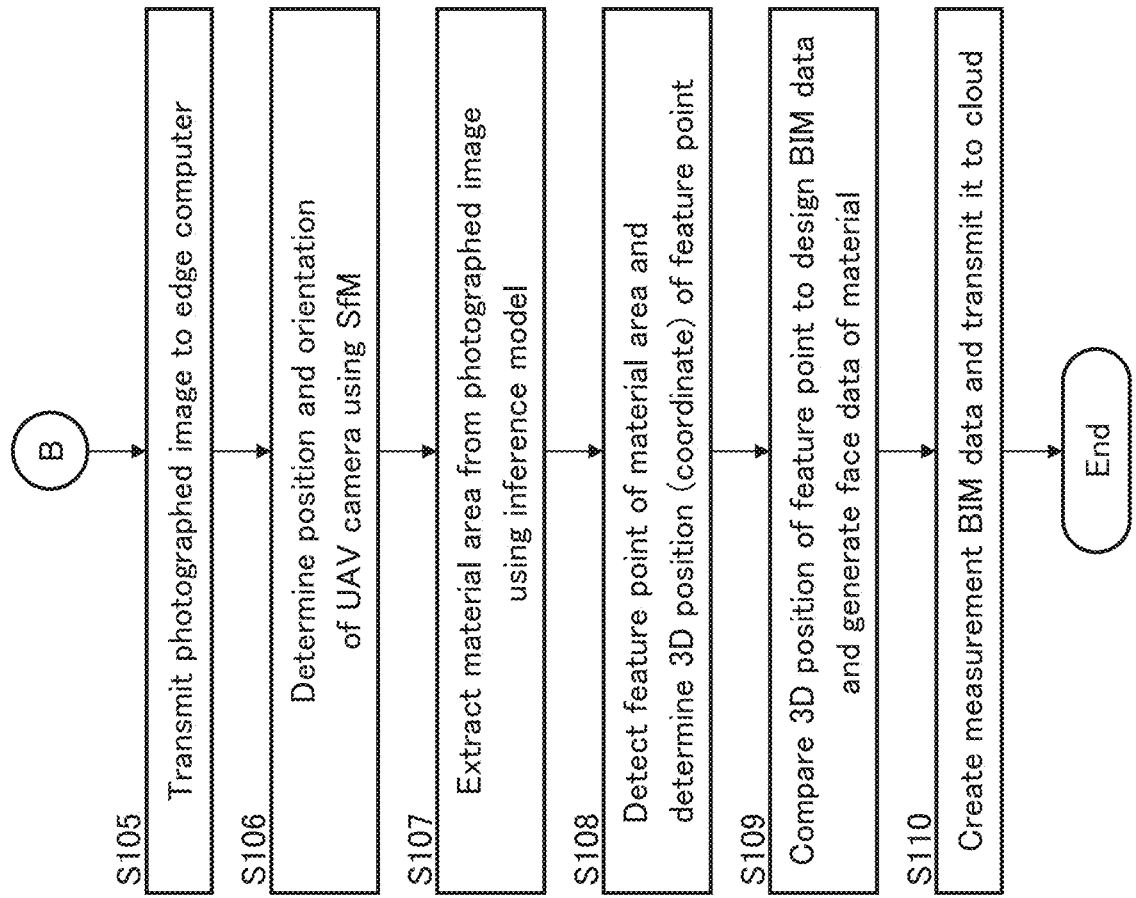
FIG. 23C is a flowchart showing an example of the operation of the system according to some aspect examples.

An operation example of the system 2100 of the present aspect example will be described with further reference to FIG. 23A, FIG. 23B, and FIG. 23C.

The timings or time points of executing a series of steps or processes (examination) of the present operation example is optional. For example, the examination may be carried out for each predetermined construction process. As an application example, the following series of processes may be performed on each construction day to create a series of data of the construction progress statuses on respective construction days. In the case where the application of the present operation example is only for checking the construction progress, only the examination of determining the presence or absence of a physical material corresponding to each virtual material may be performed. In the case of other applications, the examination may be performed with higher precision.

(S91: Generate Flight Route)

In the present operation example, first, the cloud computer 2150 transmits the following data to the edge computer 2140: the date of examination to be performed (measurement date information) by the edge computer 2140 (the construction management system 2142) using the design BIM data, the construction information (the installation information; the installation date information for individual materials), and the UAV 2110; obstacle images (virtually generated images, actually photographed images), and the like. The edge computer 2140 determines a flight route of the UAV 2110 on that measurement date based on the information provided from the cloud computer 2150.

The flight route generation may be executed by any of the cloud computer 2150, the UAV controller 2120, and another computer (the same will apply below). Further, the edge computer 2140 or the UAV controller 2120 may generate measurement date information instead of acquiring the above measurement date information from the cloud computer 2150. The flight route generation may be executed as fully automatic processing, semi-automatic processing, or a manual operation. The installation date information may also include installation time.

The flight route may be determined in such a manner that the distance between the photography unit 2112 of the UAV 2110 and examination targets (e.g., materials, floors, ceilings, walls, facilities, columns, etc.) is included within the allowable range, for example. For example, the allowable range (maximum distance, upper limit) may be set in consideration of the fact that the smaller (the closer) the distance is, the higher the examination precision. On the other hand, the allowable range (minimum distance, lower limit) may be set so that the entire building or a broad area of the building can be photographed.

(S92: Transmit Flight Route to UAV)

For example, upon receiving an instruction form the user, the edge computer 2140 transmits the flight route information generated in the step S91 to the UAV 2110.

(S93: Generate Virtual Image)

In addition, the edge computer 2140 generates a virtual image (rendering data) by applying rendering to the design BIM data based on the flight route generated in the step S91. For example, the edge computer 2140 generates a virtual video picture to be obtained when a virtual UAV (a virtual camera) flies along the flight route in the three dimensional virtual space in which the design BIM data is defined. More specifically, for each of the plurality of positions on the flight route, the edge computer 2140 generates an image of virtual BIM data (virtual building) to be acquired by the virtual camera from that position.

(S94: Create Inference Model)

The edge computer 2140 creates an inference model (the first inference model) used for identifying material data from data of the physical building, by applying to a neural network machine learning with training data including the virtual images generated in the step S93 (and a plurality of other virtual images). This process may be performed, for example, according to any of the aspect examples described above.

Further, the edge computer 2140 creates an inference model (the second inference model) used for identifying data of an obstacle mixed in the data of the physical building, by applying to a neural network machine learning with training data including the obstacle images provided from the cloud computer 2150 in the step S91 (and a plurality of other obstacle images). This process may be performed, for example, according to any of the aspect examples described above.

Note that if performing machine learning with training data including both the virtual images and the obstacle images, a single inference model can be obtained which functions as both the first inference model and the second inference model. This process may be performed, for example, according to any of the aspect examples described above. The inference model of the present example is a model created by training for identifying material data and obstacle data from the physical building data. While such an inference model is employed in the following description, adoptable or employable inference models are not limited to this. In addition, an inference model to be adopted may have other functions.

The training data may also include one or both of texture information of materials and texture information of obstacles. Furthermore, the neural network model used for creating the inference model is typically a convolutional neural network (CNN). It should be noted that the method or technique used for inference model creation is not limited to that of the present example. For example, any method or technique such as the following may be employed: support vector machine, Bayes classifier, boosting, k-means clustering, kernel density estimation, principal component analysis, independent component analysis, self-organizing map (or self-organizing feature map), random forest (or randomized trees, random decision forests), and generative adversarial network (GAN).

(S95: Transmit Inference Model to UAV)

The edge computer 2140 transmits the inference model created in the step S94 to the UAV 2110.

(S96: Begin Measurement of Building)

After the preparatory steps S91 to S95, the measurement of the physical building begins.

(S97: Synchronize UAV and Total Station)

In the measurement, first, the UAV 2110 and the total station (TS) 2130 are synchronized with each other. In other words, the clock of the UAV 2110 and the clock of the total station 2130 are synchronized with each other. As a result of the synchronization, the time attached to the video to be obtained by the UAV 2110 and the time attached to the position information of the UAV 2110 to be acquired by the total station 2130 are synchronized with each other. That is, the photographed time and the measurement time are synchronized with each other. Here, the photographed time may be attached to the position information acquired from the video using the V-SLAM processing.

If both the UAV 2110 and the total station 2130 are outdoors, for example, the synchronization of the clocks may be carried out by using a navigation signal from a navigation satellite (including time information based on an atomic clock). On the other hand, if at least one of the UAV 2110 and the total station 2130 is indoors, for example, the synchronization of the clocks may be carried out by using a time server on a network to which both the UAV 2110 and the total station 2130 can connect. Note that the synchronization method or technique is not limited to these.

(S98: Start Tracking UAV by Total Station)

After the time synchronization in the step S97, the user issues an instruction to start measurement using the UAV controller 2120, for example. The total station 2130 starts tracking of the UAV 2110 that has received the measurement start instruction from the UAV controller 2120. Further, the total station 2130 starts the real time generation of the position information of the UAV 2110 and the real time transmission of the generated position information to the UAV 2110.

(S99: UAV Starts Flight, Photographing, and Obstacle Detection)

Upon receiving the measurement start instruction in the step S98, the UAV 2110 starts autonomous flight with referring to the flight route received in the step S92, photographing by the photography unit 2112 (and saving the acquired video), and obstacle detection processing by the V-SLAM system 2113 and the obstacle detecting processor 2114.

(S100: UAV Performs Flight Control Based on Information from Outside)

The UAV 2110 performs autonomous flight by flight control based on the tracking information (the position information of the UAV 2110 as the tracking target) transmitted in real time from the total station 2130 and also on the flight route received in the step S92. Note that the series of the steps S100 to S104 is repeated until "YES" is issued as a judgement of the step S104.

(S101: UAV Performs Flight Control Based on Self-Generated Information when Tracking is Lost)

When the UAV 2110 enters a blind area of the tracking by the total station 2130, the UAV 2110 becomes unable to receive the tracking information from the total station 2130, for example. The UAV 2110 may be configured to switch the position information referred to for autonomous flight control from the tracking information from the total station 2130 to the position information sequentially acquired by the V-SLAM system 2113 in response to the loss of the reception of the tracking information. In addition, the UAV 2110 may be configured to switch the position information referred to for autonomous flight control from the position information sequentially acquired by the V-SLAM system 2113 to the tracking information from the total station 2130 in response to the resumption of the reception of the tracking information.

It is conceivable that some tracking information may reach the UAV 2110 due to the reflection or transmission of radio waves even if the UAV 2110 has entered a blind area of the tracking by the total station 2130. Assuming such a case, the UAV 2110 may be configured to detect a problem from the position information indicated by the tracking information. For example, the UAV 2110 may be configured to detect a problem by checking the position information indicated by the tracking information and the position information obtained by the V-SLAM system 2113 against each other. Note that both pieces of the position information have been synchronized as described above. As an example of such a configuration, the UAV 2110 may be configured to calculate an error between the both pieces of the position information (three dimensional coordinates), judges that there is a "problem" if the error is equal to or greater than a predetermined threshold, and judges that there is "no problem" if the error is less than the predetermined threshold. The UAV 2110 may be configured to switch the position information referred to for autonomous flight control from the tracking information from the total station 2130 to the position information sequentially acquired by the V-SLAM system 2113 in response to the shift of judgment results from "no problem" to "problem". Furthermore, the UAV 2110 may be configured to switch the position information referred to for autonomous flight control from the position information sequentially acquired by the V-SLAM system 2113 to the tracking information from the total station 2130 in response to the shift of judgment results from "problem" to "no problem".

With such a configuration, the UAV 2110 can perform autonomous flight control based on the positions and the orientations sequentially obtained by the V-SLAM system 2113 while the tracking of the UAV 2110 by the total station 2130 is being lost.

(S102: Obstacle Detected?)

The operation proceeds to the step S103 if the obstacle detecting processor 2114 detects an obstacle (S102: Yes). While no obstacle is being detected (S102: No), the operation skips the step S103 and proceeds to the step S104.

(S103: Perform Obstacle Avoidance Control)

When an obstacle has been detected in the step S102 (S102: Yes), the UAV 2110 performs control for the obstacle avoidance operation described above. For example, the UAV 2110 obtains the position, direction, size, etc. of the detected obstacle, determines a route to avoid collision with the obstacle, and flies along the newly determined route. Typically, the start and end points of the collision avoidance route are both located on the flight route received in the step S92. In other words, the UAV 2110 deviates from the flight route received in the step S92, bypasses (dodges) the obstacle, and returns to the flight route.

(S104: Arrived at Flight End Point?)

The UAV 2110 is capable of judging or determining whether or not the UAV 2110 has reached the end point of the flight route received in the step S92 (flight end point) based on the tracking information from the total station 2130, the position information acquired by the V-SLAM system 2113, or the like. When the UAV 2110 has judged that the UAV 2110 has not yet reached the flight end point (S104: No), the operation returns to the step S100. On the other hand, when the UAV 2110 has judged that the UAV 2110 has already reached the flight end point (S104: Yes), the operation proceeds to the step S105. This completes the measurement (photographing) of the physical building.

(S105: Transmit Photographed Image to Edge Computer)

After reaching the flight end point (S104: Yes), the UAV 2110 transmits, to the edge computer 2140, the photographed images (video) acquired while in flight. Note that the UAV 2110 may sequentially transmit the photographed images to the edge computer 2140 while in flight; or alternatively, the UAV 2110 may accumulate the photographed images during the flight and collectively transmit the photographed images to the edge computer 2140 after the completion of the flight. In some aspect examples, the UAV 2110 may repeat the accumulation of photographed images and the transmission of photographed images at predetermined time intervals. In some aspect examples, the UAV 2110 may transmit a predetermined amount of data each time a photographed image is accumulated.

The following steps are a series of processes based on the images acquired by the UAV 2110. That is, the steps S106 to S110 are regarded as post-processing. In the case where the UAV 2110 transmits the photographed images to the edge computer 2140 while in flight, the post-processing may be started before the flight of the UAV 2110 is completed. In other words, the photographing and the post-processing may be performed sequentially in parallel in that case. This can shorten the time required for the operation. On the other hand, in the case where the post-processing is started after the completion of the photographing, the post-processing can be executed with reference to all the photographed images. This can improve the precision and accuracy of the post-processing. For example, when analyzing a particular photographed image, it is possible to refer to one or more photographed images before and/or after the photographed image of interest.

Here, the edge computer 2140 may be capable of judging whether or not the photographed images are suitable for post-processing. For example, the edge computer 2140 may be configured to evaluate or assess the quality of the photographed images, such as brightness, contrast, focus, color, definition, or the like. If the edge computer 2140 judges that the quality is insufficient, the photographing by the UAV 2110 may be performed again, or image processing may be applied to the photographed images to improve the image quality. This image processing may be executed using an inference model created by machine learning, for example. In some aspect examples, the image processing may include interpolation using adjacent photographed images. The edge computer 2140 may start the image quality evaluation while the UAV 2110 is photographing. If the edge computer 2140 judges, during the photographing, that the image quality is insufficient, the UAV 2110 may return to the position where the photographed image judged as having insufficient quality was acquired (or to a position upstream from this acquisition position of the photographed image in the flight route) and then perform photography again.

Similarly, the total station 2130 transmits, to the edge computer 2140, the time series three dimensional coordinates and the time series orientation information of the UAV 2110 (the photography unit 2112, the retroreflector) acquired in parallel with the tracking of the UAV 2110.

(S106: Determine Position and Orientation of Camera)

The edge computer 2140 executes SfM processing based on the photographed images acquired by the UAV 2110 (e.g., each frame of the video) and the time series information acquired by the total station 2130 (e.g., the time series three dimensional coordinates, the time series orientation information), thereby determining the position and the orientation of the photography unit 2112 (e.g., the camera) at each of the plurality of positions on the flight route. Since the UAV 2110 and the total station 2130 have been synchronized in the step S97, the time information of the video and the time information of the time series information may be associated with each other. By performing the determination of the association between the two pieces of the time information, the edge computer 2140 may apply the SfM processing to the combination of the video and the time series information.

(S107: Extract Material Area from Photographed Image)

The edge computer 2140 uses the inference model created in the step S94 to extract an image region (material area, material region), which corresponds to a material (virtual material) included in the design BIM data, from the photographed image (each frame of the video) acquired by the UAV 2110. This extraction process includes, for example, a process of identifying a material area in the design BIM data and a process of masking an image region other than the material area identified. Here, the edge computer 2140 may perform a process of identifying a predetermined attribute of the physical material corresponding to the material area identified.

The edge computer 2140 may judge whether or not the information obtained in the step S107 is suitable for the subsequent processing. For example, the edge computer 2140 makes a judgement as "unsuitable" if no corresponding material areas of physical materials are extracted for a sufficiently large number of virtual materials. Upon receiving a judgement result of "unsuitable", the edge computer 2140 may perform control for requesting photography again, for example.

(S108: Detect Feature Point of Material Area and Determine Coordinates of Feature Point)

The edge computer 2140 detects a feature point of the material area extracted in the step S107. The feature point may be any of one or more points, one or more lines, and one or more faces. The feature point may also be a pattern or the like. Further, the edge computer 2140 determines the three dimensional coordinates of the feature point detected.

(S109: Generate Face Data of Material)

The edge computer 2140 generates face data (surface data) of the physical material corresponding to the material area extracted in the step S107. For example, the edge computer 2140 performs position matching (registration) of two or more photographed images, which are taken from mutually different photographing positions, based on the feature point detected in the step S108. Typically, these photographed images partially overlap. By using MVS processing, the edge computer 2140 generates face data of a material commonly depicted in these photographed images based on the photographing positions of these photographed images.

A more detailed description will be given now. The edge computer 2140 performs registration between the design BIM data and the video. As a result of the registration, for example, each frame of the video (each photographed image) is embedded in the three dimensional space (the three dimensional coordinate system) in which the design BIM data is defined.

Next, for a predetermined face of the virtual material in the design BIM data, the edge computer 2140 obtains point cloud data in the photographed image located in the vicinity of the predetermined face. For example, the edge computer 2140 identifies point cloud data through the identification of a point in the photographed image in which the distance from a point to the predetermined face of the virtual material is less than or equal to a predetermined threshold. By performing such a process for each frame of the video, three dimensional coordinate point cloud data located in the vicinity of the predetermined face of the virtual material can be obtained.

Subsequently, the edge computer 2140 determines a face in the video corresponding to the predetermined face of the virtual material based on the three dimensional coordinate point cloud data obtained. For example, the edge computer 2140 obtains an approximate face (e.g., a plane, a freeform surface, etc.) based on at least part of the three dimensional coordinate point cloud data. The approximate face thus determined is the face data described above. In other words, the approximate face thus obtained is treated as face data (face image, image of a face) in the video corresponding to the predetermined face of the virtual material. Stated differently, the approximate face is a part (face) of the physical material corresponding to the virtual material, and is treated as a part (face) corresponding to the predetermined face of the virtual material. The edge computer 2140 performs determination of an association between the predetermined face of the virtual material and the face in the video determined based thereon (the face of the physical material). In this manner, an association can be established between a set of virtual materials and a set of physical materials, and also an association can be established between a set of the attributes (e.g., position, shape, etc.) of the virtual materials and a set of the attributes (e.g., position, shape, etc.) of the physical materials.

(S110: Create Measurement BIM Data)

The edge computer 2140 creates a three dimensional model (i.e., measurement BIM data) based on the plurality of pieces of face data generated in the step S109. That is, the edge computer 2140 creates the measurement BIM data based on the data of the plurality of the physical materials obtained in the step S109. The created measurement BIM data is transmitted to the cloud computer 2150 and saved. The measurement BIM data may be used for the comparison with the design BIM data, the construction control or management, the maintenance control or management, the repair control or management, and the like. This concludes the present operation example (End).

While certain embodiments have been described, these embodiments have been presented by way of example only, and are not intended to limit the scope of the inventions. Indeed, the novel embodiments described herein may be embodied in a variety of other forms; furthermore, various omissions, substitutions, additions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus of processing building information modeling (BIM) data, comprising:
    processing circuitry configured to receive a data set that includes BIM data, installation date information that shows an installation date of a virtual building material recorded in the BIM data, and measurement date information that shows a measurement date of a building; and
    a BIM data creating processor configured to create first BIM data corresponding to a state in which only a virtual building material whose installation date is same as or earlier than the measurement date is installed, based on the data set.

2. The information processing apparatus of claim 1, further comprising a route setting processor configured to set a route arranged inside and/or outside a virtual building represented by the BIM data included in the data set, based on the first BIM data.

3. The information processing apparatus of claim 2, further comprising a virtual image set generating processor configured to generate a virtual image set of the virtual building along the route set by the route setting processor, based on the first BIM data and the route set by the route setting processor.

4. The information processing apparatus of claim 1, further comprising a route setting processor configured to set a route arranged inside and/or outside a virtual building represented by the BIM data included in the data set, based on the BIM data included in the data set.

5. The information processing apparatus of claim 4, further comprising a virtual image set generating processor configured to generate a virtual image set of the virtual building along the route set by the route setting processor, based on the first BIM data and the route set by the route setting processor.

6. The information processing apparatus of claim 1, wherein the data set further includes route information representing a route arranged inside and/or outside a virtual building represented by the BIM data included in the data set,
the information processing apparatus further comprising a virtual image set generating processor configured to generate a virtual image set of the virtual building along the route represented by the route information, based on the first BIM data and the route represented by the route information.

7. A method of processing building information modeling (BIM) data, comprising:
preparing a data set that includes BIM data, installation date information that shows an installation date of a virtual building material recorded in the BIM data, and measurement date information that shows a measurement date of a building; and
creating first BIM data corresponding to a state in which only a virtual building material whose installation date is same as or earlier than the measurement date is installed, based on the data set.

8. The method of claim 7, further comprising setting a route arranged inside and/or outside a virtual building represented by the BIM data included in the data set, based on the first BIM data.

9. The method of claim 8, further comprising generating a virtual image set of the virtual building along the route, based on the first BIM data and the route.

10. The method of claim 7, further comprising setting a route arranged inside and/or outside a virtual building represented by the BIM data included in the data set, based on the BIM data included in the data set.

11. The method of claim 10, further comprising generating a virtual image set of the virtual building along the route, based on the first BIM data and the route.

12. The method of claim 7, wherein the data set further includes route information representing a route arranged inside and/or outside a virtual building represented by the BIM data included in the data set,
the method further comprising generating a virtual image set of the virtual building along the route, based on the first BIM data and the route.

13. A computer-readable non-transitory recording medium that records a program causing a computer to execute processing of building information modeling (BIM) data, the program causes the computer to create first BIM data, based on a data set that includes
BIM data,
installation date information that shows an installation date of a virtual building material recorded in the BIM data, and
measurement date information that shows a measurement date of a building,
the first BIM data corresponding to a state in which only a virtual building material whose installation date is same as or earlier than the measurement date is installed.

14. The recording medium of claim 13, wherein the program further causes the computer to set a route arranged inside and/or outside a virtual building represented by the BIM data included in the data set, based on the first BIM data.

15. The recording medium of claim 14, wherein the program further causes the computer to generate a virtual image set of the virtual building along the route, based on the first BIM data and the route.

16. The recording medium of claim 13, wherein the program further causes the computer to set a route arranged inside and/or outside a virtual building represented by the BIM data included in the data set, based on the BIM data included in the data set.

17. The recording medium of claim 16, wherein the program further causes the computer to generate a virtual image set of the virtual building along the route, based on the first BIM data and the route.

18. The recording medium of claim 13, wherein
the data set further includes route information representing a route arranged inside and/or outside a virtual building represented by the BIM data included in the data set, and
the program further causes the computer to generate a virtual image set of the virtual building along the route, based on the first BIM data and the route.

* * * * *